United States Patent
Ono et al.

(10) Patent No.: US 8,520,563 B2
(45) Date of Patent: Aug. 27, 2013

(54) INTERFACE DEVICE, COMMUNICATIONS SYSTEM, NON-VOLATILE STORAGE DEVICE, COMMUNICATION MODE SWITCHING METHOD AND INTEGRATED CIRCUIT

(75) Inventors: Tadashi Ono, Osaka (JP); Isao Kato, Osaka (JP); Hideyuki Yamada, Osaka (JP); Shinichiro Nishioka, Osaka (JP); Hiroshi Suenaga, Osaka (JP); Tsutomu Sekibe, Kanagawa (JP)

(73) Assignee: Panasonic Corporation, Osaka (JP)

( * ) Notice: Subject to any disclaimer, the term of this patent is extended or adjusted under 35 U.S.C. 154(b) by 374 days.

(21) Appl. No.: 12/995,558

(22) PCT Filed: May 29, 2009

(86) PCT No.: PCT/JP2009/002398
§ 371 (c)(1),
(2), (4) Date: Dec. 1, 2010

(87) PCT Pub. No.: WO2009/147811
PCT Pub. Date: Dec. 10, 2009

(65) Prior Publication Data
US 2011/0182216 A1 Jul. 28, 2011

(30) Foreign Application Priority Data

| Jun. 2, 2008 | (JP) | ................................ 2008-144456 |
| Jun. 17, 2008 | (JP) | ................................ 2008-158056 |
| Jun. 17, 2008 | (JP) | ................................ 2008-158057 |
| Jan. 7, 2009 | (JP) | ................................ 2009-001573 |

(51) Int. Cl.
*H04B 1/44* (2006.01)

(52) U.S. Cl.
USPC ....................................................... 370/282

(58) Field of Classification Search
USPC ......................................... 370/282; 455/517
See application file for complete search history.

(56) References Cited

U.S. PATENT DOCUMENTS 4,771,417 A 9/1988 Maxwell et al.
7,912,070 B1 * 3/2011 Choksi ..................... 370/395.52
(Continued)

FOREIGN PATENT DOCUMENTS

EP 1 220 480 7/2002
JP 58-39138 3/1983
(Continued)

OTHER PUBLICATIONS

International Search Report issued Aug. 18, 2009 in International (PCT) Application No. PCT/JP2009/002398.

*Primary Examiner* — Chi Pham
*Assistant Examiner* — Fahmida Chowdhury
(74) *Attorney, Agent, or Firm* — Wenderoth, Lind & Ponack, L.L.P.

(57) ABSTRACT

A host device and a slave device are set to a full-duplex mode by temporarily switching the communication direction of a first transmission channel or a second transmission channel after completing transmission and reception of a predetermined number of data packets in the half-duplex mode. The host device or the slave device can thus transmit an interrupt request, such as a request associated with a wait status or a busy status, to its communication target using the temporary full-duplex mode. This enables the host device or the slave device to process such an interrupt request during high-speed data transfer performed in the half-duplex mode.

20 Claims, 42 Drawing Sheets

(56) References Cited

U.S. PATENT DOCUMENTS

| | | | | |
|---|---|---|---|---|
| 8,000,271 B1* | 8/2011 | Doran | | 370/276 |
| 8,149,743 B1* | 4/2012 | Choksi | | 370/296 |
| 2006/0025165 A1* | 2/2006 | Tillet et al. | | 455/517 |
| 2008/0089249 A1* | 4/2008 | Young et al. | | 370/276 |

FOREIGN PATENT DOCUMENTS

| | | |
|---|---|---|
| JP | 63-87048 | 4/1988 |
| JP | 1-183241 | 7/1989 |
| JP | 2001-86104 | 3/2001 |
| JP | 2001-86185 | 3/2001 |
| JP | 2002-94600 | 3/2002 |

* cited by examiner

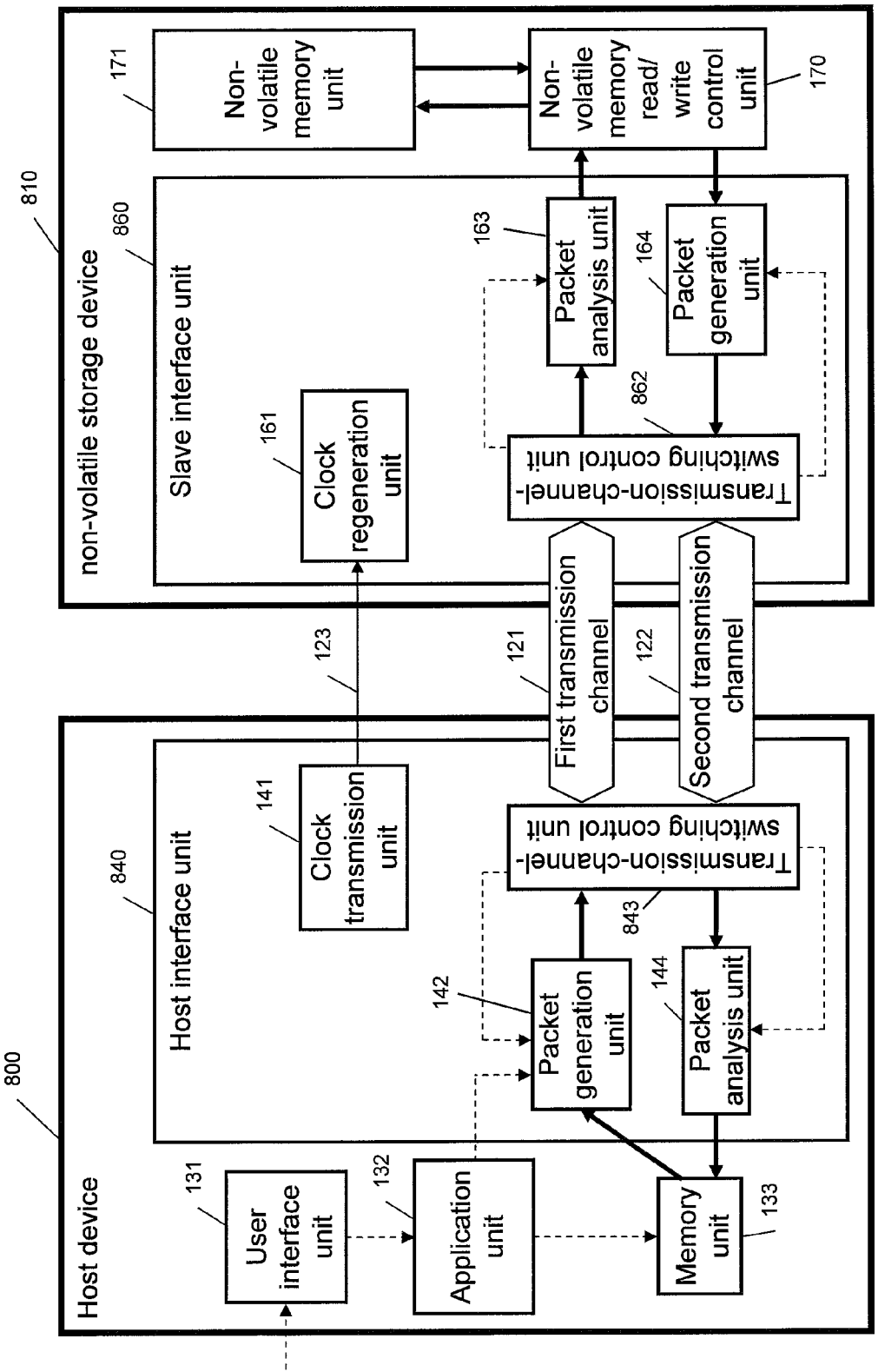

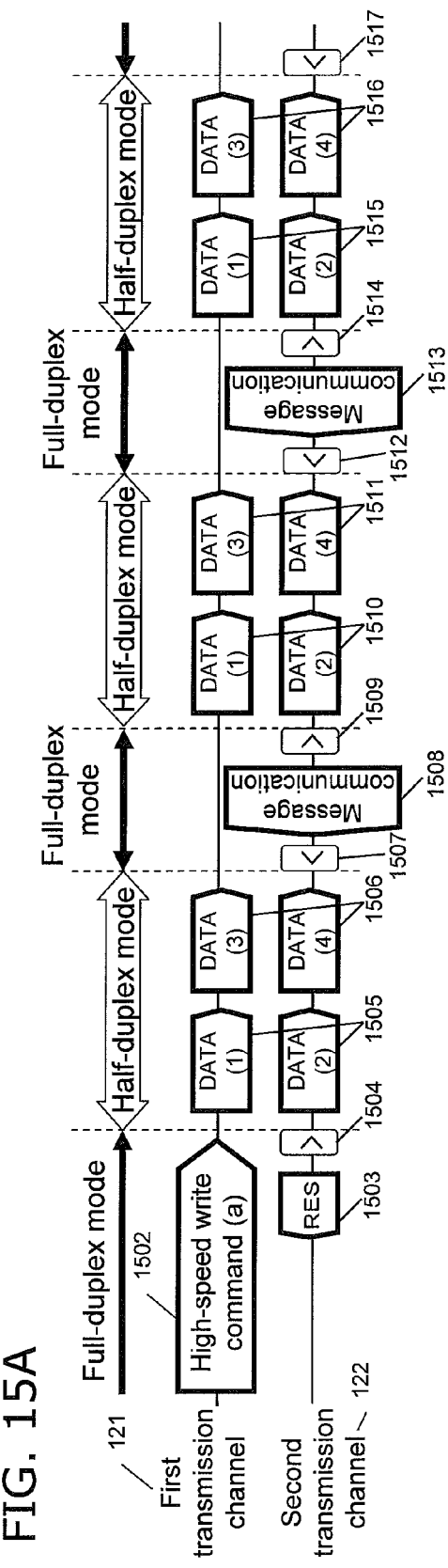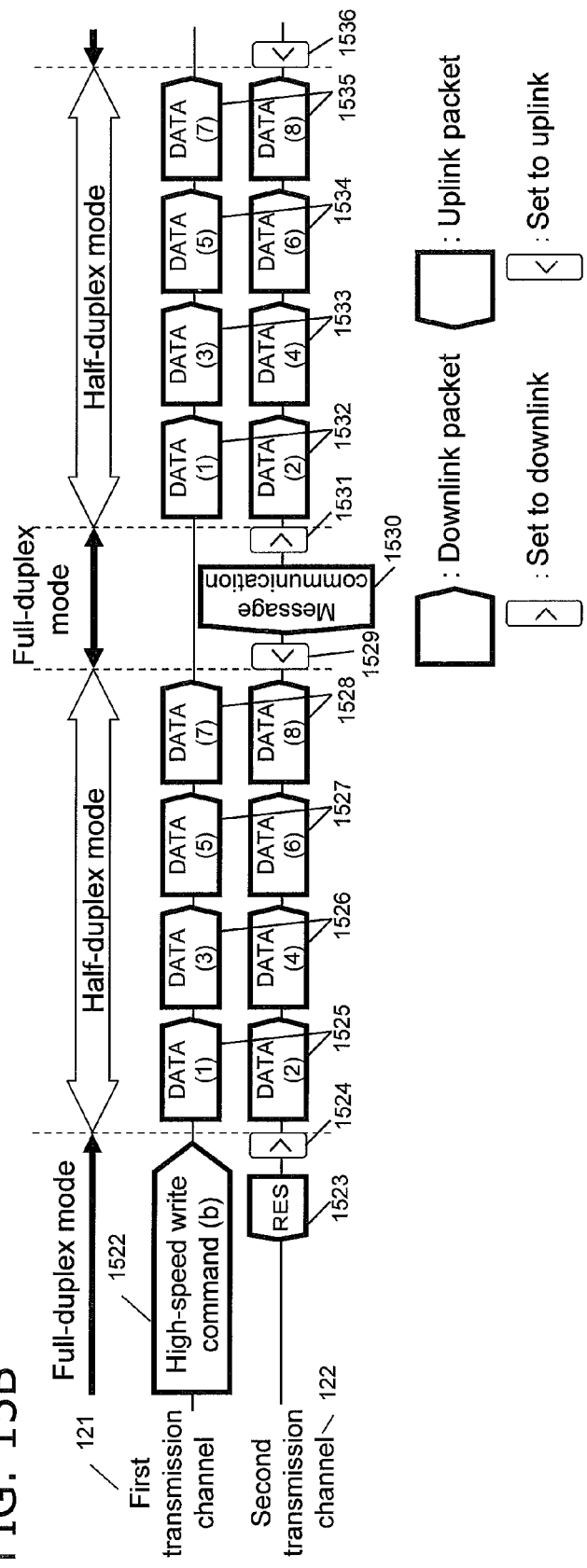

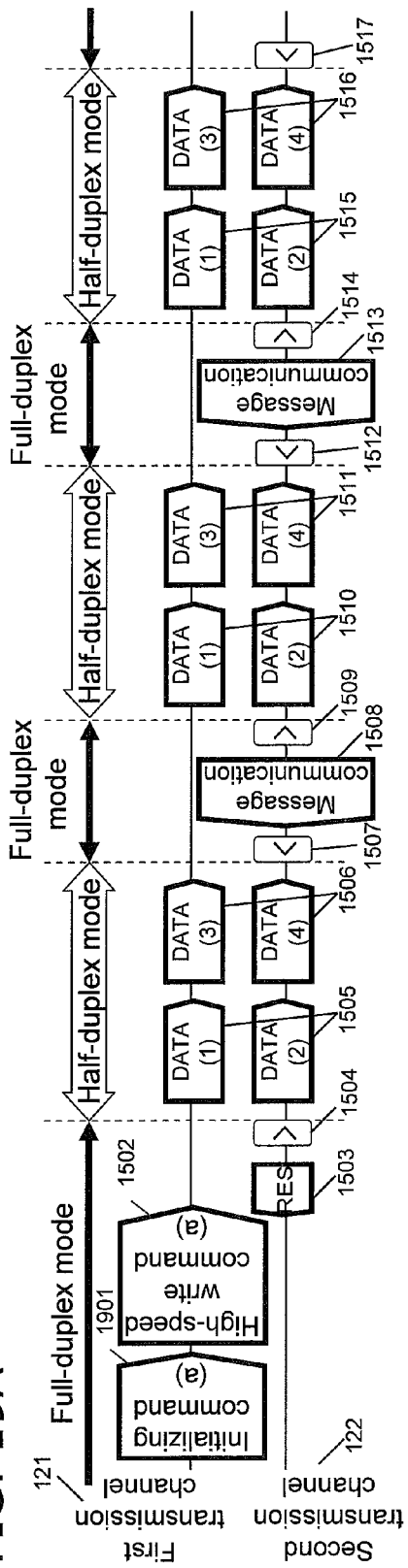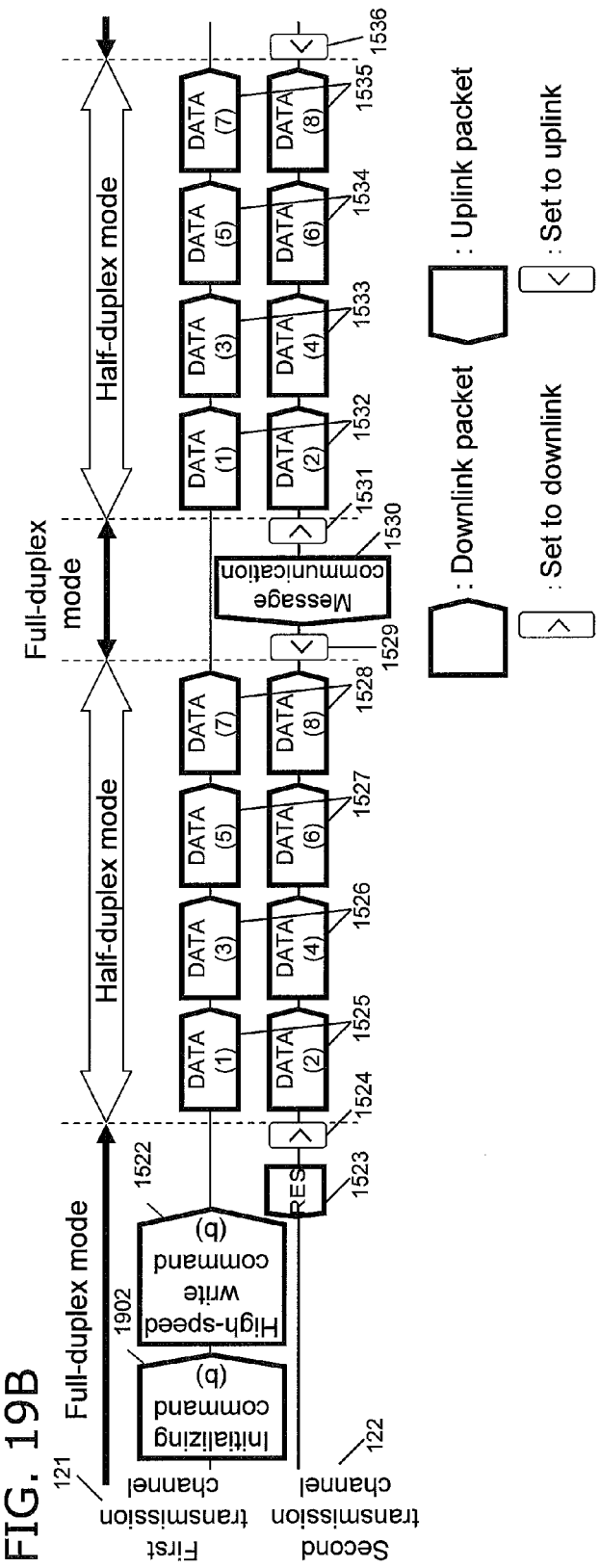

INTERFACE DEVICE, COMMUNICATIONS SYSTEM, NON-VOLATILE STORAGE DEVICE, COMMUNICATION MODE SWITCHING METHOD AND INTEGRATED CIRCUIT

BACKGROUND OF THE INVENTION

1. Technical Field

The present invention relates to an interface device, a host device including an interface device, a slave device including an interface device, a communications system including a plurality of communication devices each of which includes an interface device, and a communication method used in the communications system.

2. Background Art

Recent advances toward miniaturization and higher speed of semiconductors have increased the amount of data transmitted between devices or between large-scale integrated (LSI) circuits used in the devices. The communication speed of the devices or circuits is accordingly required to be higher. However, the number of terminals (pads) of an LSI, which affects the die size (chip area) and can increase the cost per chip (LSI), is limited severely.

To enable high-speed data communication using less LSI terminals, many communications systems employ high-speed serial communication standards, such as USB2.0, IEEE1394, and PCI Express. Communications complying with these standards include half-duplex communication and full-duplex communication. Half-duplex communication, which complies with, for example, USB2.0 or IEEE1394, requires control over the communication direction, or the transmission or reception direction, and also over the arbitration of transmission rights. Full-duplex communication, which complies with, for example, PCI Express, allows transmission and reception to be performed simultaneously using at least one transmission channel dedicated to the transmission and at least one transmission channel dedicated to the reception. In typical cases, full-duplex communication requires easier control than half-duplex communication. The problem is, however, that full-duplex communication can be less efficient when, for example, communication is performed in one direction, or more specifically when either only transmission or only reception is performed. During such one-way communication, the transmission channel for the other direction is left unused. In this manner, full-duplex communication can waste the bandwidth of the unused transmission channel.

In other technical fields including, for example, storage media used in digital still cameras and mobile telephones, non-volatile storage devices like semiconductor memory cards are in high demand, and such storage media tend to have increasingly larger capacities. The non-volatile storage device includes a flash memory, which is a non-volatile memory, a flash memory read/write control unit for controlling the flash memory, and an interface circuit via which communication with a host device, such as a digital camera or a personal computer, is performed. Via the interface circuit, the non-volatile storage device functions as a slave device that is controllable by the host device.

The amount of data transmitted between these devices has increased rapidly as, for example, digital still cameras tend to have more pixels and higher image quality. Further, single-reflex digital still cameras with high-speed continuous shooting function are also strongly required to increase their data communication speed.

Another example of the slave device is a network interface device, the use of which adds the network function to the host device. As the communication speed of the network increases, the host device and the slave device are strongly required to transmit data between them at a higher speed.

The slave device, which can be the non-volatile storage device or the network interface device, and the host device are connected to each other with a plurality of transmission channels. When, for example, the slave device is a non-volatile storage device, the transmission channels will carry digital signals representing commands and messages that are transmitted from the host device to the non-volatile storage device and digital signals representing data that has been read from the non-volatile memory or data to be written to the non-volatile memory.

When the slave device and the host device are connected to each other via two transmission channels, one transmission channel is used as a channel (a downlink channel) from the host device to the non-volatile storage device (an example of the slave device) and the other transmission channel is used as a channel (an uplink channel) from the non-volatile storage device to the host device. In full-duplex communication, both the host device and the non-volatile storage device can transmit commands or data simultaneously.

In half-duplex communication, the two transmission channels are both used as a channel (a downlink channel) from the host device to the non-volatile storage device or as a channel (an uplink channel) from the non-volatile storage device to the host device. When one device is transmitting signals using half-duplex communication, the other device can only receive but cannot transmit any signals. The communication bandwidth per direction of half-duplex communication, either downlink or uplink, is twice as large as that of full-duplex communication. Half-duplex communication is therefore advantageous when transmitting a large amount of data at a high speed in the same direction.

Half-duplex communication can be particularly advantageous for certain recording media. For example, high-speed data writing and high-speed data reading rarely occur simultaneously in non-volatile storage devices, typical examples of which are semiconductor memory cards. In most applications, only high-speed writing or only high-speed reading is performed continuously in the non-volatile storage devices. For such non-volatile storage devices, the use of half-duplex communication during the period of data transfer (during data writing or data reading) increases efficiency.

Techniques known in the art may enable efficient use of the limited bandwidth of these transmission channels (see, for example, Patent Citation 1). With such conventional techniques, half-duplex communication is performed using all the transmission channels during the period of communication performed only in one direction, or the direction of either transmission or reception. The communication mode is switched to a half-duplex communication mode by switching the direction of transmission channels used for full-duplex communication.

A conventional communications system that can switch between a full-duplex mode and a half-duplex mode will now be described with reference to FIGS. 11A and 11B.

FIGS. 11A and 11B are timing charts showing a command and data that are transmitted and received on a first transmission channel and a second transmission channel (showing a command and data transferred on external transmission channels in chorological order) in the communications system that can switch between the full-duplex mode and the half-duplex mode. The communications system includes a host device and a non-volatile storage device that are connected to each other via the two external transmission channels. More specifically, FIG. 11A is a timing chart of when the host device reads data from the non-volatile storage device in the half-duplex mode, whereas FIG. 11B is a timing chart of when data is written to the non-volatile storage device.

As shown in FIGS. 11A and 11B, the external transmission channels consist of the first and second transmission channels 1101 and 1102. In the initial status, the first transmission channel 1101 is set as a downlink channel, whereas the second transmission channel 1102 is set as an uplink channel. Clocks are provided from the host device to the non-volatile storage device via a clock transmission channel (not shown).

To meet the requirements for compactness and low cost, a non-volatile storage device, which is a typical example of a slave device, is preferably driven using clocks provided from the host device instead of having internal clocks (instead of generating clocks internally).

In FIG. 11A, the host device transmits a high-speed read command (1111) to instruct the non-volatile storage device to read data in the half-duplex mode. The high-speed read command includes an address at which data is to be read and the size of data to be read, which are multiplexed in the command.

After transmitting the high-speed read command, the host device sets an input/output terminal of the first transmission channel 1101 for the host device to an input status. The non-volatile storage device receives the high-speed read command, and sets an input/output terminal of the first transmission channel 1101 for the non-volatile storage device to an output status. This sets the first transmission channel 1101 to an uplink channel (1112).

Subsequently, the non-volatile storage device reads data having the size multiplexed in the high-speed read command from the address multiplexed in the command, and transmits the data on the first transmission channel 1101 and the second transmission channel 1102 in parallel (1113).

After transmitting and receiving the predetermined size of data, the non-volatile storage device sets the input/output terminal of the first transmission channel 1101 for the non-volatile storage device to an input status and the host device sets the input/output terminal of the first transmission channel 1101 for the host device to an output status. This returns the first transmission channel 1101 to a downlink channel (1114).

In FIG. 11B, the host device transmits a high-speed write command (1115) to instruct the non-volatile storage device to write data in the half-duplex mode. The high-speed write command includes an address at which data is to be written and the size of data to be written, which are multiplexed in the command.

After transmitting the high-speed write command, the host device sets an input/output terminal of the second transmission channel 1102 for the host device to an output status. The non-volatile storage device receives the high-speed write command, and sets an input/output terminal of the second transmission channel 1102 for the non-volatile storage device to an input status. This sets the second transmission channel 1102 to a downlink channel (1116).

Subsequently, the host device reads data having the size multiplexed in the high-speed write command from the address multiplexed in the command, and transmits the data on the first transmission channel 1101 and the second transmission channel 1102 in parallel (1117).

After completing transmission and reception of the predetermined size of data, the host device sets the input/output terminal of the second transmission channel 1102 for the host device to an input status and the non-volatile storage device sets the input/output terminal of the second transmission channel 1102 for the non-volatile storage device to an output status. This returns the second transmission channel 1102 to an uplink channel (1118).

In the manner described above, the conventional communications system, which can switch between the full-duplex mode and the half-duplex mode, enables efficient communication by switching its communication mode between the full-duplex mode and the half-duplex mode.

CITATION LIST

Patent Literature

Patent Literature 1: Japanese Unexamined Patent Publication No. 2002-94600

SUMMARY

However, the above communications system has the problems described below.

First, the first transmission channel 1101 and the second transmission channel 1102 both function as uplink channels in a period from when the first transmission channel 1101 is set to an uplink channel in response to the high-speed read command transmitted from the host device to when the first transmission channel 1101 returns to a downlink channel (1112 to 1114). During this period, no channel is usable to transmit information from the host device to the non-volatile storage device. For example, the reception buffer of the host device may be used up while the data transfer (1113) is being performed in response to the high-speed read command, and the host device may need to temporarily suspend the processing corresponding to the high-speed read command (this situation is referred to as a "wait" status). In that case, a "wait" command cannot be transmitted from the host device to the non-volatile storage device until the data transfer is completed and the first transmission channel 1101 returns to a downlink channel.

Second, when the host device transmits a high-speed write command, the first transmission channel 1101 and the second transmission channel 1102 both function as downlink channels in a period from when the second transmission channel 1102 is set to a downlink channel to when the second transmission channel 1102 returns to an uplink channel (1116 to 1118). During this period, no channel is usable to transmit information from the non-volatile storage device to the host device. The non-volatile storage device may need to temporarily suspend the processing corresponding to the high-speed write command during the data transfer (this situation is referred to as a "busy status") (1117). In that case, a "busy" message cannot be transmitted from the non-volatile storage device to the host device until the data transfer is completed and the second transmission channel 1102 returns to an uplink channel.

To solve the above problems, it is an object of the present invention to provide an interface device, a communications system, a non-volatile storage device, a communication mode switching method, and an integrated circuit that enable a command and an interrupt message to be transmitted promptly between a host device and a slave device while data is being read or being written in the half-duplex mode.

A first aspect of the present invention provides an interface device that is used in a communications system including at least a first transmission channel and a second transmission channel and transmitting and receiving a command and data using the two transmission channels. The interface device includes a first channel input/output terminal, a second channel input/output terminal, a mode-switching-condition detection unit, and a transmission-channel-switching control unit.

The first channel input/output terminal is connected to the first transmission channel and is set to at least two statuses including an input status for receiving a command and/or data and an output status for transmitting a command and/or data. The second channel input/output terminal is connected to the second transmission channel and is set to at least two statuses including an input status for receiving a command and/or data and an output status for transmitting a command and/or data. The mode-switching-condition detection unit sets a first condition and a second condition and determines whether the set first condition or the set second condition is satisfied. The first condition is a condition under which a communication mode of the communications system is to be switched from a full-duplex communication mode in which the communications system performs full-duplex communication to a half-duplex communication mode in which the communications system performs half-duplex communication. The second condition is a condition under which the communication mode is to be switched from the half-duplex communication mode to the full-duplex communication mode. The transmission-channel-switching control unit switches the communication mode from the full-duplex communication mode to the half-duplex communication mode by setting both the first channel input/output terminal and the second channel input/output terminal to an input status or to an output status when the mode-switching-condition detection unit determines that the first condition is satisfied. The transmission-channel-switching control unit switches the communication mode from the half-duplex communication mode to the full-duplex communication mode by setting one of the first channel input/output terminal and the second channel input/output terminal to an output status and setting the other one of the first channel input/output terminal and the second channel input/output terminal to an input status when the mode-switching-condition detection unit determines that the second condition is satisfied.

The interface device can temporarily set the communication mode to the full-duplex mode when a predetermined condition is satisfied during data reading or data writing performed in the half-duplex mode. The communication mode is switched to the full-duplex mode by switching the direction of the transmission channels. This enables both high-speed data transfer using the half-duplex mode and prompt processing of an interrupt request during communication performed in the half-duplex mode.

The first channel input/output terminal and the second channel input/output terminal may be set to statuses other than the above two statuses, or namely the input status and the output status. For example, the first channel input/output terminal and the second channel input/output terminal may be set to a high-impedance status (insulating status).

A second aspect of the present invention provides the interface device of the first aspect of the present invention in which the mode-switching-condition detection unit determines that the second condition is satisfied when transmission or reception of a predetermined amount of data is completed after the communication mode of the communications system is switched to the half-duplex communication mode.

The interface device inevitably returns to the full-duplex communication mode when transmission or reception of the predetermined amount of data is completed after the communication mode of the communications system is switched to the half-duplex mode. This guarantees prompt processing of an interrupt request transmitted during communication performed in the half-duplex communication mode.

A third aspect of the present invention provides the interface device of the first aspect of the present invention in which the mode-switching-condition detection unit determines that the second condition is satisfied when transmission or reception of N packets (N is a natural number) is completed after the communication mode of the communications system is switched to the half-duplex communication mode.

The interface device inevitably returns to the full-duplex communication mode when transmission or reception of N packets (N is a natural number) is completed after the communication mode of the communications system is switched to the half-duplex mode. This guarantees prompt processing of an interrupt request transmitted during communication performed in the half-duplex communication mode. Further, the interface device enables the timing at which the communication mode is switched to be determined simply by counting the number of transmitted and received packets.

A fourth aspect of the present invention provides the interface device of one of the first to third aspects of the present invention in which the transmission-channel-switching control unit provides information about the second condition to a communication target using a data transmission and reception request carrying the information about the second condition or a data transmission and reception command carrying the information about the second condition.

This enables the information about the second condition to be provided to the communication target easily as well as in a reliable manner. The data transmission and reception request or the data transmission and reception command may be transmitted using a packet defined in advance.

A fifth aspect of the present invention provides the interface device of one of the first to fourth aspects of the present invention in which the transmission-channel-switching control unit transmits during initial setting of the interface device a packet that provides information about the second condition to a communication target and/or that causes the communication target to set the second condition.

This enables the information about the second condition (condition under which the communication mode is to be switched from the half-duplex mode to the full-duplex mode) to be provided to the communication target and/or the communication target to set the second condition during initialization of the interface device. This eliminates the need for additional communication for setting the second condition during operation of the communications system.

The term "during initialization of the interface device" refers to, for example, the timing when the interface device is started, the timing when the interface device becomes activated, or the timing when the interface device is powered on.

A sixth aspect of the present invention provides the interface device of one of the first, second, third, and fifth aspects of the present invention in which the number N of transmitted or received packets used to determine whether the second condition is satisfied is determined in accordance with a buffer size of the communications system.

This enables the communications system to perform high-speed data transfer in an appropriate manner.

The packet number N may be determined, for example, in the manner described below.

The communications system may include a host device including the interface device and a slave device including the interface device. In this communications system, the interface device included in the host device may have a buffer size Buf1 [byte], the interface device included in the slave device may have a buffer size Buf2 [byte], and a packet transmitted between the host device and the slave device may be have a size A [byte]. In this case, the packet number N can be determined using the formulas below:

When Buf1>Buf2, (1)

$N=\mathrm{Int}(\mathrm{Buf2}/A)$, and

When Buf1≦Buf2, (2)

$N=\mathrm{Int}(\mathrm{Buf1}/A)$.

In the formulas, Int(X) is a maximum integer not exceeding X (Int(X) is a function corresponding to a Gauss operation).

Alternatively, the packet number N may be determined based on the processing performance of the host device and the slave device. More specifically, in this case, the packet number N is determined based on the processing performance of the device having a smaller buffer size. This maximizes the communication performance of the communications system.

Alternatively, the packet number N may be determined based on the processing speed of the host device and the slave device. In one example, the host device may have a processing speed P1 and an operating clock C1, the slave device may have a processing speed P2 and an operating clock C2, and a communication packet may have a packet size A. In this case, the packet number N may be determined based on all or some of P1, P2, C1, C2, and A. The processing speed of the host device and the non-volatile storage device is determined based on all or some of the processing capacity of the processor mounted on the host device or the slave device, the speed at which data is read from or written to a recording medium mounted on the host device or the slave device, such as a RAM or a flash memory, and the transmission speed of the external transmission channels via which the host device or the slave device communicates with the external device.

A seventh aspect of the present invention provides the interface device of one of the first to sixth aspects of the present invention in which the mode-switching-condition detection unit determines that the first condition is satisfied when a predetermined time elapses after the communication mode of the communications system is switched to the full-duplex communication mode.

The interface device returns to the half-duplex communication mode when a predetermined time elapses after the communication mode of the communications system is switched to the full-duplex communication mode. This enables high-speed data communication performed using the half-duplex communication mode to be resumed promptly after an interrupt request or the like is processed completely.

An eighth aspect of the present invention provides the interface device of one of the first to seventh aspects of the present invention in which the transmission-channel-switching control unit transmits during initial setting of the interface device a packet that provides information about the first condition to a communication target and/or that causes the communication target to set the first condition.

This enables the information about the first condition (condition under which the communication mode is to be switched from the full-duplex mode to the half-duplex mode) to be provided to the communication target and/or the communication target to set the first condition during initialization of the interface device. This eliminates the need for additional communication for setting the first condition during operation of the communications system.

A ninth aspect of the present invention provides the interface device of one of the first to seventh aspects of the present invention in which the mode-switching-condition detection unit determines that the first condition is satisfied when receiving an interface-switching requesting command after the communication mode of the communications system is switched to the full-duplex communication mode.

The interface device returns to the half-duplex communication mode when receiving an interface-switching requesting command after the communication mode of the communications system is switched to the full-duplex communication mode. This enables high-speed data communication performed using the half-duplex communication mode to be resumed promptly after an interrupt request or the like is processed completely. The interface device switches the communication mode when receiving an interface-switching requesting command, and eliminates the need for timing at the transmission side and the reception side (performed using, for example, a clock counter).

A tenth aspect of the present invention provides the interface device of one of the first to seventh aspects of the present invention in which the mode-switching-condition detection unit determines that the first condition is satisfied when transmitting an interface-switching requesting command after the communication mode of the communications system is switched to the full-duplex communication mode.

The interface device returns to the half-duplex communication mode when transmitting an interface-switching requesting command after the communication mode of the communications system is switched to the full-duplex communication mode. This enables high-speed data communication performed using the half-duplex communication mode to be resumed promptly after an interrupt request or the like is processed completely. The interface device switches the communication mode when transmitting an interface-switching requesting command, and eliminates the need for timing at the transmission side and the reception side (performed using, for example, a clock counter). Controlling the timing at which an interface-switching requesting command is transmitted will further enable communication to be performed in the full-duplex communication mode for a predetermined period. This increases the efficiency of communication.

An eleventh aspect of the present invention provides the interface device of one of the first to sixth aspects of the present invention in which the transmission-channel-switching control unit waits in the full-duplex communication mode when receiving an interrupt message associated with a wait command after switching to the full-duplex communication mode, and switches to the half-duplex communication mode when receiving a message indicating completion of interrupt processing transmitted after interrupt processing corresponding to the received interrupt message associated with the wait command is completed.

The interface device enables the full-duplex mode to be maintained in a reliable manner in a period from when receiving the interrupt message associated with the wait command (a wait notification message packet for example) to when receiving the message indicating completion of the interrupt processing (a wait release message packet for example). Further, the interface device is only required to maintain the communication mode while waiting, and eliminates the need for performing unnecessary communication (transmitting or receiving any unnecessary packet) (for example, eliminates the need for determining the status of the communication target in predetermined cycles using polling).

A twelfth aspect of the present invention provides the interface device of one of the first to sixth aspects of the present invention in which the transmission-channel-switching control unit switches to the half-duplex communication mode when receiving no interrupt message associated with a wait command within a predetermined time after switching to the full-duplex communication mode.

The interface device enables the full-duplex mode to be maintained in a reliable manner in a period from when receiving the interrupt message associated with the wait command (a wait notification message packet for example) to when the predetermined time elapses. Further, the interface device is only required to maintain the communication mode while waiting, and eliminates the need for performing unnecessary communication (transmitting or receiving any unnecessary packet) (for example, eliminates the need for determining the status of the communication target in predetermined cycles using polling).

It is preferable that the interface device switch the communication mode to the half-duplex communication mode immediately when the predetermined time elapses without receiving the interrupt message associated with the wait command.

A thirteenth aspect of the present invention provides a non-volatile storage device including a non-volatile memory, a non-volatile memory control unit that executes control for reading from and writing to the non-volatile memory, and the interface device according to one of the first to twelfth aspects of the present invention.

The non-volatile storage device (for example, an SD card) has the same advantageous effects as the interface device of one of the first to twelfth aspects of the present invention.

A fourteenth aspect of the present invention provides a communication device including an external communication unit that communicates with an external unit, an external communication control unit that controls the external communication unit, and the interface device according to one of the first to twelfth aspects of the present invention.

A fifteenth aspect of the present invention provides a communications system including a host device including the interface device according to one of the thirteenth and fourteenth aspects of the present invention, and a slave device including the interface device according to one of the first to eighth aspects of the present invention.

The communications system has the same advantageous effects as the interface device of one of the first to eighth aspects of the present invention. The host device and the slave device may be included in a single apparatus, and may be connected to each other via an internal bus. In this case, the devices included in, for example, a portable terminal, have the same advantageous effects as the interface device of one of the first to eighth aspects of the present invention.

A sixteenth aspect of the present invention provides a communication mode switching method used in a communications system including at least a first transmission channel and a second transmission channel and transmitting and receiving a command and data using the two transmission channels. The method includes a mode-switching-condition detection process and a transmission-channel-switching control process.

In the mode-switching-condition detection process, a first condition and a second condition are set, and determination is performed as to whether the set first condition or the set second condition is satisfied. The first condition is a condition under which a communication mode of the communications system is to be switched from a full-duplex communication mode in which the communications system performs full-duplex communication to a half-duplex communication mode in which the communications system performs half-duplex communication. The second condition is a condition under which the communication mode is to be switched from the half-duplex communication mode to the full-duplex communication mode. In the transmission-channel-switching control process, the communication mode is switched from the full-duplex communication mode to the half-duplex communication mode when the first condition is determined to be satisfied in the mode-switching-condition detection process, and the communication mode is switched from the half-duplex communication mode to the full-duplex communication mode when the second condition is determined to be satisfied in the mode-switching-condition detection process.

The communication mode switching method enables the communication mode to be temporarily set to the full-duplex mode when a predetermined condition is satisfied during data reading or data writing performed in the half-duplex mode. The communication mode is switched to the full-duplex mode by switching the direction of the transmission channels. This enables both high-speed data transfer using the half-duplex mode and prompt processing of an interrupt request during communication performed in the half-duplex mode.

A seventeenth aspect of the present invention provides an integrated circuit that is used in an interface device included in a communications system including at least a first transmission channel and a second transmission channel and transmitting and receiving a command and data using the two transmission channels. The interface device includes a first channel input/output terminal that is connected to the first transmission channel and is set to at least two statuses including an input status for receiving a command and/or data and an output status for transmitting a command and/or data, and a second channel input/output terminal that is connected to the second transmission channel and is set to at least two statuses including an input status for receiving a command and/or data and an output status for transmitting a command and/or data. The integrated circuit of the seventeenth aspect of the present invention includes a mode-switching-condition detection unit and a transmission-channel-switching control unit.

The mode-switching-condition detection unit sets a first condition and a second condition and determines whether the set first condition or the set second condition is satisfied. The first condition is a condition under which a communication mode of the communications system is to be switched from a full-duplex communication mode in which the communications system performs full-duplex communication to a half-duplex communication mode in which the communications system performs half-duplex communication. The second condition is a condition under which the communication mode is to be switched from the half-duplex communication mode to the full-duplex communication mode. The transmission-channel-switching control unit switches the communication mode from the full-duplex communication mode to the half-duplex communication mode by setting both the first channel input/output terminal and the second channel input/output terminal to an input status or to an output status when the mode-switching-condition detection unit determines that the first condition is satisfied. The transmission-channel-switching control unit switches the communication mode from the half-duplex communication mode to the full-duplex communication mode by setting one of the first channel input/output terminal and the second channel input/output terminal to an output status and setting the other one of the first channel input/output terminal and the second channel input/output terminal to an input status when the mode-switching-condition detection unit determines that the second condition is satisfied.

The integrated circuit has the same advantageous effects as the interface device of the first aspect of the present invention.

An eighteenth aspect of the present invention provides an interface device that is used in a communications system including a low-speed transmission channel and a plurality of high-speed transmission channels and transmitting and receiving a command and data using the low-speed transmission channel or the plurality of high-speed transmission channels. The interface device includes a low-speed channel input/output terminal, a plurality of high-speed channel input/output terminals, and a transmission-channel-switching control unit.

The low-speed channel input/output terminal is connected to the low-speed transmission channel and is set to at least two statuses including an input status for receiving a command and/or data and an output status for transmitting a command and/or data. The plurality of high-speed channel input/output terminals are connected to the high-speed transmission channels and are set to at least two statuses including an input status for receiving a command and/or data and an output status for transmitting a command and/or data.

The transmission-channel-switching control unit sets an input status and an output status of the low-speed channel input/output terminal and the plurality of high-speed channel input/output terminals independently of each other, and sets the input status and the output status of the low-speed channel input/output terminal and the plurality of high-speed channel input/output terminals based on three modes below:

(1) a full-duplex communication mode in which at least one of the plurality of high-speed channel input/output terminals is set to an output status and the high-speed channel input/output terminals other than the at least one high-speed channel input/output terminals set in the output status are set to an input status;

(2) a half-duplex output mode in which all the high-speed channel input/output terminals are set to an output status; and (3) a half-duplex input mode in which all the high-speed channel input/output terminals are set to an input status.

The transmission-channel-switching control unit sets the low-speed channel input/output terminal to an input status in the half-duplex output mode, and sets the low-speed channel input/output terminal to an output status in the half-duplex input mode.

The interface device sets the communication direction of the low-speed transmission channel to a direction inverse to the communication direction of the half-duplex communication when half-duplex communication is being performed using the plurality of high-speed transmission channels. The interface device therefore enables interrupt processing to be performed in a reliable manner during half-duplex communication performed using the plurality of high-speed transmission channels. As a result, the interface device enables both high-speed data transfer (high-speed data transfer using the half-duplex mode) and prompt processing of an interrupt request during communication performed in the half-duplex mode.

A nineteenth aspect of the present invention provides the interface device of the eighteenth aspect of the present invention in which the low-speed channel input/output terminal is an input/output terminal for communication performed using single-ended signaling, and at least one of the plurality of high-speed channel input/output terminals is an input/output terminal for communication performed using differential signaling.

The interface device uses differential signaling on the plurality of high-speed channel input/output terminals, which are used as a plurality of high-speed transmission channels requiring a high communication speed, and uses single-ended signaling on the low-speed channel input/output terminal, which is used as a low-speed transmission channel that does not require a high communication speed. This enables both appropriate interrupt processing and high-speed data transfer to be performed while preventing the circuit scale of the interface device from increasing.

A twentieth aspect of the present invention provides a non-volatile storage device including a non-volatile memory, a non-volatile memory control unit that executes control for reading from and writing to the non-volatile memory, and the interface device according to one of the eighteenth and nineteenth aspects of the present invention.

A twenty first aspect of the present invention provides a communication device including an external communication unit that communicates with an external unit, an external communication control unit that controls the external communication unit, and the interface device according to one of the eighteenth and nineteenth aspects of the present invention.

A twenty second aspect of the present invention provides a communications system including a host device including the interface device according to one of the eighteenth and nineteenth aspects of the present invention, and a slave device including the interface device according to one of the eighteenth and nineteenth aspects of the present invention.

The present invention enables high-speed data transfer using the half-duplex mode and prompt transmission of an interrupt request during communication performed in the half-duplex mode by switching the direction of transmission channels and temporarily entering the full-duplex mode when a predetermined condition is satisfied during data reading or data writing performed by the host device and the slave device in the half-duplex mode.

BRIEF DESCRIPTION OF DRAWINGS

FIG. 8 is a block diagram showing a structure according to a third embodiment of the present invention.

FIGS. 15A and 15B are timing charts showing packets that are transferred on transmission channels in chronological order during high-speed data writing in the first embodiment.

FIGS. 19A and 19B are timing charts showing packets that are transferred on transmission channels in chronological order during high-speed data writing in the first embodiment.

Figure 1:
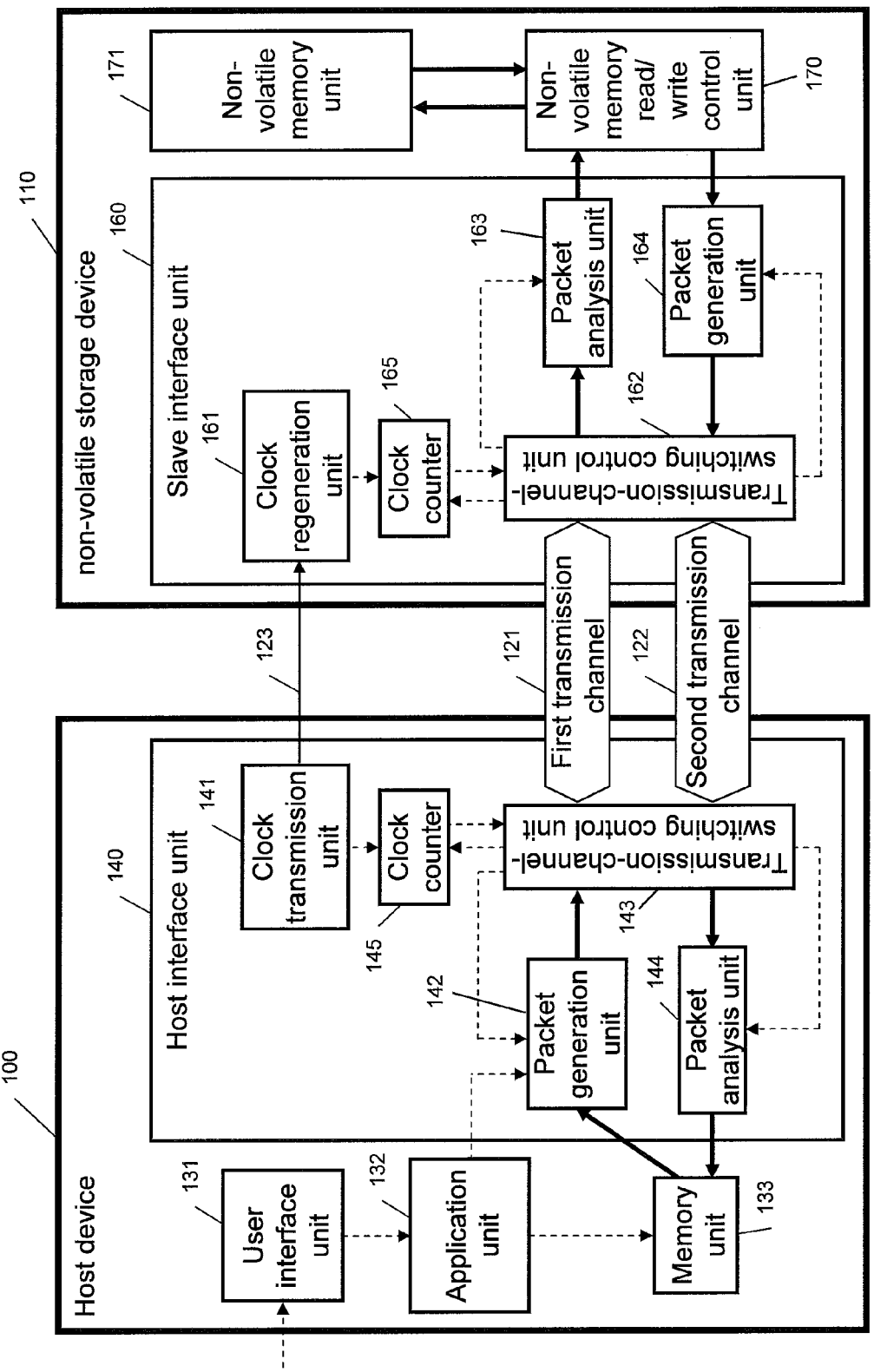
FIG. 1 is a block diagram showing a structure according to a first embodiment of the present invention.

REFERENCE SIGNS LIST 1, 1A, 2, 3, 4 communications system
100, 100A host device
110, 110A non-volatile storage device (slave device)
121 first transmission channel
122 second transmission channel
123 clock transmission channel (third transmission channel)
131 user interface unit
132 application unit
133 memory
140, 140A host interface unit
141, 141A clock transmission unit
142, 142A packet generation unit
143, 143A transmission-channel-switching control unit
144, 144A packet analysis unit
145 clock counter
160, 160A slave interface unit
161, 161A clock regeneration unit
162, 162A transmission-channel-switching control unit
163, 163A packet analysis unit
164, 164A packet generation unit
165 clock counter
170 non-volatile memory read/write control unit
171 non-volatile memory
240 switching condition detection unit
241, 242 input/output terminal
260 switching condition detection unit
261, 262 input/output terminal
410 network interface device
470 network interface unit
480 remote device
481 network communication channel
500 host device
510 non-volatile storage device
540 host interface unit
543 transmission-channel-switching control unit
560 slave interface unit
562 transmission-channel-switching control unit
640 switching condition detection unit
641, 642 input/output terminal
660 switching condition detection unit
661, 662 input/output terminal
800 host device
810 non-volatile storage device
840 host interface unit
843 transmission-channel-switching control unit
860 slave interface unit
862 transmission-channel-switching control unit
940 switching condition detection unit
941, 942 input/output terminal
960 switching condition detection unit
961, 962 input/output terminal

DETAILED DESCRIPTION

Embodiments of the present invention will now be described with reference to the drawings. In each embodiment, components with the reference numerals as the components described in the preceding embodiments will not be described.

First Embodiment 1.1 Structure of Communications System

FIG. 1 is a block diagram showing the structure of a communications system 1 according to a first embodiment of the present invention.

As shown in FIG. 1, the communications system 1 includes a host device 100 and a non-volatile storage device 110, which is an example of a slave device. The host device 100 and the non-volatile storage device 110 are connected to each other with a first transmission channel 121, a second transmission channel 122, and a clock transmission channel 123.

The host device 100 includes at least a user interface unit 131, an application unit 132, a memory unit 133, and a host interface unit 140.

The host interface unit 140 includes a clock transmission unit 141, a packet generation unit 142, a transmission-channel-switching control unit 143, a packet analysis unit 144, and a clock counter 145.

The non-volatile storage device 110 includes at least a slave interface unit 160, a non-volatile memory read/write control unit 170, and a non-volatile memory unit 171.

The slave interface unit 160 includes a clock regeneration unit 161, a transmission-channel-switching control unit 162, a packet analysis unit 163, a packet generation unit 164, and a clock counter 165.

Each of the packet generation units 142 and 164 and the packet analysis units 144 and 163 includes a buffer with an appropriate size.

Figure 2A:
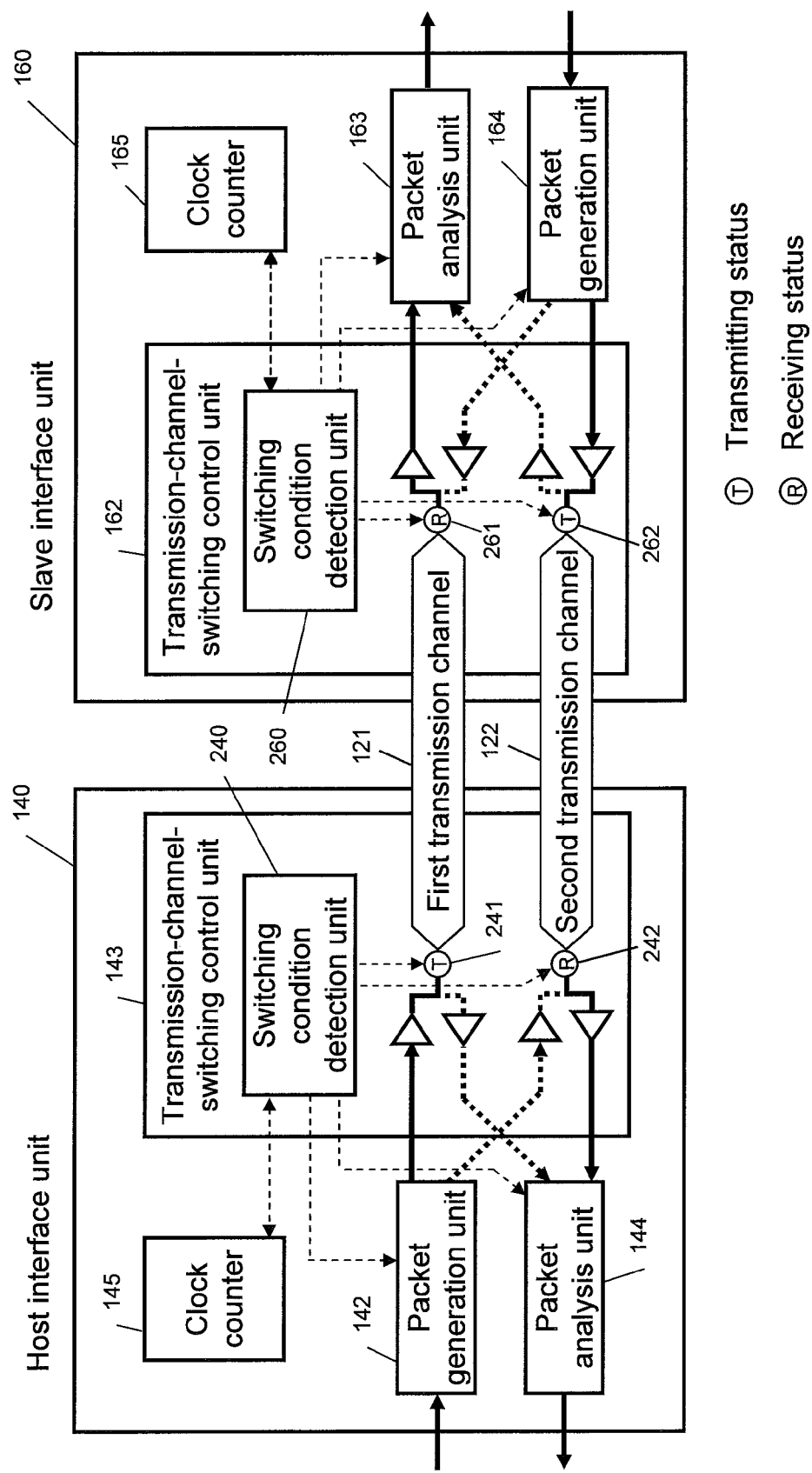
FIGS. 2A to 2C are block diagrams showing a detailed structure of a transmission-channel-switching control unit in the first embodiment.
Figure 2B:
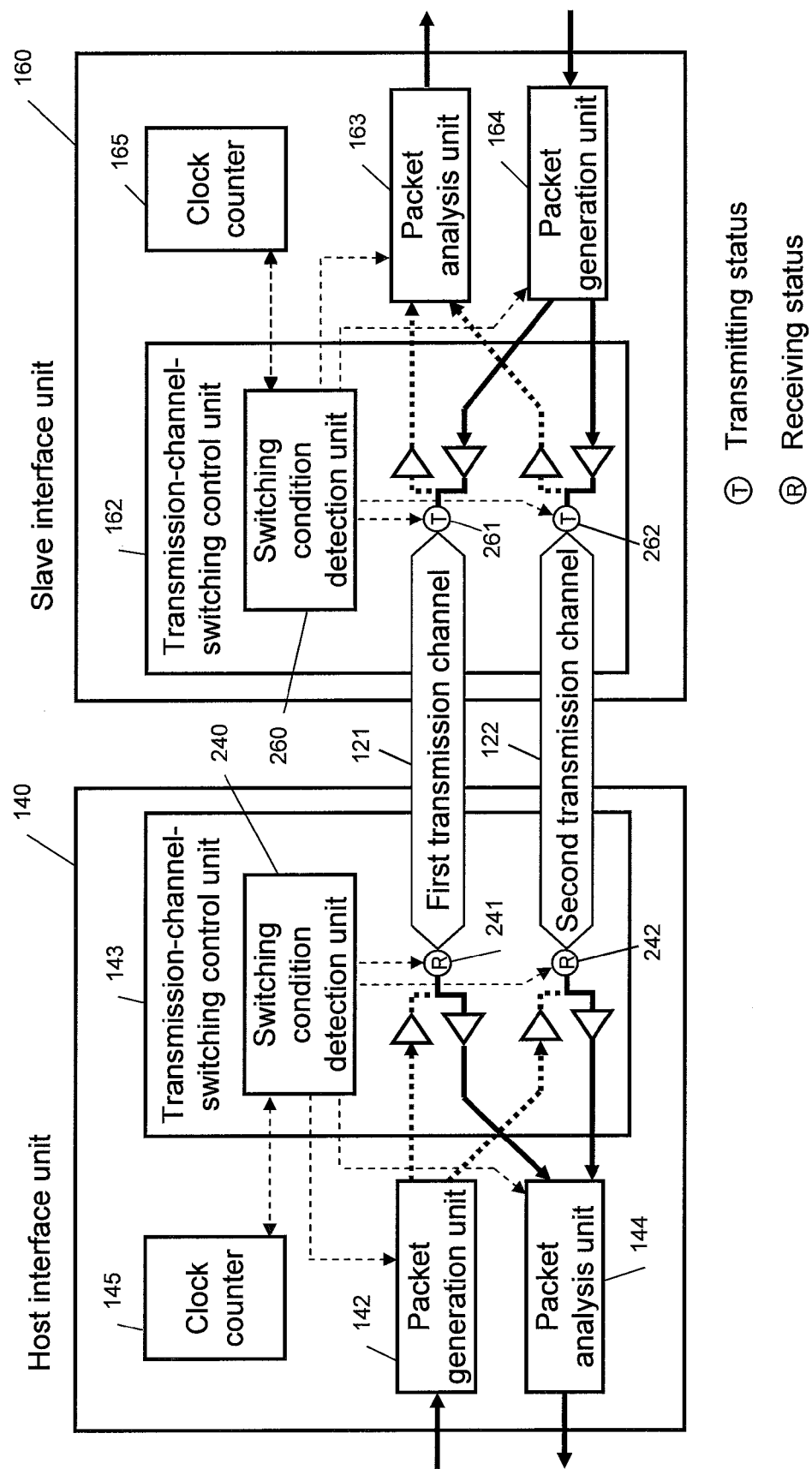
Figure 2C:
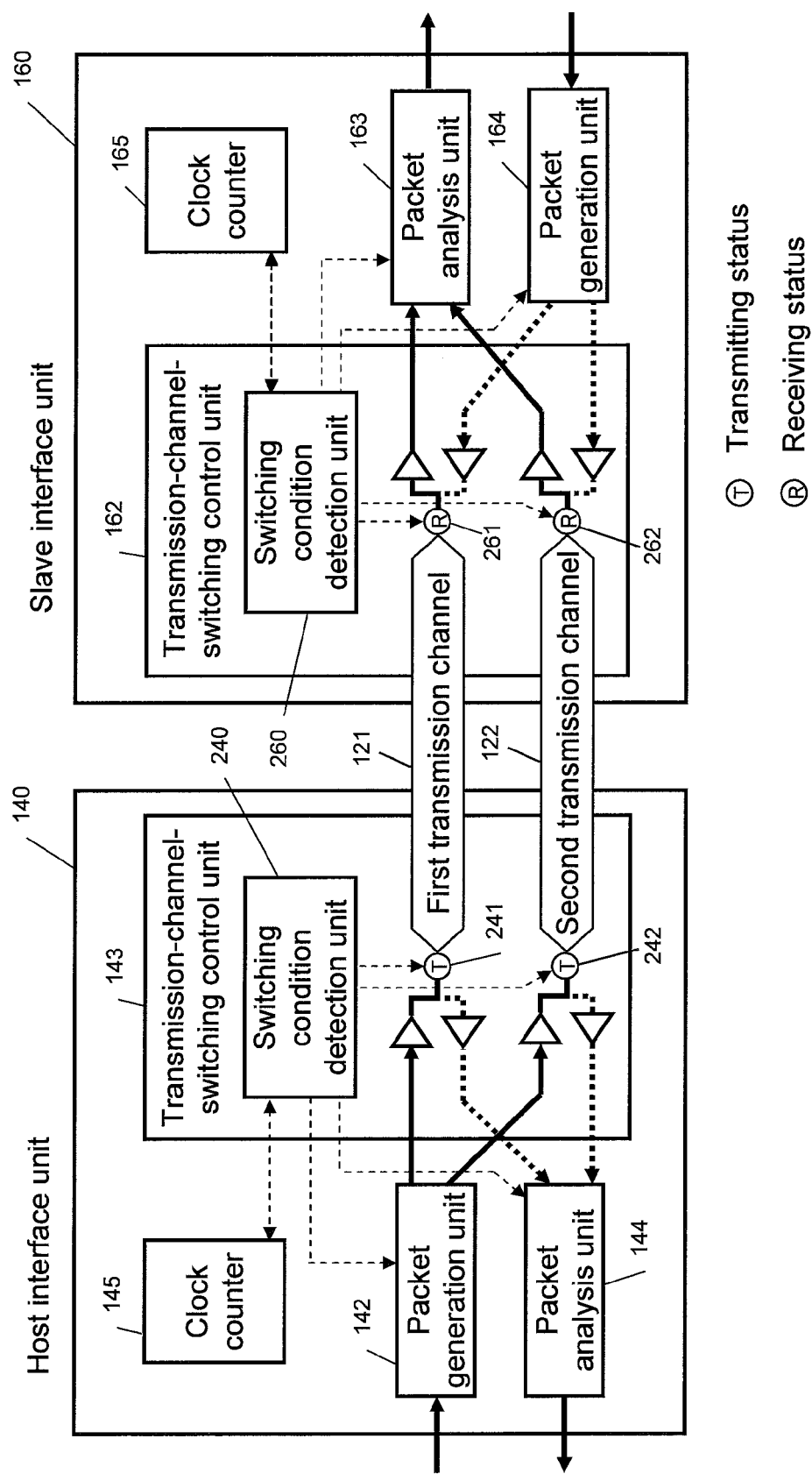

FIGS. 2A to 2C show the structure of the host interface unit 140 and the slave interface unit 160. In particular, FIGS. 2A to 2C show in detail the structure of the transmission-channel-switching control unit 143 included in the host device and the transmission-channel-switching control unit 162 included in the slave device.

As shown in FIGS. 2A to 2C, the transmission-channel-switching control unit 143 in the host device includes a switching condition detection unit 240 of the host interface unit 140, an input/output terminal 241 of the first transmission channel 121 included in the host interface unit 140, and an input/output terminal 242 of the second transmission channel 122 included in the host interface unit 140.

The transmission-channel-switching control unit 162 in the slave device includes a switching condition detection unit 260 of the slave interface unit 160, an input/output terminal 261 of the first transmission channel 121 included in the slave interface unit 160, and an input/output terminal 262 of the second transmission channel 122 included in the slave interface unit 160.

The switching condition detection unit 240 in the host device monitors the status of the packet generation unit 142, the packet analysis unit 144, and the clock counter 145, and determines whether the switching condition is satisfied. The switching condition detection unit 240 then sets the input/output terminals 241 and 242 to a transmitting status or a receiving status depending on whether the switching condition is satisfied.

In the same manner, the switching condition detection unit 260 in the slave device monitors the status of the packet analysis unit 163, the packet generation unit 164, and the clock counter 165, and determines whether the switching condition is satisfied. The switching condition detection unit 260 then sets the input/output terminals 261 and 262 to a transmitting status or a receiving status depending on whether the switching condition is satisfied.

In FIG. 2A, the input/output terminal 241 of the first transmission channel 121 included in the host interface unit 140 is set in the transmitting status (T), and the input/output terminal 261 of the first transmission channel 121 included in the slave interface unit 160 is set in the receiving status (R). The input/output terminal 242 of the second transmission channel 122 included in the host interface unit 140 is set in the receiving status (R), and the input/output terminal 262 of the second transmission channel 122 included in the slave interface unit 160 is set in the transmitting status (T).

In this case, the communication direction of the first transmission channel 121 is from the host interface unit 140 to the slave interface unit 160 (downlink), and the communication direction of the second transmission channel 122 is from the slave interface unit 160 to the host interface unit 140 (uplink). In FIG. 2A, the first transmission channel 121 and the second transmission channel 122 in the communications system 1 have communication directions that are different from each other. In this communications system 1, both the host interface unit 140 and the slave interface unit 160 can transmit data to each other simultaneously. More specifically, FIG. 2A shows the communications system 1 set in a full-duplex mode.

In FIG. 2B, the input/output terminals 241 and 242 of the first transmission channel 121 and the second transmission channel 122 included in the host interface unit 140 are both set in the receiving status (R), and the input/output terminals 261 and 262 of the first transmission channel 121 and the second transmission channel 122 included in the slave interface unit 160 are both set in the transmitting status (T). The first transmission channel 121 and the second transmission channel 122 have the same communication direction (uplink). In FIG. 2C, the first transmission channel 121 and the second transmission channel 122 also have the same communication direction (downlink).

More specifically, FIGS. 2B and 2C show the communications system 1 set in a half-duplex mode. In this case, the communications system 1 can transmit data with a bandwidth twice as large as the bandwidth of data transmitted in the full-duplex mode.

1.2 Operation of Communications System

FIGS. 3A and 3B and FIGS. 12A and 12B are timing charts showing packets that are transferred on the first transmission channel 121 and the second transmission channel 122 in chronological order in the first embodiment.

The operation of the communications system 1 according to the present embodiment will now be described with reference to FIG. 1, FIGS. 3A and 3B, FIGS. 12A and 12B, and FIGS. 15 to 21.

When the non-volatile storage device 110 is mounted onto the host device 100, the host interface unit 140 becomes activated. Clocks are provided from the clock transmission unit 141 included in the host interface unit 140 to the clock regeneration unit 161 included in the slave interface unit 160 via the clock transmission channel 123, and the slave interface unit 160 becomes activated. Clocks are generated in the clock regeneration unit 161 and are provided to the entire non-volatile storage device 110 or to a part of the non-volatile storage device 110.

The packet generation unit 142 first generates an initializing command packet. The initializing command will be described later.

Figure 17:
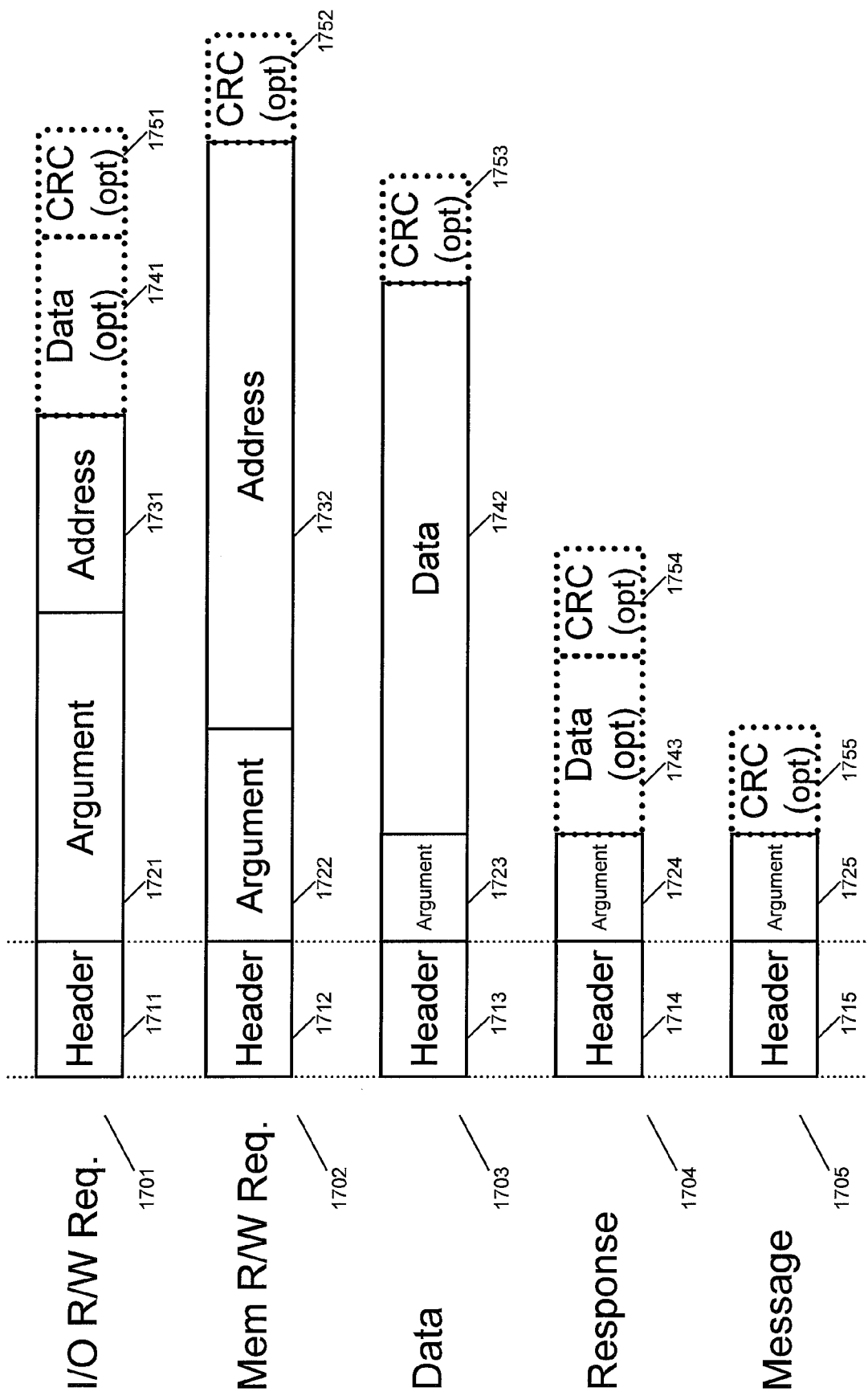
FIG. 17 shows the structure of each packet used in the first embodiment.

The packet generation unit 142 and the packet generation unit 164 generate packets including, for example, various request packets, a data packet, a response packet, and a message packet shown in FIG. 17. The packet analysis unit 144 and the packet analysis unit 163 then analyze the packets including, for example, the request packets, the data packet, the response packet, and the message packet shown in FIG. 17.

An I/O R/W request packet 1701 has the structure shown in FIG. 17. The I/O R/W request packet 1701 carries a request for reading or writing in an I/O space in which control registers and status registers may be mapped.

Figure 21:
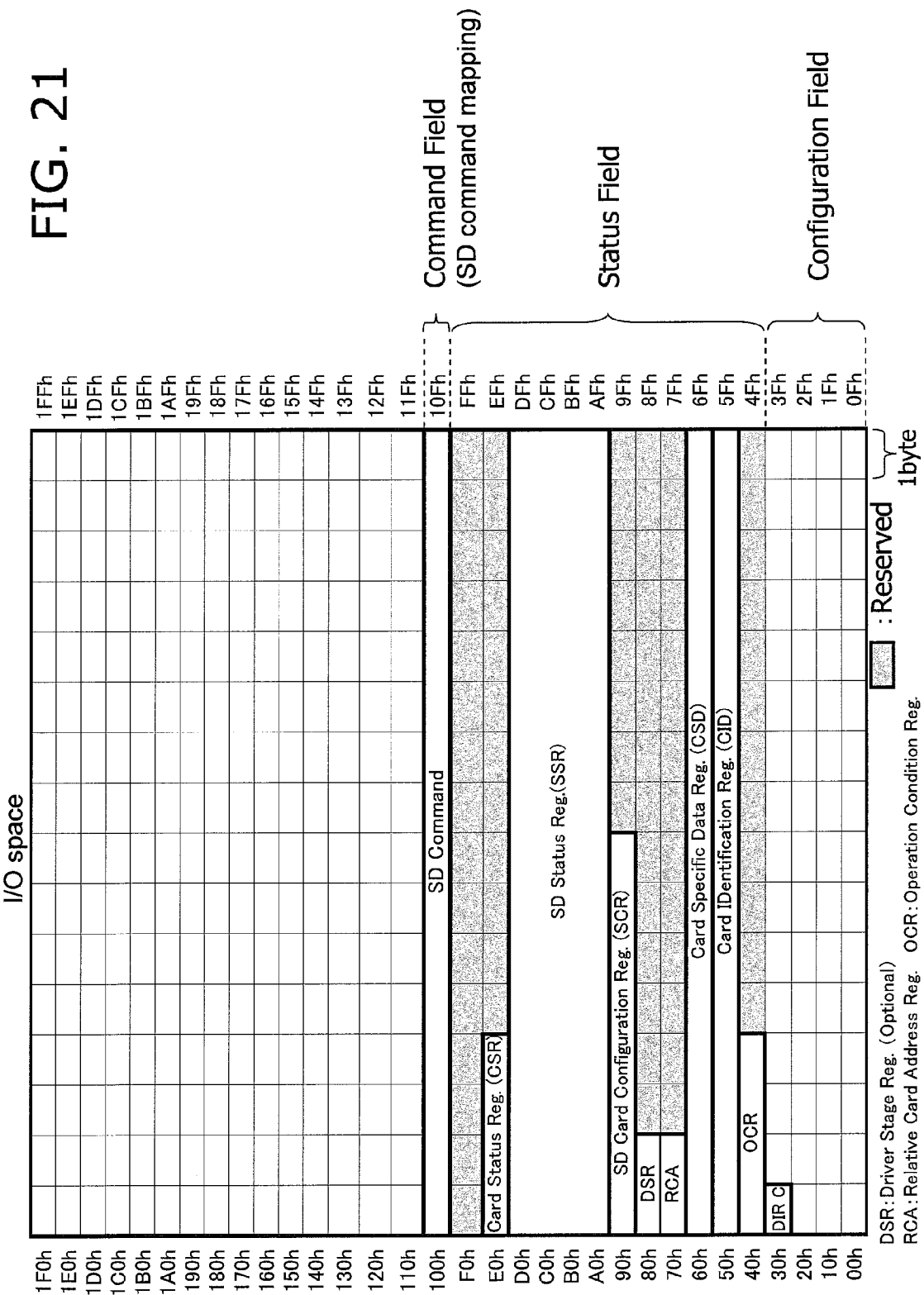
FIG. 21 shows an I/O space in the first embodiment.

FIG. 21 shows an example of the I/O space used in the communications system 1.

In the I/O space shown in FIG. 21, recording elements, such as 1-byte (=8-bit) registers or memories, are allocated to addresses from 000(h) to 1FF(h) (in which (h) hereafter indicates that the notation is hexadecimal). The I/O space defined in this example corresponds to 512 bytes.

The I/O space is included (defined) in each of the host device 100 and the non-volatile storage device 110. The I/O space of each of the host device 100 and the non-volatile storage device 110 stores unique information (information stored only in the host device 100 or only in the non-volatile storage device) and information common to the host device 100 and the non-volatile storage device 110.

FIG. 17 shows an example of the packet structure of a memory R/W request packet 1702, a data packet 1703, a response packet 1704, and a message packet 1705. These packets will now be described.

The memory R/W request packet 1702 carries a request for reading and writing in a memory space. Based on this request, data is read from the non-volatile memory unit 171 included in the non-volatile storage device 110 or data is written to the non-volatile memory unit 171.

The data packet 1703 carries data that has been read from the non-volatile memory unit 171 based on the request for reading data from the non-volatile memory unit 171, which is carried by the memory R/W request packet. The data packet 1703 transmits, to the non-volatile memory unit 171, data to be written to the non-volatile memory unit 171 based on the request for writing data to the non-volatile memory unit 171, which is carried by the memory R/W request packet.

The response packet 1704 carries a response to each request packet (to the I/O R/W request packet or to the memory R/W request packet).

The message packet 1705 mainly carries an event, such as an interrupt, an event associated with a busy status, or an event associated with a wait status.

As shown in FIG. 17, the packets 1701 to 1705 include headers 1711 to 1715, which are added at the beginnings of the packets to store information common to each packet.

Figure 18:
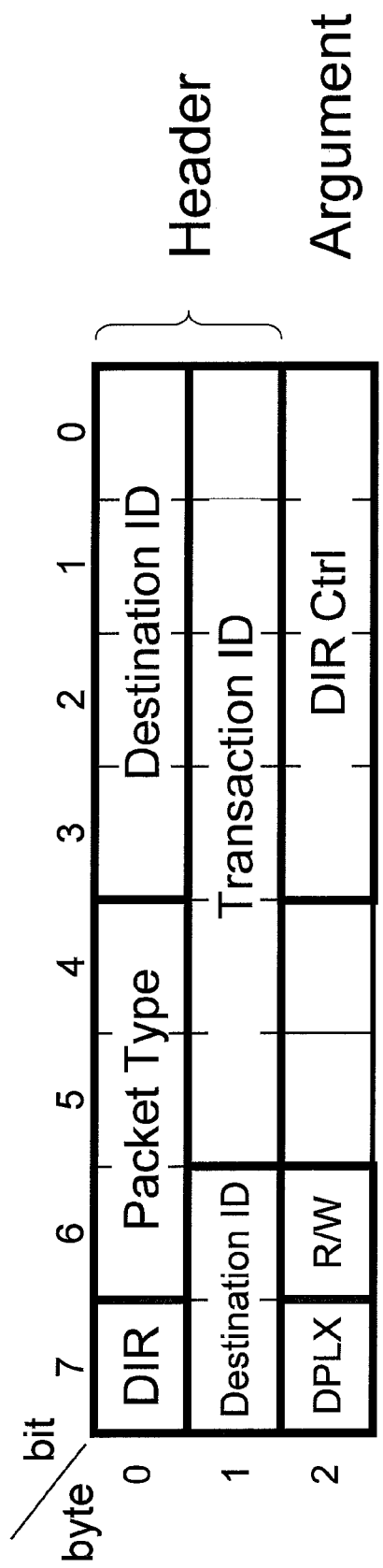
FIG. 18 shows a packet header and part of an argument in the first embodiment.

FIG. 18 shows an example of the structure of header information that is added to the beginning of each of the packets 1701 to 1705.

In the example shown in FIG. 18, the header information has 2 bytes. Bit 7 of byte 0, or the "DIR" field, stores the transmission direction of the packet. The DIR field set to 0 indicates that the packet is transferred from the non-volatile storage device 110 to the host device 100. The DIR field set to 1 indicates that the packet is transferred from the host device 100 to the non-volatile storage device 110.

As shown in FIG. 18, bits 6 to 4 of byte 0, or the "packet type" field, stores the type of the packet. The packet type field set to 000(b) (in which (b) hereafter indicates that the notation is binary) indicates that the packet is an I/O R/W request packet 1701. The packet type field set to 001(b) indicates that the packet is a memory R/W request packet 1702, 010(b) indicates that the packet is a response packet 1704, 011(b) indicates that the packet is a data packet 1703, and 111(b) indicates that the packet is a message packet 1705.

Further, bits 3 to 0 of byte 0 and bits 7 to 6 of byte 1, or the "destination ID" field consisting of 6 bits in total, stores an ID of a non-volatile storage device to which the packet is transferred (information about the destination of the packet). This field is used when a plurality of non-volatile storage devices 110 are connected to the single host device 100.

Bits 5 to 0 of byte 1, or the "transaction ID" field, stores an ID allocated to each processing. A response packet and a data packet corresponding to the same request packet are given the same ID as the corresponding request packet. The ID is used to manage the correspondence between the request and its resulting processing (the resulting response or the resulting data corresponding to the request).

An example of the operation of the communications system 1 will now be described. In this example, a memory R/W request packet 1702 requesting data reading from the memory unit is assumed to be transferred from the host device 100 to the non-volatile storage device 110.

The transaction ID of the memory R/W request packet 1702 is assumed to be 001000(b). In this case, when the transaction ID of the response packet 1704 transferred from the non-volatile storage device 110 to the host device 100 is 001000(b) after the request packet 1702 is transferred, the response packet 1704 is determined to correspond to the immediately preceding memory R/W request packet requesting data reading from the memory unit.

When the transaction ID of the response packet 1704 transferred from the non-volatile storage device 110 to the host device 100 is other than 001000(b) after the memory R/W request packet 1702 is transferred, the response packet 1704 is determined to correspond to a request packet different from the immediately preceding memory R/W request requesting data reading from the memory.

Also, as shown in FIG. 17, the "arguments" areas 1721 to 1725 of the packets 1701 to 1705 are each used to store information about the length of the packet or information associated with the other control system as necessary.

FIG. 18 shows an example of part of the argument 1722 of the memory R/W request packet 1702 (the first byte of the argument 1722).

Bit 7 of byte 2 (the first byte of the argument 1722), or the "DPLX" field, is used to set the communication mode. The DPLX field set to 0 indicates that the communication mode is a full-duplex mode, that is, a first communication mode. The DPLX field set to 1 indicates that the communication mode is a half-duplex mode, that is, a second communication mode.

Bit 6 of byte 2 (the first byte of the argument 1722), or the "R/W" field, stores information indicating whether the memory R/W request packet 1702 is a reading request or a writing request. The R/W field set to 0 indicates that the packet carries a reading request (the packet is for a reading request). The R/W field set to 1 indicates that the packet carries a writing request (the packet is for a writing request).

Bits 3 to 0 of byte 2, or the "DIR Ctrl" field, will be described later.

The "address" area of the I/O R/W request packet 1701 (part with reference numeral 1731 in FIG. 17) is used to store an address specifying an area of the I/O space from which data is to be read or an area of the I/O space into which data is to be written.

The "data" area of the I/O R/W request packet 1701 (part with reference numeral 1741 in FIG. 17) is used to store data to be written into the I/O space.

To write, for example, a value of 4(d) (in which (d) hereafter indicates that the notation is decimal) into the "DIR C" field of the I/O space shown in FIG. 21, the address (part with reference numeral 1731 in FIG. 17) is set to 030(h) and the data (part with reference numeral 1741 in FIG. 17) is set to 4(d) in the I/O writing request packet, and the resulting I/O write request packet is transferred.

In the same manner, the address (part with reference numeral 1732 in FIG. 17) of the memory R/W request packet 1702 is an area storing an address that specifies an area of the memory space from which data is to be read or an area of the memory space into which data is to be written.

The "data" area (part with reference numeral 1742 in FIG. 17) of the data packet 1703 is mainly used to store data corresponding to the reading/writing request requesting reading from or writing to the memory space. The "data" area (part with reference numeral 1743 in FIG. 17) of the response packet 1704 is mainly used to store data corresponding to the reading request requesting reading from the I/O space.

As shown in FIG. 17, the packets 1701 to 1705 include the "CRC" areas (parts with reference numerals 1751 to 1755 in FIG. 17), which are added at the ends of the packets. The CRC area is used to detect a data error occurring in each transferred packet.

For ease of explanation (for simplification), packets carrying the initializing command in the present embodiment are drawn using a single packet. For example, the initializing command packet 301 in FIGS. 3A and 3B and the initializing command 1201 in FIG. 12 are each drawn using a single packet. However, the communications system 1 typically performs initialization by transmitting a series of packets for reading various sets of information associated with the non-volatile storage device 110 that is mounted on the host device 100 (for example, information about the version of the standards with which the non-volatile storage device complies, information about the manufacturer, the serial number of the non-volatile storage device, and information about the operating voltage) or performing various settings in the non-volatile storage device 110.

1.2.1 Setting Parameter Associated with Transmission Channel Switching Condition During Initialization During initialization, the interface unit of the communications system 1 writes (sets) a parameter associated with the transmission channel switching condition into the I/O space in the manner described below.

The DIR C at the address 30(h) of the I/O space shown in FIG. 21 is allocated a direction control setting register. The direction control setting register is used to set the condition for temporarily switching to the full-duplex mode (the condition associated with the switching cycle) during data transfer performed in the half-duplex mode. In this example, the number of data packets transmitted in the half-duplex mode is used as the condition for temporarily switching to the full-duplex mode.

For example, the host device 100 sets a value of 4 to the DIR C at the address 30(h) of its I/O space (the I/O space of the host device 100). Under this setting, the packet generation unit 142 of the host device 100 generates an I/O R/W request packet. The host device 100 then transmits, to the non-volatile storage device 110, a packet carrying a writing request that causes the value of 4 to be written into the DIR C at the address 30(h) of the I/O space of the non-volatile storage device 110.

The non-volatile storage device 110 receives the packet from the host device 100, and sets (writes) the value of 4 into the DIR C at the address 30(h) of its I/O space. Under this setting, the non-volatile storage device 110 temporarily switches from the half-duplex mode (second communication mode) to the full-duplex mode (first communication mode) by switching the transmission channels every time when four data packets are transferred after the data packet transfer of the communications system 1 is started in the half-duplex mode.

The I/O space shown in FIG. 21 is a logical space. Recording elements, such as registers or memory memories, allocated to the addresses of the I/O space are usually mounted in their relevant circuit blocks (when the recording elements are implemented by hardware). In the present embodiment, the register allocated to the DIR C at the address 30(h) of the I/O space of the host device 100 is mounted in the switching condition detection unit 240. The register allocated to the DIR C at the address 30(h) of the I/O space of the non-volatile storage device 110 is mounted in the switching condition detection unit 260.

The communications system 1 is in the full-duplex mode, or the status shown in FIG. 2A, immediately after the host interface unit 140 and the slave interface unit 160 become activated. In this status, an initializing command packet is transmitted to the packet analysis unit 163 via the first transmission channel 121 (301, 1201).

The packet analysis unit 163 analyzes the packet and determines that the packet carries an initializing command, and executes necessary initialization processing.

After the initialization is completed, the user can instruct, using the user interface unit 131 included in the host device 100, high-speed data reading or high-speed data writing to be performed.

The high-speed data reading refers to an operation for reading data from the non-volatile memory unit 171 included in the non-volatile storage device 110 by setting the transmission channels 121 and 122 in the half-duplex mode or the second communication mode.

The high-speed data writing refers to an operation for writing data from the host device 100 into the non-volatile memory unit 171 included in the non-volatile storage device 110 by setting the transmission channels 121 and 122 in the half-duplex mode or the second communication mode.

1.2.2 High-Speed Reading Operation (Switching Between Half-Duplex/Full-Duplex Modes Based on Elapsed Time T)

The high-speed reading operation performed by the communications system 1 (the operation of the communications system 1 performed when the user instructs, using the user interface unit 131, high-speed data reading to be performed) will now be described with reference to the timing chart of FIG. 3A.

When the user instructs, using the user interface unit 131, high-speed data reading to be performed, the user interface unit 131 transmits a high-speed data read command to the application unit 132.

The application unit 132 determines that the memory unit 133 has an unoccupied area large enough to store the data to be read. Subsequently, the application unit 132 instructs the packet generation unit 142 to generate a packet carrying a high-speed read command. The high-speed read command includes an address at which data is to be read and the size of data to be read, which are multiplexed in the command.

The high-speed read command packet generated by the packet generation unit 142 will now be described in detail.

The high-speed read command packet is generated by storing the address at which data is to be read into the address 1732 of the memory R/W request packet 1702 shown in FIG. 17 and the size of data to be read into part of the argument 1722 of the packet 1702.

To indicate that this memory R/W request packet carries a reading request, bit 6 of the first byte (byte 2 in FIG. 18) of the argument 1722, or the R/W field, is set to 0.

To further indicate that the reading is to be performed in a high-speed mode, bit 7 of the first byte (byte 2 in FIG. 18) of the argument 1722, or the DPLX field, is set to 1 (indicating the half-duplex mode) (the communication mode of the communications system 1 is set to the half-duplex mode or the second communication mode by setting the DPLX field to 1 (the half-duplex mode)).

The high-speed read command packet generated by the packet generation unit 142 is transmitted to the packet analysis unit 163 via the first transmission channel 121 (302).

The packet analysis unit 163 analyzes the packet and determines that the packet carries a high-speed read command.

The switching condition detection unit 240 included in the transmission-channel-switching control unit 143 detects that the packet generation unit 142 has transmitted the high-speed read command packet, and sets the input/output terminal 241 of the first transmission channel 121 to the receiving status. The switching condition detection unit 260 included in the transmission-channel-switching control unit 162 detects that the packet analysis unit 163 has received the high-speed read command packet, and sets the input/output terminal 261 of the first transmission channel 121 to the transmitting status. This sets the first transmission channel 121 to an uplink channel (303), and causes the communications system 1 to enter the half-duplex mode shown in FIG. 2B.

Subsequently, the slave interface unit 160 sequentially obtains data having the size multiplexed in the high-speed read command packet from an area of the non-volatile memory unit 171 corresponding to the address multiplexed in the command via the non-volatile memory read/write control unit 170, and provides the obtained data to the packet generation unit 164.

The packet generation unit 164 generates data packets each of which consists of a header indicating the type of the corresponding packet etc. and a body storing a data piece generated by dividing the read data into data pieces each having an appropriate size.

The packet generation unit 164 transmits the generated data packets to the host device 100 via the transmission-channel-switching control unit 162 while assigning the data packets either to the first transmission channel 121 or to the second transmission channel 122.

In the present embodiment, the data packets are transmitted in a manner that a first data packet DATA(1) is assigned to the first transmission channel 121, and a second data packet DATA(2) is assigned to the second transmission channel 122 (304).

The data packets DATA(1) and DATA(2) transmitted to the host device 100 are accumulated into the packet analysis unit 144A via the transmission-channel-switching control unit 143.

The packet analysis unit 144 then analyzes these packets and determines that these packets are data packets, and stores the bodies or the main data of the data packets, or the data packets excluding the headers, into the memory unit 133.

A third data packet DATA(3) and a fourth data packet DATA(4) are thereafter transmitted to the host device 100 (305) in the same manner as described for the preceding data packets.

The DIR C at the address 30(h) of the I/O space is set to 4 during the initialization. In this case, when detecting that the packet generation unit 164 has transmitted four data packets, the switching condition detection unit 260 included in the transmission-channel-switching control unit 162 sets the input/output terminal 261 of the first transmission channel 121 to the receiving status.

The DIR C at the address 30(h) of the I/O space is set to 4 during the initialization. In this case, when detecting that the packet analysis unit 144 has received four data packets, the switching condition detection unit 240 included in the transmission-channel-switching control unit 143 sets the input/output terminal 241 of the first transmission channel 121 to the transmitting status. This sets the first transmission channel 121 to a downlink channel (306), and causes the communications system 1 to enter the full-duplex mode shown in FIG. 2A.

In the communications system 1, as described above, the host device 100 provides in advance information about the condition for switching from the half-duplex mode to the full-duplex mode, which is specifically the number N of data packets transmitted and received completely (N is an integer), to the non-volatile storage device 110 using the parameter of the initializing command.

More specifically, the host device 100 sets the DIR C at the address 30(h) of its I/O space to N, and then the packet generation unit 142 included in the host device 100 generates an I/O R/W request packet. The host device 100 then transmits a packet carrying a writing request that causes N to be written into the DIR C at the address 30(h) of the I/O space of the non-volatile storage device 110 to the non-volatile storage device 110.

The non-volatile storage device 110 receives the packet from the host device 100, and sets (writes) N into the DIR C at the address 30(h) of the I/O space.

Figure 3A:
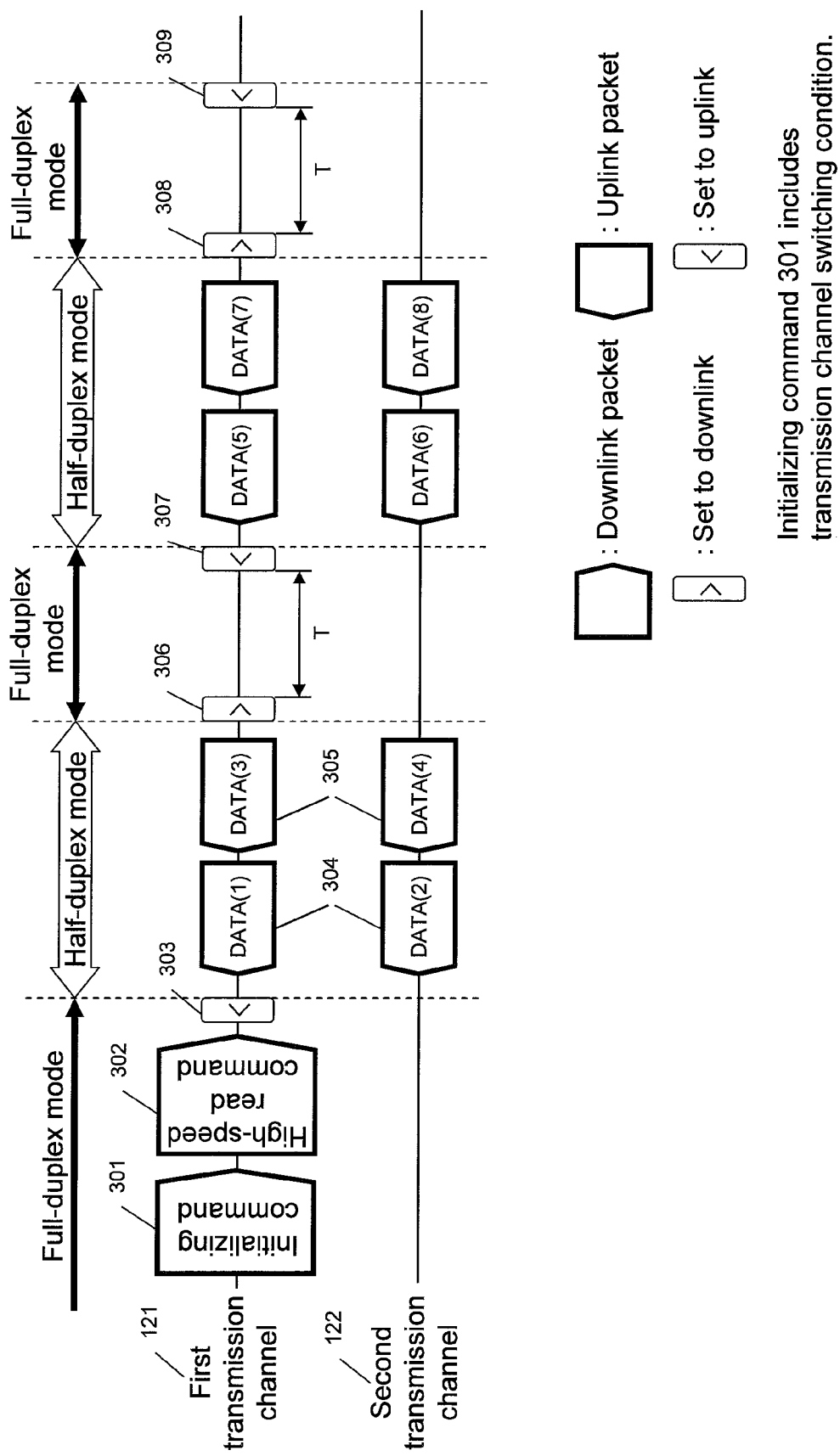
FIGS. 3A and 3B are timing charts showing packets that are transferred on transmission channels in chronological order during high-speed data reading in the first embodiment.
Figure 3B:
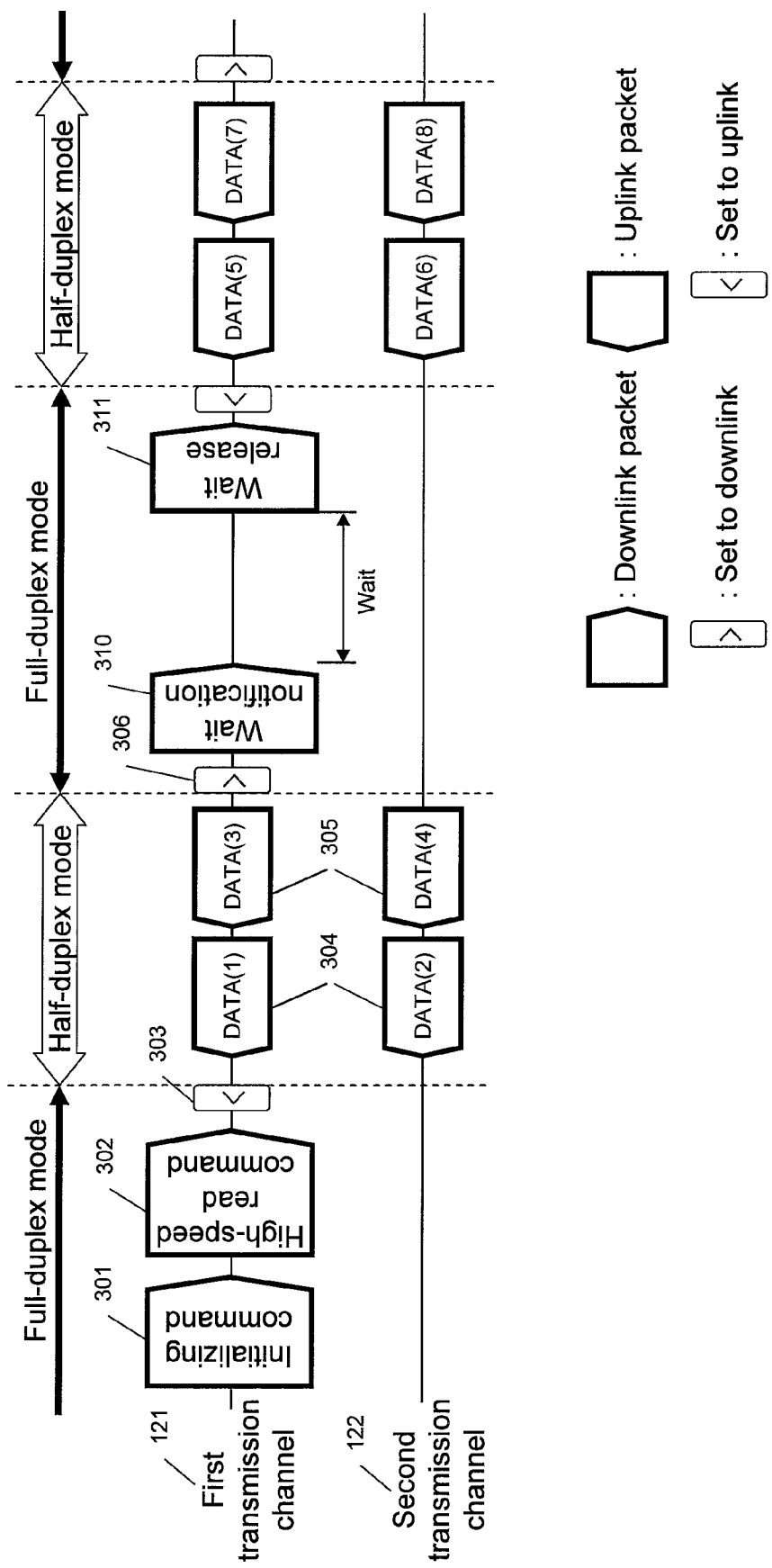

FIGS. 3A and 3B are timing charts showing timing examples in the communications system 1 when the parameter of the initializing command is set as N=4.

Figure 20A:
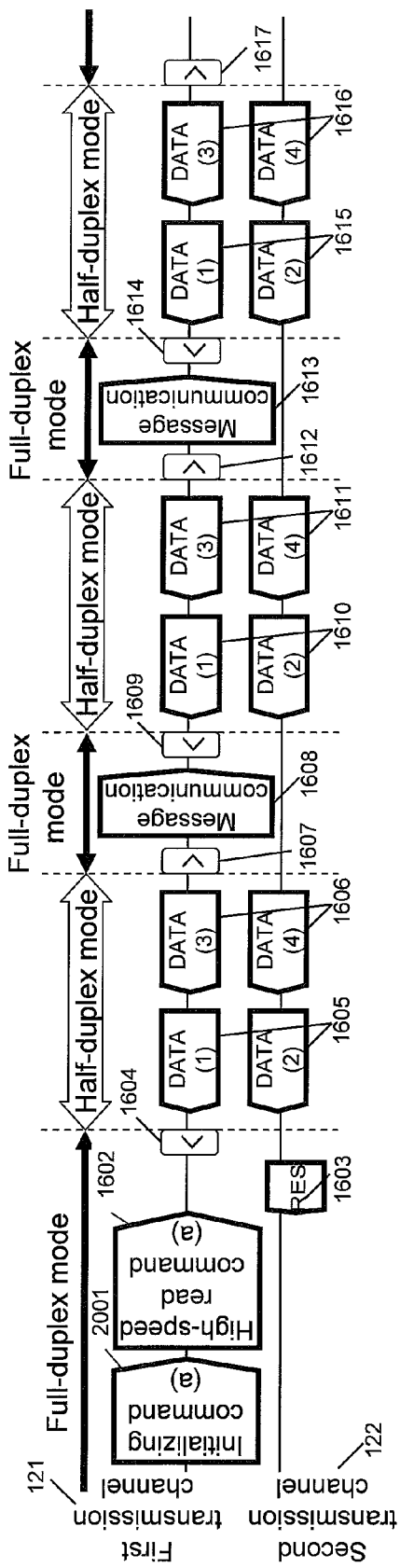
FIGS. 20A and 20B are timing charts showing packets that are transferred on transmission channels in chronological order during high-speed data reading in the first embodiment.
Figure 20B:
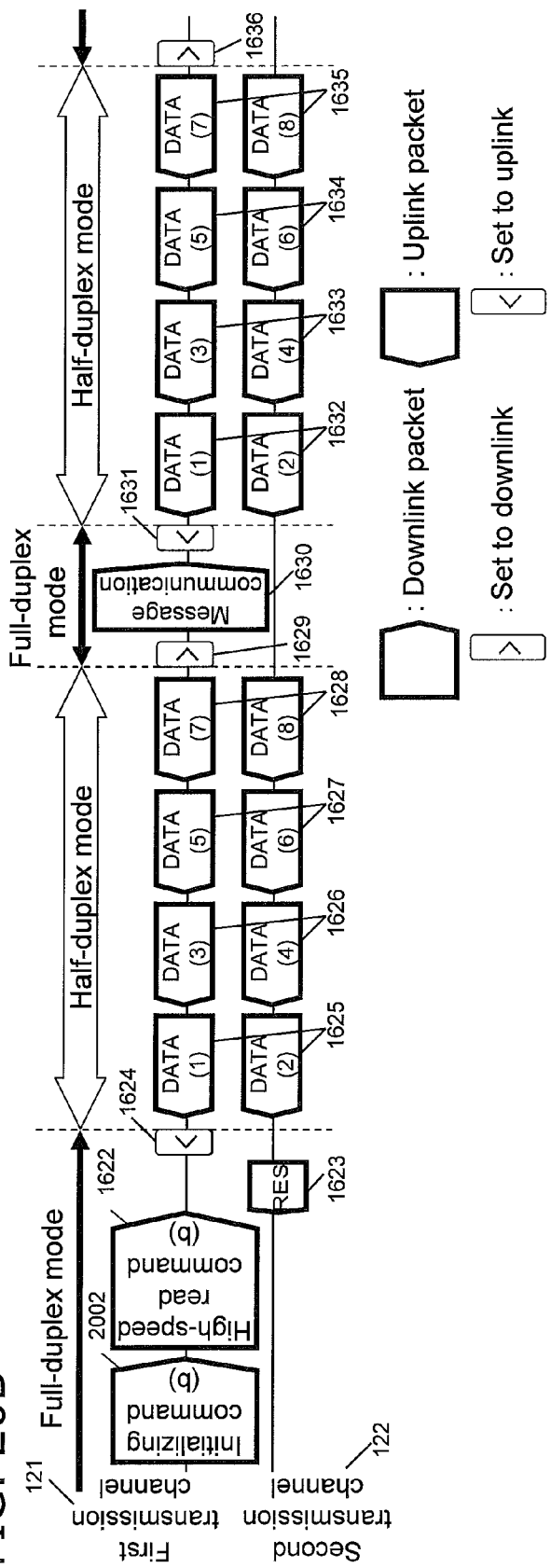

FIG. 20B is a timing chart showing timing examples in the communications system 1 when N=8.

When the first transmission channel 121 is set to a downlink channel in the communications system 1, the clock counter 165 starts incrementing its clock number based on clocks provided from the clock regeneration unit 161. In the same manner, the clock counter 145 starts incrementing its clock number based on clocks provided from the clock transmission unit 141.

The switching condition detection unit 240 included in the host interface unit 140 detects that the predetermined time T elapses from when the first transmission channel 121 has been switched to the downlink channel by monitoring the clock counter 145, and returns the input/output terminal 241 of the first transmission channel 121 to the receiving status. At this timing, the switching condition detection unit 240 instructs the clock counter 145 to reset its clock number to zero.

In the same manner, the switching condition detection unit 260 included in the slave interface unit 160 detects that the predetermined time T elapses from when the first transmission channel 121 has been switched to the downlink channel by monitoring the clock counter 165, and returns the input/output terminal 261 of the first transmission channel 121 to the transmitting status. At this timing, the switching condition detection unit 260 instructs the clock counter 165 to rest its clock number to zero.

This returns the first transmission channel 121 to an uplink channel (307), and causes the communications system 1 to return to the half-duplex mode shown in FIG. 2B. The host device 100 provides in advance information about the condition for switching from the full-duplex mode to the half-duplex mode, which is specifically the predetermined time T elapsing after the communication mode is switched to the full-duplex mode, to the non-volatile storage device 110 using the parameter of the initializing command.

In the communications system 1, the first transmission channel 121 is set to a downlink channel every time when transmission and reception of four data packets is completed (308), and the communications system 1 returns to the half-duplex mode (309) when the predetermined time T elapses. This control is thereafter executed repeatedly.

The host device 100 can transmit an interrupt request to the non-volatile storage device 110 by transmitting a command or a message on the first transmission channel 121 while the first transmission channel 121 is set as the downlink channel (306 to 307 and 308 to 309).

1.2.3 High-Speed Reading Operation (Switching Between Half-Duplex/Full-Duplex Modes Based on Wait Notification Message and Wait Release Message)

The high-speed reading operation performed by the communications system 1 when the communication mode is switched between the half-duplex/full-duplex modes in response to a wait command (a wait notification message or a wait release message) will now be described.

FIG. 3B shows a sequence of operation performed when a wait command (a wait notification message and a wait release message) is transmitted as an interrupt request from the host device 100 to the non-volatile storage device 110 during communication performed in the half-duplex mode.

The processing (301 to 303) performed from when the initializing command packet is transmitted to when the first transmission channel 121 is set to an uplink channel is the same as the corresponding processing shown in FIG. 3A, and will not be described in detail.

In one example, the application unit 132 monitors the unoccupied area status of the memory unit 133 during the half-duplex mode communication (304 to 305), and may determine that the unoccupied area of the memory unit 133 will not be large enough to store data when the data is continuously read from the slave device (non-volatile storage device 110) in response to the high-seed read command. In this case, the application unit 132 instructs the packet generation unit 142 to generate a packet carrying a wait notification message and transmit the generated packet to the non-volatile storage device 110 while the first transmission channel 121 is set as a downlink channel (310).

The packet analysis unit 163 analyzes the wait notification message packet transmitted to the non-volatile storage device 110 in the same manner as other commands. While the analysis is being performed, the processing corresponding to the currently processed high-speed read command is temporarily suspended, and the communication mode is maintained to be the full-duplex mode. Unlike in the operation shown in FIG. 3A, the communications system 1 is not switched to the half-duplex mode when the predetermined time T elapses. The switching condition detection units 240 and 260 instruct the clock counters 145 and 165 to reset their clock numbers to zero.

When an unoccupied area large enough to store the data is formed in the memory unit 133, the application unit 132 detects the unoccupied area, and instructs the packet generation unit 142 to generate a packet carrying a wait release message and transmit the generated packet to the non-volatile storage device 110 (311).

The switching condition detection unit 240 detects that the packet generation unit 142 has generated the wait release message packet, and sets the input/output terminal 241 of the first transmission channel 121 to the receiving status.

The switching condition detection unit 260 also detects that the packet analysis unit 163 has analyzed the wait release message packet, and sets the input/output terminal 261 of the first transmission channel 121 to the transmitting status.

This sets the first transmission channel 121 to an uplink channel, and causes the communications system 1 to enter the half-duplex mode. The communications system 1 then resumes the processing corresponding to the high-speed read command.

As described above, the communications system 1 is maintained to be in the full-duplex mode in a reliable manner in a period from when the wait notification message packet is transmitted from the host device 100 to the non-volatile storage device 110 to when the wait release message packet is transmitted. This eliminates the need for transmitting or receiving any unnecessary packet for wait status determination (for example, eliminates the need for determining the status of the host device 100 and/or the non-volatile storage device 110 in predetermined cycles using polling).

As a result, the communications system 1 performs high-speed data transfer while enabling appropriate interrupt processing to be performed, without causing any unnecessary packet to be transmitted and received.

The non-volatile storage device 110 may transmit, to the host device 100, a response packet generated in response to the wait notification message packet transmitted from the host device 100 to the non-volatile storage device 110. Also, the non-volatile storage device 110 may transmit, to the host device 100, a response packet generated in response to the wait release message packet transmitted from the host device 100 to the non-volatile storage device 110. In this case, it is preferable to switch the communication mode after the response packet to the wait release message packet is transmitted from the non-volatile storage device 110 to the host device 100.

The communications system 1 operates in the manner described above when the user instructs high-speed data reading to be performed.

1.2.4 High-Speed Writing Operation (Switching Between Half-Duplex/Full-Duplex Modes Based on Elapsed Time T)

The high-speed writing operation performed by the communications system 1 (the operation for switching between the half-duplex/full-duplex modes based on the elapsed time T) will now be described.

Figure 12A:
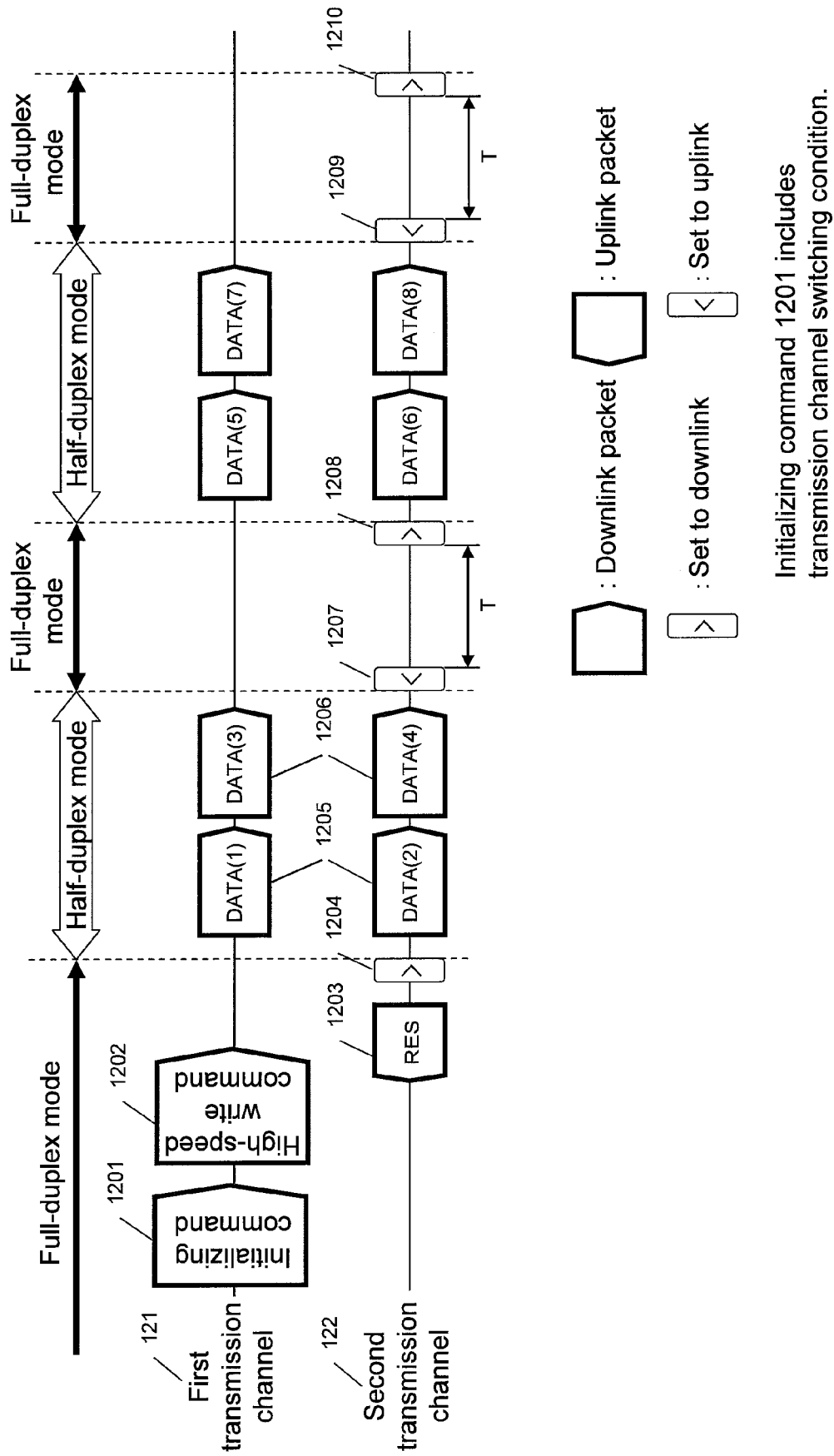
FIGS. 12A and 12B are timing charts showing packets that are transferred on transmission channels in chronological order during high-speed data writing in the first embodiment.

FIG. 12A is a timing chart describing the high-speed writing operation performed by the communications system 1 (the operation for switching between the half-duplex/full-duplex modes based on the elapsed time T).

When the user instructs, using the user interface unit 131, high-speed data writing to be performed, the user interface unit 131 transmits a high-speed data write command to the application unit 132.

The application unit 132 instructs the packet generation unit 142 to generate a packet carrying a high-speed write command. The high-speed write command includes an address at which data is to be written and the size of data to be written, which are multiplexed in the command.

The high-speed write command packet generated by the packet generation unit 142 will now be described in detail.

The high-speed write command packet is generated by storing the address at which data is to be read into the address 1732 of the memory R/W request packet 1702 shown in FIG. 17 and the size of data to be read into part of the argument 1722 of the packet 1702.

To indicate that this memory R/W request packet carries a writing request, bit 6 of the first byte (byte 2 in FIG. 18) of the argument 1722, or the R/W field, is set to 1.

To further indicate that the writing is to be performed in a high-speed mode, bit 7 of the first byte (byte 2 in FIG. 18) of the argument 1722, or the DPLX field, is set to 1 (the half-duplex mode) (the communication mode of the communications system 1 is set to the half-duplex mode or the second communication mode by setting the DPLX field to 1 (the half-duplex mode)).

The high-speed write command packet generated by the packet generation unit 142 is provided to the packet analysis unit 163 via the first transmission channel 121 (1202).

The packet analysis unit 163 analyzes the packet and determines that the packet carries a high-speed write command. The analysis result is then provided to the non-volatile memory read/write control unit 170.

The non-volatile memory read/write control unit 170 determines whether the non-volatile memory unit 171 has an unoccupied area large enough to store the data. When determining that the non-volatile memory unit 171 has such an unoccupied area, the non-volatile memory read/write control unit 170 instructs the packet generation unit 142 to generate a response packet to the high-speed write command. The response packet is provided to the packet analysis unit 144 via the second transmission channel 122 (1203).

The packet analysis unit 144 analyzes the packet transmitted from the non-volatile storage device 110, and determines that the packet is a response packet to the high-speed write command.

The switching condition detection unit 260 included in the transmission-channel-switching control unit 162 detects that the packet analysis unit 163 has transmitted the response packet, and sets the input/output terminal 262 of the second transmission channel 122 to the receiving status.

The switching condition detection unit 240 included in the transmission-channel-switching control unit 143 detects that the packet analysis unit 144 has received the response packet, and sets the input/output terminal 242 of the second transmission channel 122 to the transmitting status.

This sets the second transmission channel 122 to a downlink channel (1204), and causes the communications system 1 to enter the half-duplex mode shown in FIG. 2C.

Subsequently, the host interface unit 140 provides data to be written to the non-volatile memory unit 171 to the packet generation unit 142 via the memory unit 133. The packet generation unit 142 then generates data packets. In the present embodiment, the data packets transmitted during high-speed writing are assigned either to the first transmission channel 121 or the second transmission channel 122 in the same manner as for the data packets assigned during high-speed reading (1205, 1206).

The data packets transmitted to the non-volatile storage device 110 are accumulated in the packet analysis unit 163 via the transmission-channel-switching control unit 162. The packet analysis unit 163 analyzes these packets and determines that these packets are data packets. The main data of these packets is then stored into the non-volatile memory unit 171 via the non-volatile memory read/write control unit 170.

The DIR C at the address 30(h) of the I/O space is set to 4 during the initialization. In this case, when detecting that the packet generation unit 142 has transmitted four data packets, the switching condition detection unit 240 included in the transmission-channel-switching control unit 143 sets the input/output terminal 242 of the second transmission channel 122 to the receiving status.

The DIR C at the address 30(h) of the I/O space is set to 4 during the initialization. In this case, when detecting that the packet analysis unit 163 has transmitted four data packets, the switching condition detection unit 260 included in the transmission-channel-switching control unit 162 sets the input/output terminal 262 of the second transmission channel 122 to the transmitting status.

This sets the second transmission channel 122 to an uplink channel (1207), and causes the communications system 1 to enter the full-duplex mode shown in FIG. 2A.

The condition for switching from the half-duplex mode to the full-duplex mode used in the communications system 1 for the high-speed writing is the same as the mode switching condition used for the high-speed reading.

Figure 12B:
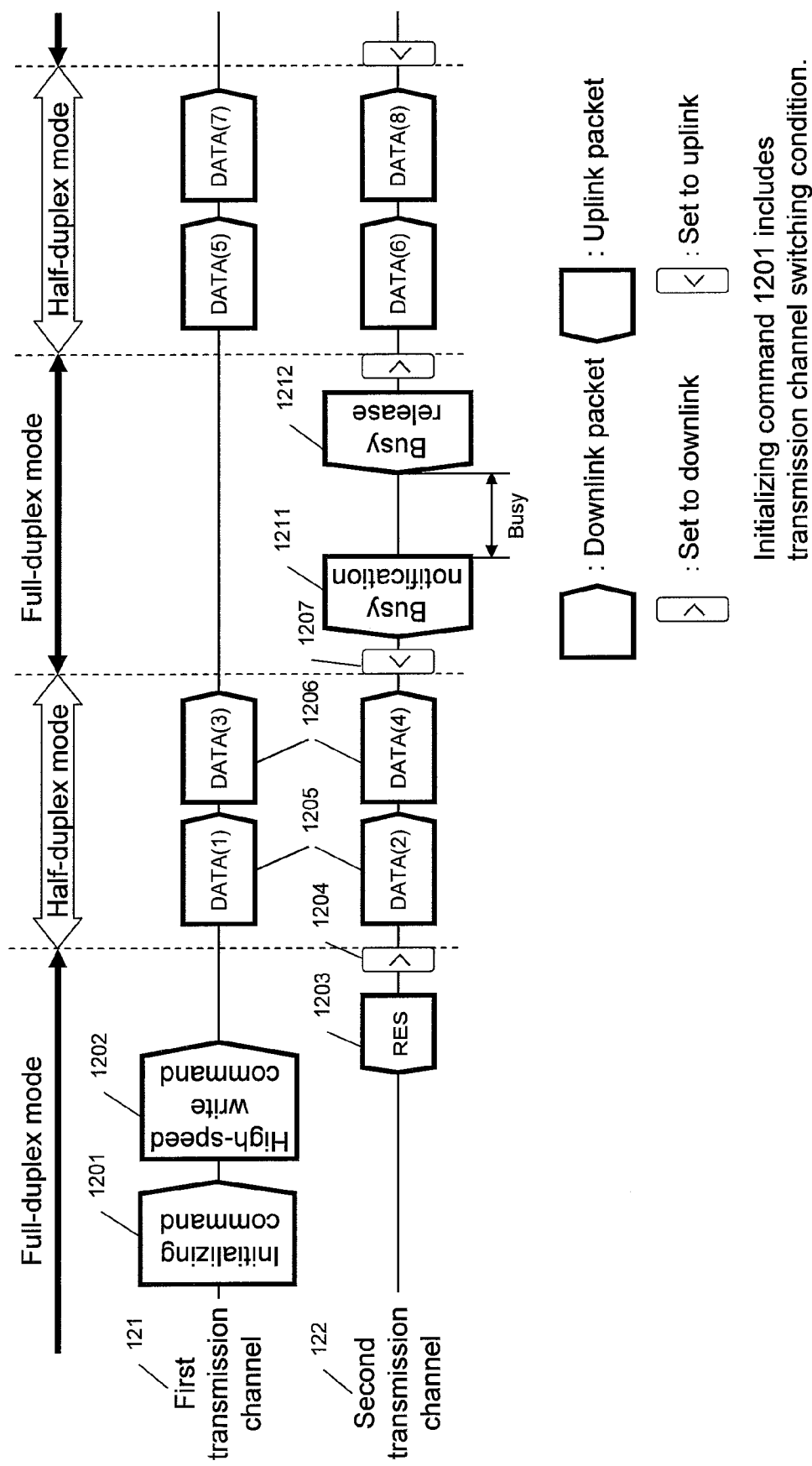

FIGS. 12A and 12B are timing charts showing timing examples in the communications system 1 when the parameter of the initializing command is set as N=4.

FIG. 19B is a timing chart showing timing examples in the communications system 1 when N=8.

In the communications system 1, the switching condition detection unit 260 subsequently returns the input/output terminal 262 of the second transmission channel 122 to the receiving status when the predetermined time T elapses after the second transmission channel 122 is set to the uplink channel in the same manner as for the high-speed reading. The switching condition detection unit 240 then returns the input/output terminal 242 of the second transmission channel 122 to the transmitting status. At this timing, the switching condition detection units 240 and 260 instruct the clock counters 145 and 165 to reset their clock numbers to zero.

This returns the second transmission channel 122 to the downlink channel (1208), and causes the communications system 1 to return to the half-duplex mode shown in FIG. 2B.

In the communications system 1, the second transmission channel 122 is set to an uplink channel every time when transmission and reception of four data packets is completed (1209), and the communications system 1 returns to the half-duplex mode (1210) when the predetermined time T elapses. This control is thereafter executed repeatedly in the same manner as described for the high-speed data reading.

The non-volatile storage device 110 can transmit an interrupt message to the host device 100 by transmitting a command or a message on the second transmission channel 122 while the second transmission channel 122 is set as an uplink channel (1207 to 1208 and 1209 to 1210).

1.2.5 High-Speed Writing Operation (Switching Between Half-Duplex/Full-Duplex Modes Based on Busy Notification Message and Busy Release Message)

The high-speed writing operation performed by the communications system 1 when the communication mode is switched between the half-duplex/full-duplex modes in response to a busy notification message and a busy release message will now be described.

FIG. 12B shows a sequence of operation performed when a busy message (a busy notification message and a busy release message) is transmitted as an interrupt message from the host device 100 to the non-volatile storage device 110 during communication performed in the half-duplex mode.

In the half-duplex mode, the non-volatile memory read/write control unit 170 instructs the packet generation unit 164 to generate a packet carrying a busy notification message when the data reception needs to be temporarily suspended until writing into the non-volatile memory unit 171 controlled by the non-volatile memory read/write control unit 170 is completed, or when the unoccupied area of the memory for receiving data (not shown) will become insufficient to store the data. The non-volatile memory read/write control unit 170 then executes control to transmit the busy notification message packet to the host device 100 while the second transmission channel 122 is set as an uplink channel (1211).

The packet analysis unit 144 analyzes the busy notification message packet transmitted to the host device 100. While the analysis is being performed, the processing corresponding to the currently processed high-speed write command is temporarily suspended, and the communication mode of the communications system 1 is maintained to be the full-duplex mode. Unlike in the operation shown in FIG. 12A, the communications system 1 is not switched to the half-duplex mode when the predetermined time T elapses. The switching condition detection units 240 and 260 instruct the clock counters 145 and 165 to reset their clock numbers to zero.

Subsequently, when determining that an unoccupied area large enough to store the received data is formed, the non-volatile memory read/write control unit 170 instructs the packet generation unit 164 to generate a packet carrying a busy release message and transmit the generated packet to the host device 100 (1212).

The switching condition detection unit 260 detects that the packet generation unit 164 has generated the busy release message packet, and returns the input/output terminal 262 of the second transmission channel 122 to the receiving status.

The switching condition detection unit 240 detects that the packet analysis unit 144 has analyzed the busy release message packet, and returns the input/output terminal 242 of the second transmission channel 122 to the transmitting status.

This sets the second transmission channel 122 to a downlink channel, and causes the communications system 1 to enter the half-duplex mode. The communications system 1 then resumes the processing corresponding to the high-speed write command.

As described above, the communications system 1 is maintained to be in the full-duplex mode in a reliable manner in a period from when the busy notification message packet is transmitted from the non-volatile storage device 110 to the host device 100 to when the busy release message packet is transmitted. This eliminates the need for transmitting or receiving any unnecessary packet for busy status determination (for example, eliminates the need for determining the status of the host device 100 and/or the non-volatile storage device 110 in predetermined cycles using polling).

The above processing is performed using commands. In other words, the above processing is performed between the host interface unit 140 and the memory unit 133. This eliminates the need for any processing performed by the application unit 132, and therefore increases the processing speed of the communications system 1.

As a result, the communications system 1 performs high-speed data transfer while enabling appropriate interrupt processing to be performed, without causing any unnecessary packet to be transmitted and received.

The non-volatile storage device 110 may transmit, to the host device 100, a response packet generated in response to the busy notification message packet transmitted from the non-volatile storage device 110 to the host device 100. Also, the host device 100 may transmit, to the non-volatile storage device 110, a response packet generated in response to the busy release message packet transmitted from the non-volatile storage device 110 to the host device 100. In this case, it is preferable to switch the communication mode after the response packet to the busy release message packet is transmitted from the host device 100 to the non-volatile storage device 110.

The communications system 1 operates in the manner described above when the user instructs high-speed data writing to be performed.

To transfer data at a high speed in the half-duplex mode using the two transmission channels simultaneously, the communications system 1 of the present embodiment described above temporarily switches the communication direction of one of the two transmission channels when transmission and reception of a predetermined number of data packets is completed. This enables the communications system 1 to transmit a command or a message between the host device 100 and the non-volatile storage device 110 while a command is being processed in the half-duplex mode. As a result, the communications system 1 can promptly respond to an interrupt request, such as a request associated with a wait status or a busy status, while data is being read or being written in the half-duplex mode.

As a result, the communications system 1 of the present embodiment enables both high-speed data transfer using the half-duplex mode and prompt processing of an interrupt request during communication performed in the half-duplex mode. Further, the communications system 1 eliminates the need for adding another external transmission channel to transmit an interrupt message, such as a message associated with a wait status or a busy status. This prevents the circuit scale of the interface devices from increasing, and thus prevents the cost from increasing.

For communications that do not require such a high speed for data reading, the communications system 1 may be maintained in the full-duplex mode and may use a command for normal data reading or a command for normal data writing.

When the host device 100 transmits a wait command during normal reading, a packet carrying a wait notification message is first transmitted at a selected timing on the first transmission channel 121, which has been set as a downlink channel since immediately after initialization. A packet carrying a wait release message is then transmitted at a selected timing on the first transmission channel 121 to release the wait status.

The same applies to normal writing. More specifically, a packet carrying a busy notification message and a packet carrying a busy release message are transmitted at selected timings on the second transmission channel 122, which has been set as an uplink channel since immediately after initialization.

Although the present embodiment describes the case in which data packets are not transmitted in the full-duplex mode of the communications system 1, data packets may be transmitted and received using the first transmission channel 121 and the second transmission channel 122 during communication performed in the full-duplex mode.

Further, the number N of transmitted and received data packets and the predetermined time T, each of which triggers the mode switching in the communications system 1, may be determined in accordance with the conditions of the host device 100 and the non-volatile storage device 110 including the buffer size and the processing performance.

Determination of Packet Number N

The packet number N may be determined, for example, in the manner described below.

In the communications system 1 including the host device 100 and the non-volatile storage device 110, the host device 1 is assumed to have a buffer size Buf1 [byte], the non-volatile storage device 110 (slave device) is assumed to have a buffer size Buf2 [byte], and a packet transmitted between the host device 100 and the non-volatile storage device 110 (slave device) is assumed to have a size A [byte].

In this case, the packet number N can be determined using the formulas below:

When Buf1>Buf2, (1)

$N=\text{Int}(\text{Buf2}/A)$, and

When Buf1≦Buf2, (2)

$N=\text{Int}(\text{Buf1}/A)$.

In the formulas, Int(X) is a maximum integer not exceeding X (Int(X) is a function corresponding to a Gauss operation).

Alternatively, the packet number N may be determined based on the processing performance of the host device 100 and the non-volatile storage device 110 (slave device). In this case, the packet number N is determined based on the processing performance of the device having a smaller buffer size. This maximizes the communication performance of the communications system 1.

Alternatively, the packet number N may be determined based on the processing speed of the host device 100 and the non-volatile storage device 110 (slave device). In one example, the host device 100 is assumed to have a processing speed P1 and an operating clock C1, the non-volatile storage device 110 (slave device) is assumed to have a processing speed P2 and an operating clock C2, and a communication packet is assumed to have a packet size A. In this case, the packet number N may be determined based on all or some of P1, P2, C1, C2, and A. The processing speed of the host device 100 and the non-volatile storage device 110 is determined based on all or some of the processing capacity of the processor mounted on the host device 100 or the non-volatile storage device 110 (slave device), the speed at which data is read from or written to a recording medium mounted on the host device 100 or the non-volatile storage device 110 (slave device), such as a RAM or a flash memory, and the transmission speed of the external transmission channels via which the host device 100 or the non-volatile storage device 110 communicates with the external device.

The above embodiment describes the case in which information about the number N of transmitted and received data packets, which triggers the mode switching, is provided from the host device 100 to the non-volatile storage device 110 using the parameter of the initializing command. More specifically, the host device 100 sets the DIR C at the address 30(h) of its I/O space (I/O space of the host device 100) to N, and then the packet generation unit 142 included in the host device 100 generates an I/O R/W request packet. The host device 100 then transmits a packet carrying a writing request that causes N to be written into the DIR C at the address 30(h) of the I/O space of the non-volatile storage device 110. The non-volatile storage device 110 receives the packet, and sets (writes) N into the DIR C at the address 30(h) of the I/O space. However, the present invention should not be limited to this method. The communications system 1 may not use the initializing command to provide information about the number N of transmitted and received packets, which triggers the mode switching, but may instead use a high-speed read command and/or a high-speed write command by newly defining a field for storing the packet number N, which triggers the mode switching, in the high-speed read command and/or the high-speed write command To enable this method, for example, a "DIR Ctrl" field may be defined at bits 3 to 0 in FIG. 18 in the first byte of the argument 1722 of the memory R/W request packet 1702 shown in FIG. 17, and the packet number N, which triggers the mode switching, may be stored into the DIR Ctrl field.

Also, the value of the DIR C at the address 30(h) of the I/O space of the host device 100 may be set in the DIR Ctrl field newly defined in the argument area of the memory R/W request packet 1702, and the resulting memory R/W request packet 1702 may be transmitted. The non-volatile storage device 110 may then receive the memory R/W request packet 1702, and write the value of the DIR Ctrl field in the argument area of the memory R/W request packet 1702 into the DIR C at the address 30(h) of the I/O space of the non-volatile storage device 110.

In this case, the communications system 1 can operate in the same manner as when information about the packet number N, which triggers the mode switching, is provided in advance from the host device 100 to the non-volatile storage device 110 using the parameter of the initializing command.

With this method, the high-speed writing is performed in accordance with a sequence of operation shown in FIG. 15A when N=4 (or a sequence of operation shown in FIG. 15B when N=8). This operation sequence eliminates the processing associated with an initializing command 1901 required in FIG. 19A, in which the packet number N, which triggers the mode switching, is to be set using the parameter of the initializing command (or in FIG. 19B when N=8).

Figure 16A:
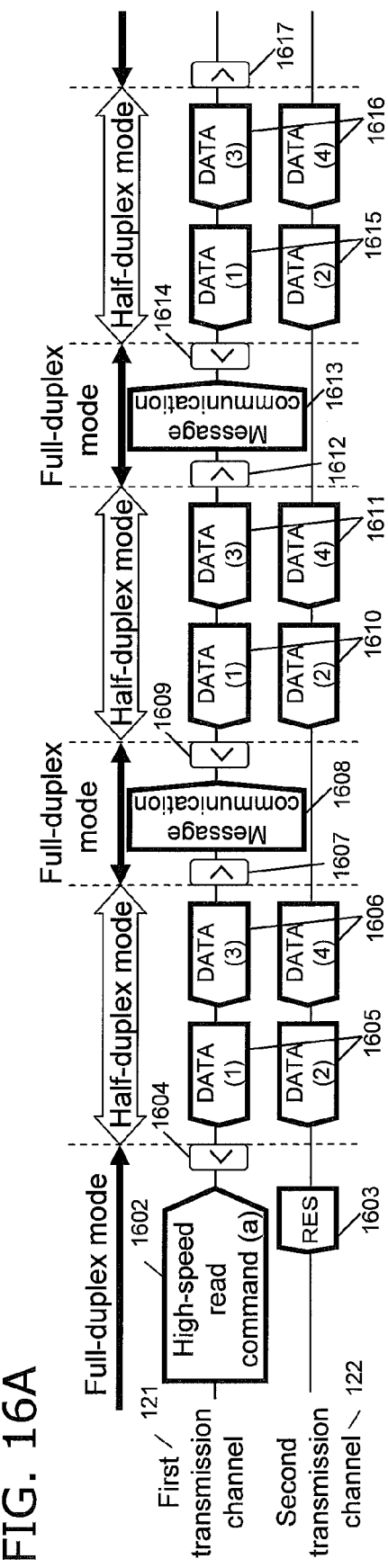
FIGS. 16A and 16B are timing charts showing packets that are transferred on transmission channels in chronological order during high-speed data reading in the first embodiment.
Figure 16B:
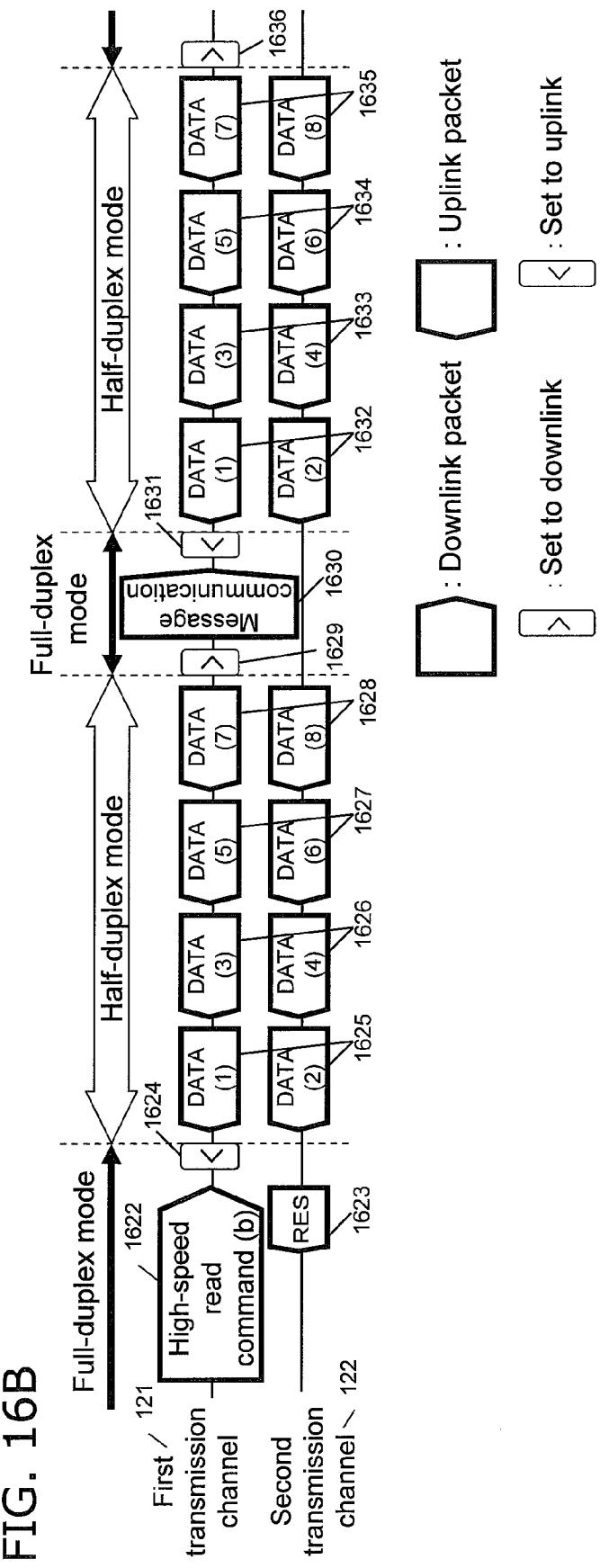

In the same manner, the high-speed reading is performed with this method in accordance with a sequence of operation shown in FIG. 16A when N=4 (or a sequence shown in FIG. 16B when N=8). This eliminates the processing associated with an initializing command 2001 required in FIG. 20A, in which the packet number N, which triggers the mode switching, is to be set using the parameter of the initializing command (or in FIG. 20B when N=8).

Modifications

Figure 4:
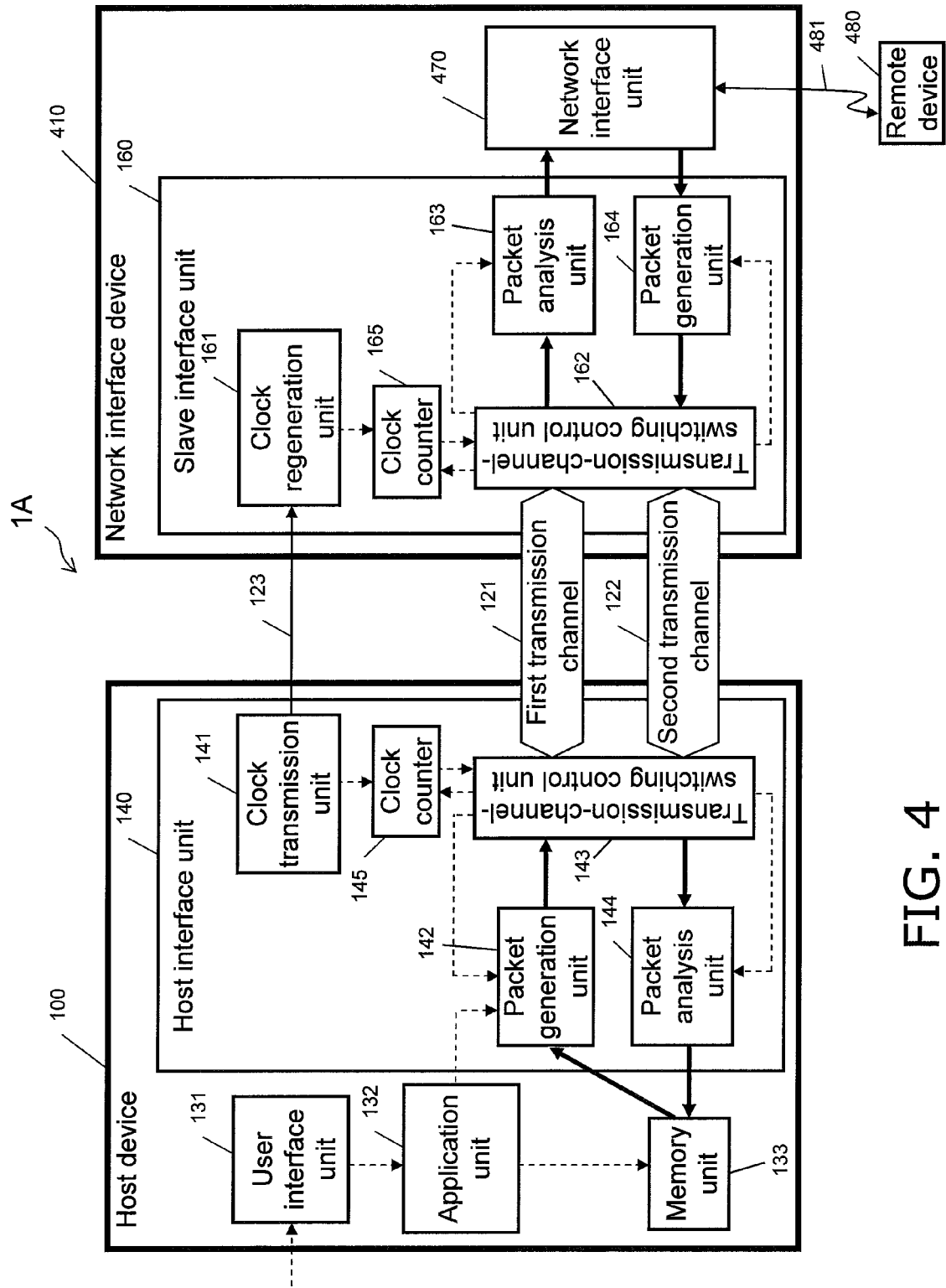
FIG. 4 is a block diagram showing another structure according to the first embodiment.

Although the present embodiment describes the communications system 1 using, as the slave device, the non-volatile storage device including the non-volatile memory, the present invention should not be limited to this structure. As shown in FIG. 4, for example, a communications system 1A may use, as a slave device, a network interface device 410 including a slave interface unit 160 and a network interface unit 470. The communications system 1A has the same advantageous effects as the communications system 1 described above.

In the communications system 1A, the network interface device 410 is connected to a remote device 480 via a network communication channel 481. The network interface unit 470 controls the network communication channel 481, and controls the network as instructed by the slave interface unit 160.

In the communications system 1A shown in FIG. 4, the host device 100 transmits a high-speed read command, and then data is read from a memory unit (not shown) included in the remote device 480 and stored into the packet generation unit 164 via the network communication channel 481 and the network interface unit 470. The data packets are then transmitted to the host device 100 in the half-duplex mode.

To perform high-speed writing in the communications system 1A, the data packets are transmitted from the host device 100 in the half-duplex mode. The main data obtained by the packet analysis unit 163 is then stored into the memory unit included in the remote device 480 via the network interface unit 470 and the network communication channel 481.

The network communication channel 481 may be formed either using a wired network or using a wireless network.

The communications system 1A also enables both high-speed data transfer using the half-duplex mode and prompt processing of an interrupt request during communication performed in the half-duplex mode in the same manner as the communications system 1.

Second Embodiment 2.1 Structure of Communications System

Figure 5:
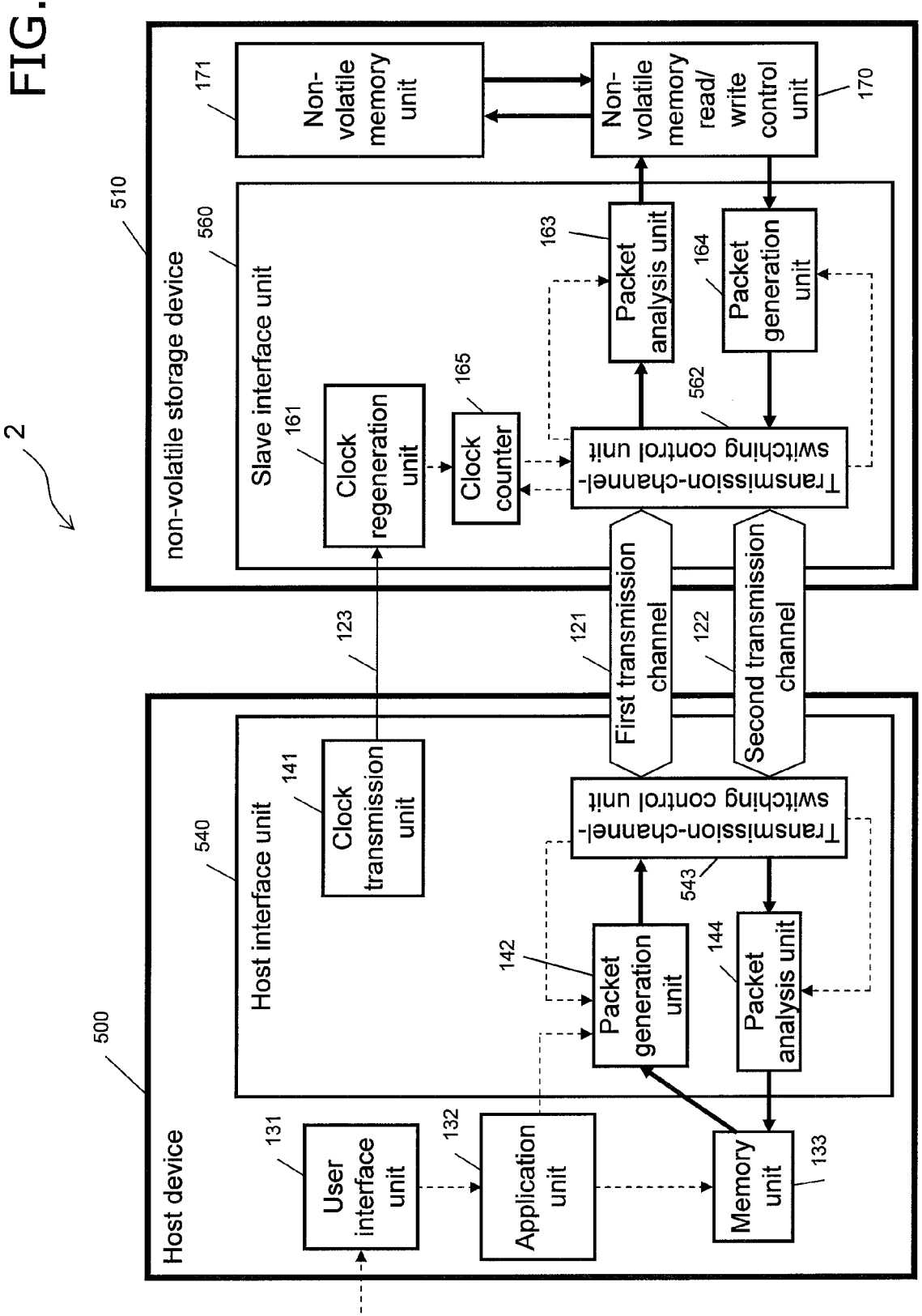
FIG. 5 is a block diagram showing a structure according to a second embodiment of the present invention.

FIG. 5 is a block diagram showing the structure of a communications system 2 according to a second embodiment of the present invention.

As shown in FIG. 5, the communications system 2 includes a host device 500 and a non-volatile storage device 510, which functions as a slave device. The host device 500 and the non-volatile storage device 510 are connected to each other with a first transmission channel 121, a second transmission channel 122, and a clock transmission channel 123.

The host device 500 includes at least a user interface unit 131, an application unit 132, a memory unit 133, and a host interface unit 540.

The host interface unit 540 includes a clock transmission unit 141, a packet generation unit 142, a transmission-channel-switching control unit 543, and a packet analysis unit 144. The host interface unit 540 differs from the host interface unit 140 of the first embodiment in that the host interface unit 540 does not include a clock counter.

The non-volatile storage device 510 includes at least a slave interface unit 560, a non-volatile memory read/write control unit 170, and a non-volatile memory unit 171.

The slave interface unit 560 includes a clock regeneration unit 161, a transmission-channel-switching control unit 562, a packet analysis unit 163, a packet generation unit 164, and a clock counter 165.

The components in the present embodiment that are the same as the components in the first embodiment are given the same reference numerals as those components, and will not be described in detail.

Figure 6A:
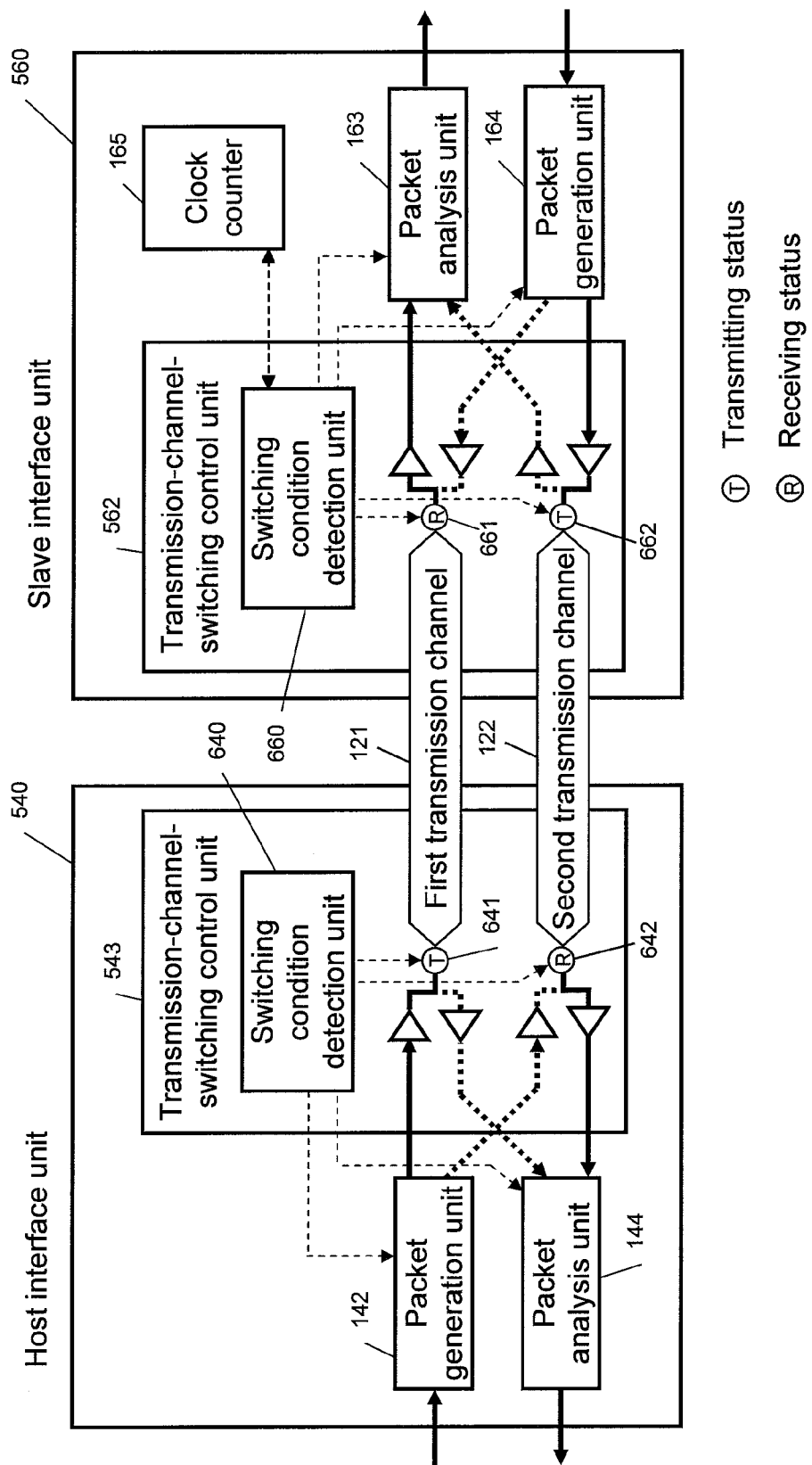
FIGS. 6A to 6C are block diagrams showing a detailed structure of a transmission-channel-switching control unit in the second embodiment.
Figure 6B:
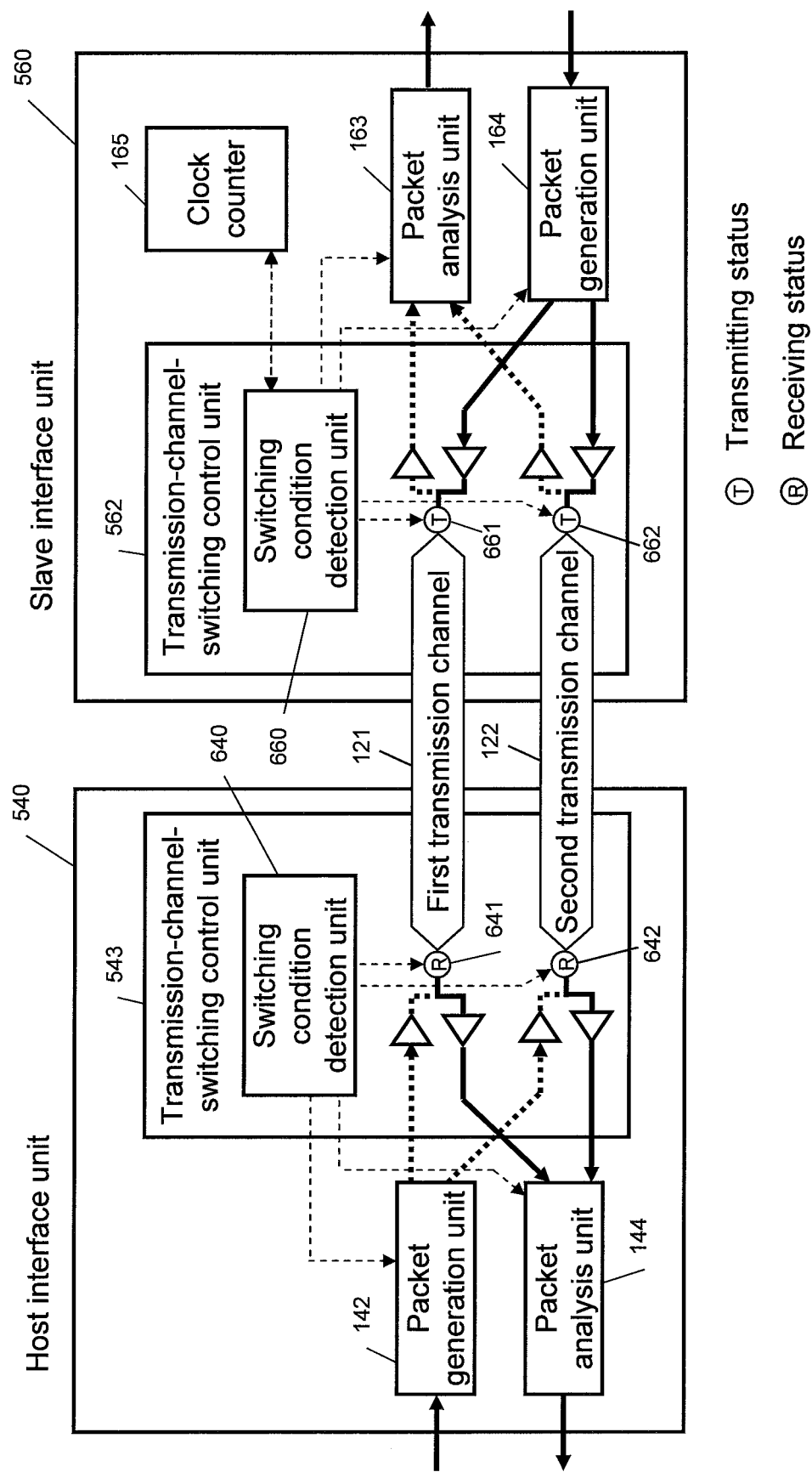
Figure 6C:
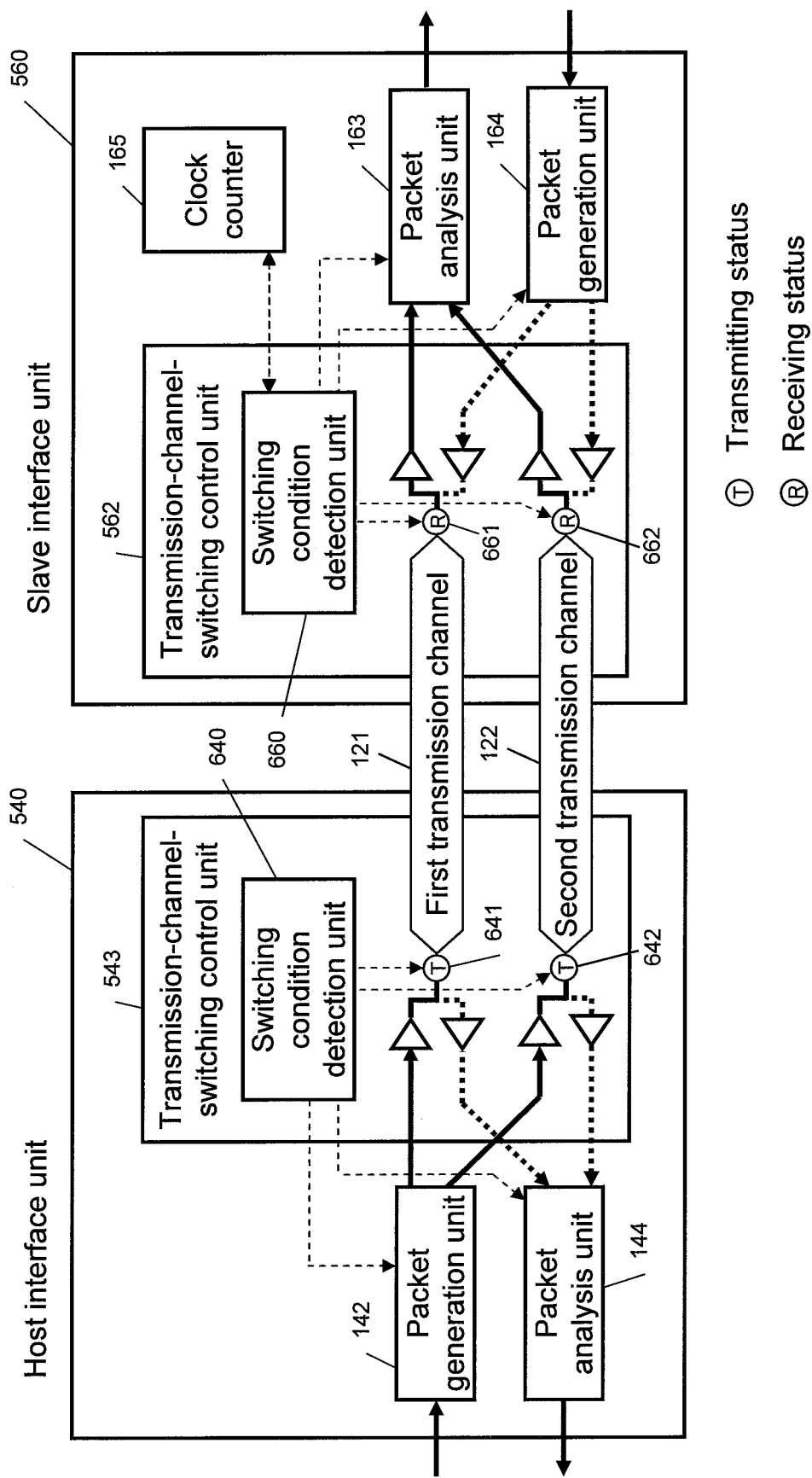

FIGS. 6A to 6C show the structure of the host interface unit 540 and the slave interface unit 560. In particular, FIGS. 6A to 6C show in detail the structure of the transmission-channel-switching control unit 543 included in the host device and the transmission-channel-switching control unit 562 included in the slave device.

As shown in FIGS. 6A to 6C, the transmission-channel-switching control unit 543 included in the host device includes a switching condition detection unit 640 of the host interface unit 540, an input/output terminal 641 of the first transmission channel 121 included in the host interface unit 540, and an input/output terminal 642 of the second transmission channel 122 included in the host interface unit 540.

The transmission-channel-switching control unit 562 included in the slave device includes a switching condition detection unit 660 of the slave interface unit 560, an input/output terminal 661 of the first transmission channel 121 included in the slave interface unit 560, and an input/output terminal 662 of the second transmission channel 122 included in the slave interface unit 560.

The switching condition detection unit 640 included in the host device monitors the status of the packet generation unit 142 and the packet analysis unit 144, and determines whether the switching condition is satisfied. The switching condition detection unit 640 then sets the input/output terminals 641 and 642 to a transmitting status or a receiving status depending on whether the switching condition is satisfied.

In the same manner, the switching condition detection unit 660 monitors the status of the packet analysis unit 163, the packet generation unit 164, and the clock counter 165, and determines whether the switching condition is satisfied. The switching condition detection unit 660 then sets the input/output terminals 661 and 662 to a transmitting status or a receiving status depending on whether the switching condition is satisfied.

2.2 Operation of Communications System

FIGS. 7A and 7B and FIGS. 13A and 13B are timing charts showing packets that are transferred on the first transmission channel 121 and the second transmission channel 122 in chronological order in the second embodiment.

The operation of the communications system 2 according to the present embodiment will now be described with reference to FIG. 5 to FIGS. 7A and 7B, and FIGS. 13A and 13B. The operation of the communications system 2 will be described focusing on its differences from the operation of the communications system described in the first embodiment.

2.2.1 High-Speed Reading Operation

Figure 7A:
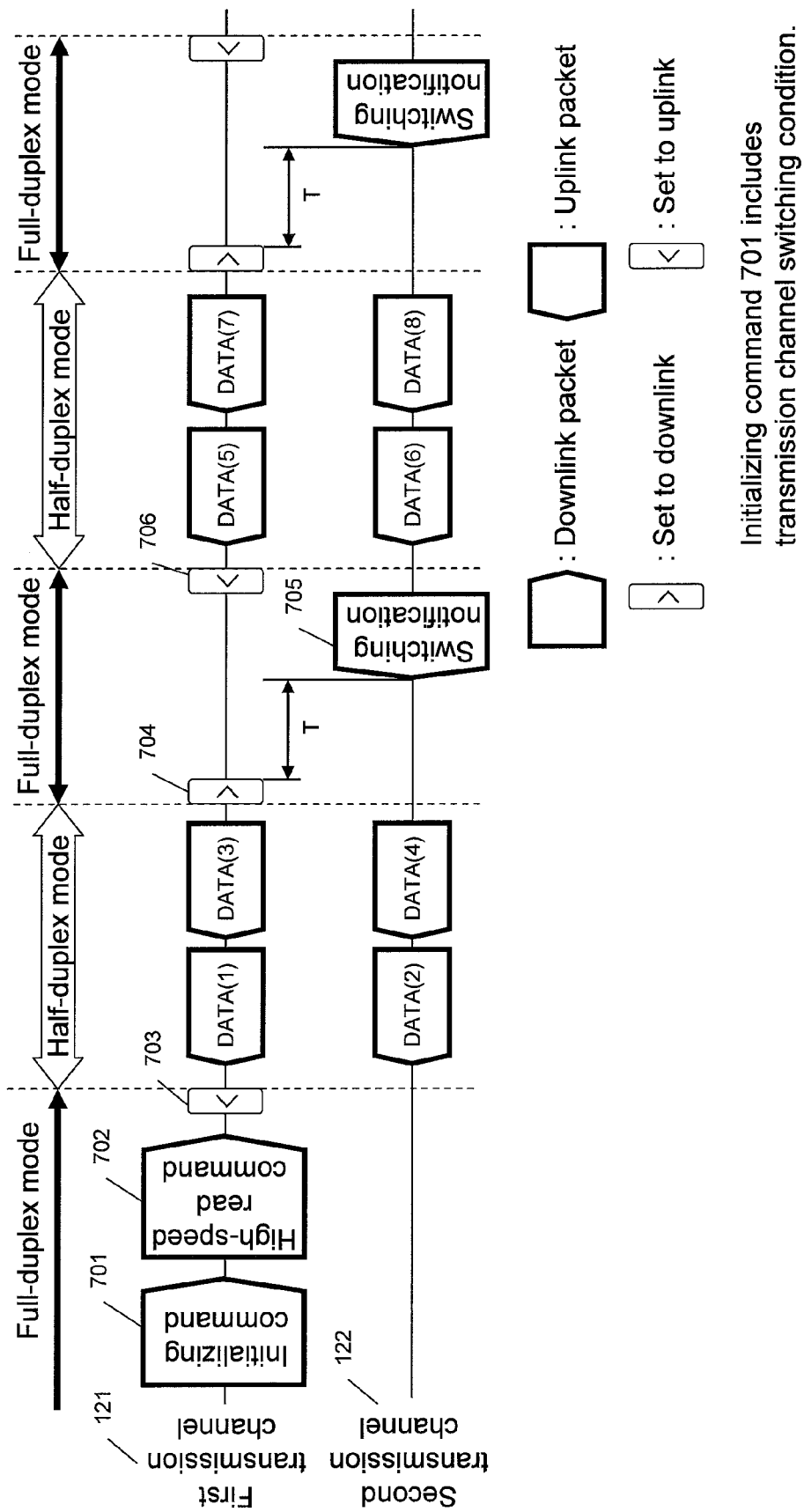
FIGS. 7A and 7B are timing charts showing packets that are transferred on transmission channels in chronological order during high-speed data reading in the second embodiment.

The operation of the communications system 2 performed when the user instructs, using the user interface unit 131, high-speed data reading to be performed will now be described with reference to the timing charts of FIGS. 7A and 7B.

In the same manner as in the first embodiment, the communications system 2 enters the full-duplex mode shown in FIG. 6A when the non-volatile storage device 510 is mounted on the host device 500. In the communications system 2, a high-speed data read command is transmitted to the non-volatile storage device 510 (702) after an initializing command packet is transmitted (701). This sets the first transmission channel 121 to an uplink channel (703). As a result, the communications system 2 enters the half-duplex mode shown in FIG. 6B.

The switching condition detection unit 660 included in the transmission-channel-switching control unit 562 detects that the packet generation unit 164 has transmitted four data packets, and sets the input/output terminal 661 of the first transmission channel 121 to the receiving status.

The switching condition detection unit 640 included in the transmission-channel-switching control unit 543 detects that the packet analysis unit 144 has received four data packets, and sets the input/output terminal 641 of the first transmission channel 121 to the transmitting status.

This sets the first transmission channel 121 to a downlink channel (704), and causes the communications system 2 to enter the full-duplex mode shown in FIG. 6A.

When the first transmission channel 121 is set to the downlink channel, the clock counter 165 starts incrementing its clock number based on clocks provided from the clock regeneration unit 161.

The switching condition detection unit 660 included in the slave interface unit 560 detects that a predetermined time T elapses from when the first transmission channel 121 has been switched to the downlink channel by monitoring the clock counter 165. At this timing, the switching condition detection unit 660 instructs the packet generation unit 164 to generate a packet carrying a switching notification message.

The generated switching notification message packet is then transmitted to the host device 500 via the second transmission channel 122 that is set as an uplink channel (705).

The switching condition detection unit 660 included in the transmission-channel-switching control unit 562 detects that the packet generation unit 164 has transmitted the switching notification message packet, and sets the input/output terminal 661 of the first transmission channel 121 to the transmitting status.

Also, the switching condition detection unit 640 included in the transmission-channel-switching control unit 543 detects that the packet analysis unit 144 has transmitted the switching notification message packet, and sets the input/output terminal 641 of the first transmission channel 121 to the receiving status.

This sets the first transmission channel 121 to an uplink channel (706).

As described above, the use of the switching notification message packet eliminates a clock counter in the host interface unit 540 in the communications system 2. The communications system 2 enables both high-speed data transfer using the half-duplex mode and prompt processing of an interrupt request during communication performed in the half-duplex mode.

Figure 7B:
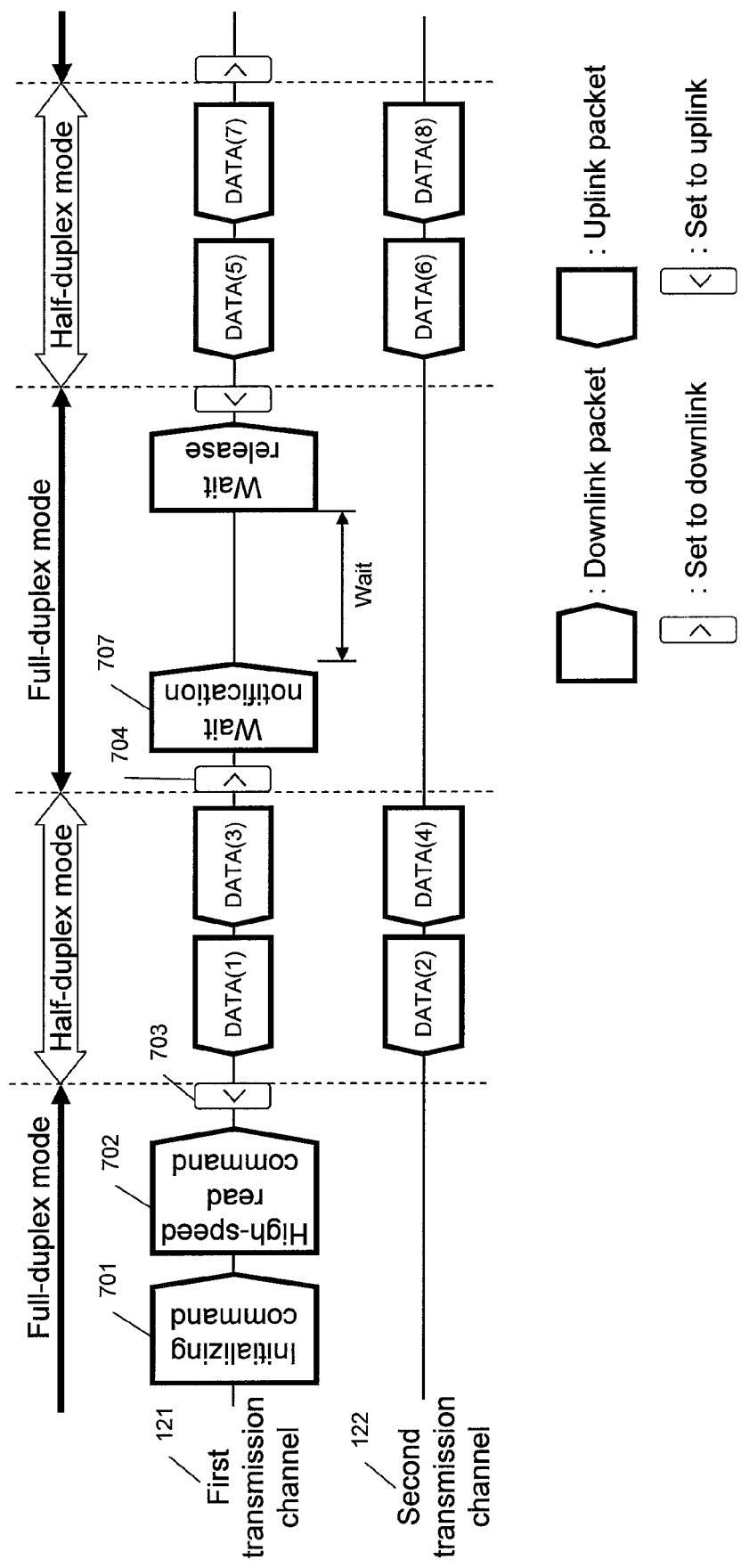

As shown in FIG. 7B, in the same manner as in the first embodiment, the host device 500 can transmit an interrupt request, such as a request associated with a wait status, to the non-volatile storage device 510 (707) while the communications system 2 is in the full-duplex mode shown in FIG. 6A.

2.2.2 High-Speed Writing Operation

Figure 13A:
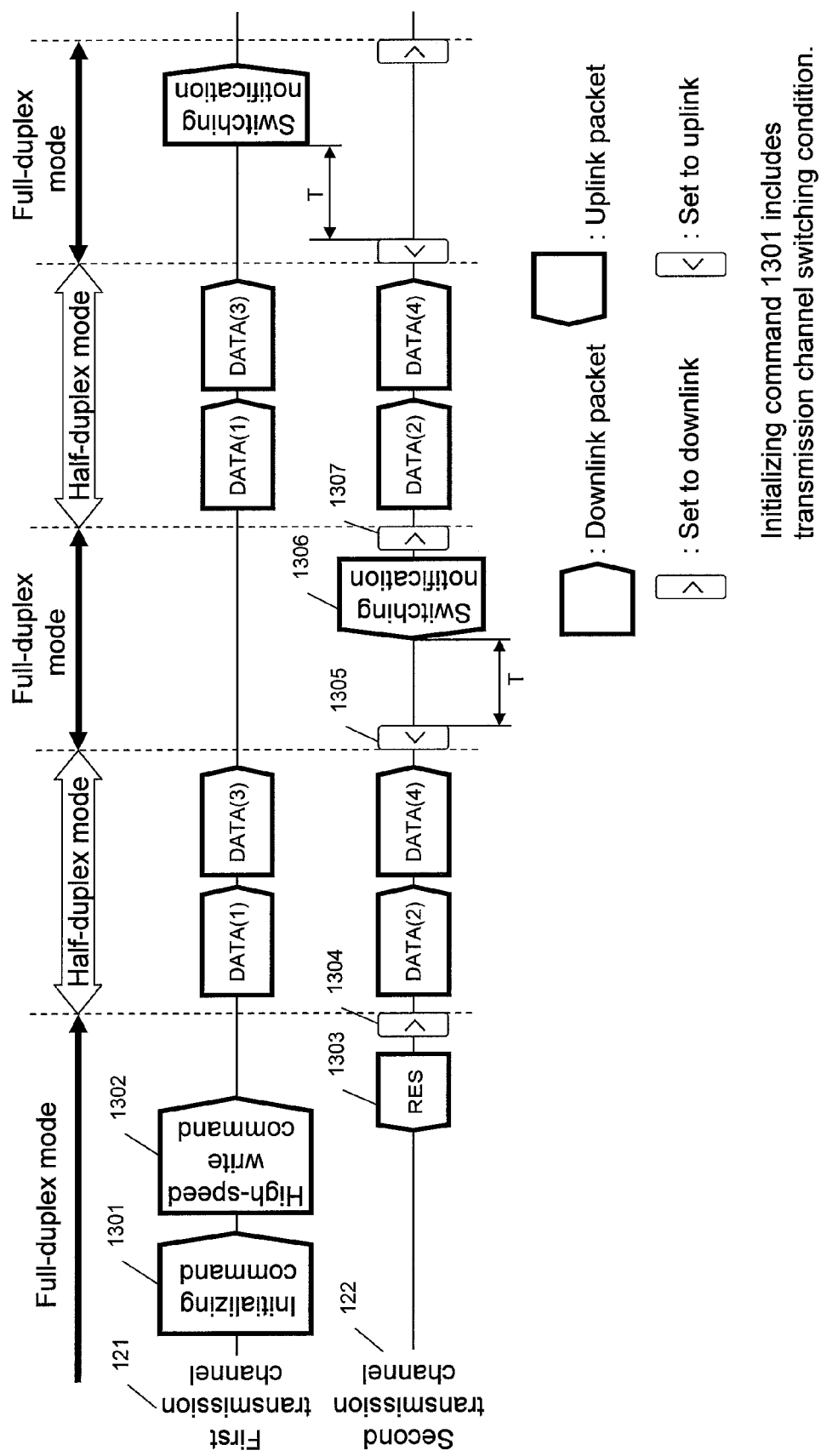
FIGS. 13A and 13B are timing charts showing packets that are transferred on transmission channels in chronological order during high-speed data writing in the second embodiment.

The operation of the communications system 2 performed when the user instructs high-speed data writing to be performed will now be described with reference to the timing charts of FIGS. 13A and 13B, focusing on its differences from the high-speed data reading operation.

In the communications system 2, a high-speed data write command is transmitted to the non-volatile storage device 510 (1302) after an initializing command packet is transmitted (1301). A response packet generated in response to the high-speed write command is then transmitted from the non-volatile storage device 510 to the host device 500 (1303). This sets the second transmission channel 122 to a downlink channel (1304). As a result, the communications system 2 enters the half-duplex mode shown in FIG. 6C.

The switching condition detection unit 640 included in the transmission-channel-switching control unit 543 detects that the packet generation unit 142 has transmitted four data packets, and sets the input/output terminal 642 of the second transmission channel 122 to the receiving status.

The switching condition detection unit 660 included in the transmission-channel-switching control unit 562 detects that the packet analysis unit 163 has received four data packets, and sets the input/output terminal 662 of the second transmission channel 122 to the transmitting status.

This sets the second transmission channel 122 to an uplink channel (1305), and causes the communications system 2 to enter the full-duplex mode shown in FIG. 6A.

When the second transmission channel 122 is set to the uplink channel in the communications system 2, the clock counter 165 starts incrementing its clock number based on clocks provided from the clock regeneration unit 161.

The switching condition detection unit 660 included in the slave interface unit 560 detects that the predetermined time T elapses from when the second transmission channel 122 has been switched to the uplink channel by monitoring the clock counter 165. At this timing, the switching condition detection unit 660 instructs the packet generation unit 164 to generate a packet carrying a switching notification message.

The generated switching notification message packet is then transmitted to the host device 500 via the second transmission channel 122 that is set as an uplink channel (1306).

The switching condition detection unit 660 included in the transmission-channel-switching control unit 562 detects that the packet generation unit 164 has transmitted the switching notification message packet, and sets the input/output terminal 662 of the second transmission channel 122 to the receiving status.

Also, the switching condition detection unit 640 included in the transmission-channel-switching control unit 543 detects that the packet analysis unit 144 has received the switching notification message packet, and sets the input/output terminal 642 of the second transmission channel 122 to the transmitting status.

This sets the second transmission channel 122 to a downlink channel (1307).

As described above, the use of the switching notification message packet eliminates a clock counter in the host interface unit 540 in the communications system 2. The communications system 2 enables both high-speed data transfer using the half-duplex mode and prompt processing of an interrupt request during communication performed in the half-duplex mode.

Figure 13B:
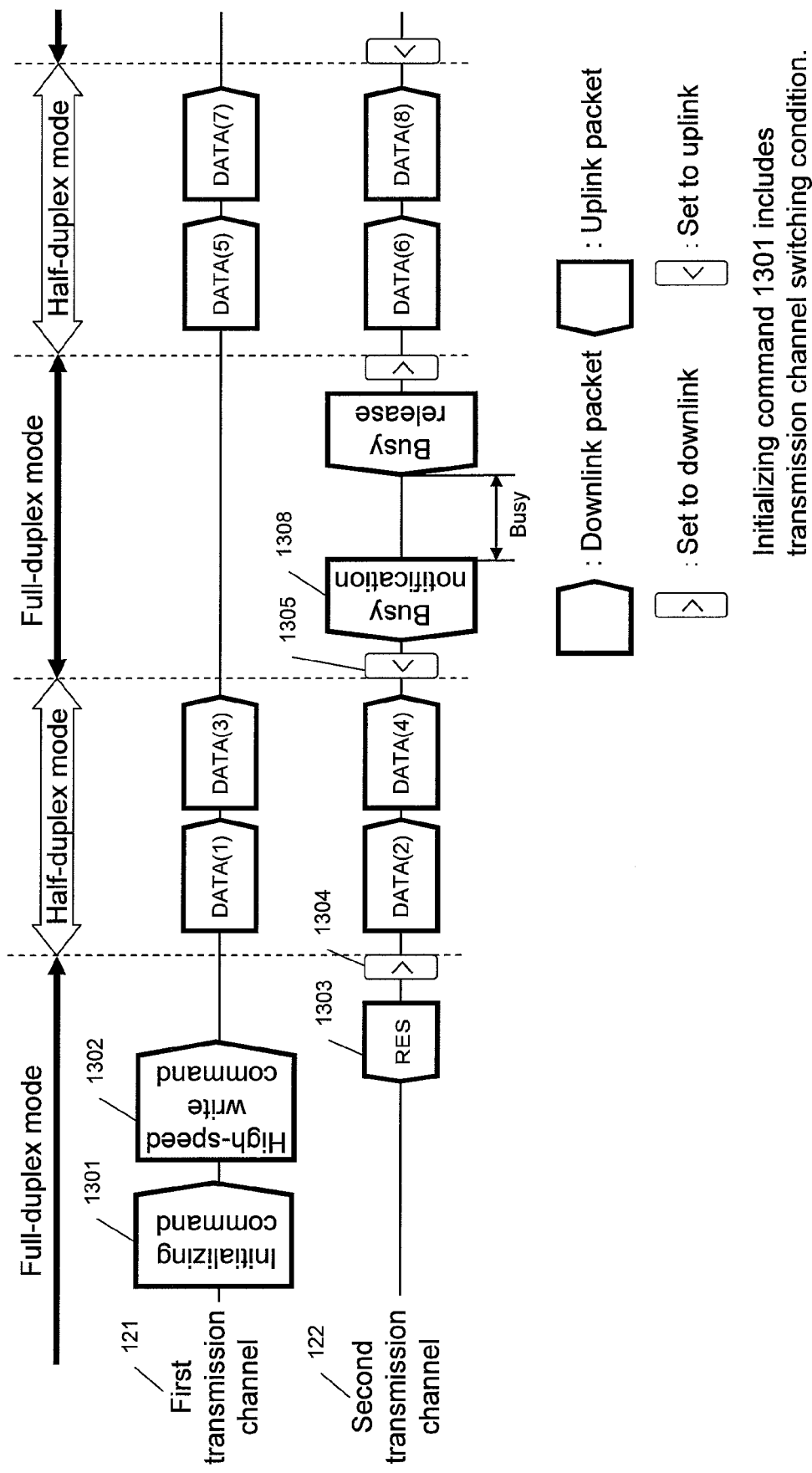

As shown in FIG. 13B, in the same manner as in the first embodiment, the non-volatile storage device 510 can transmit an interrupt request, such as a request associated with a busy status, to the host device 500 (1308) while the communications system 2 is in the full-duplex mode shown in FIG. 6A.

As described above, the communications system 2 of the present embodiment, which transmits a packet carrying a switching notification message from the non-volatile storage device 510 to the host device 500 to notify the timing at which the communication mode is to be switched from the full-duplex mode to the half-duplex mode, has the same advantageous effects as the communications system of the first embodiment without requiring the host device 500 to include a clock counter.

Alternatively, the host device 500 may include a clock counter, and the non-volatile storage device 510 may not include a clock counter. In this case, the host device 500 transmits a packet carrying a switching notification message to the non-volatile storage device 510.

Although the present embodiment describes the case in which data packets are not transmitted in the full-duplex mode, data packets may be transmitted and received using the first transmission channel 121 and the second transmission channel 122 during communication performed in the full-duplex mode. In this case, when data packets are being transmitted after the predetermined time T elapses, a packet carrying a switching notification message may be transmitted after transmission of the data packets is completed. This enables data transfer to be completed in a reliable manner without requiring the transmission of the data packets to be suspended during communication performed in the full-duplex mode.

Third Embodiment 3.1 Structure of Communications System

FIG. 8 is a block diagram showing the structure of a communications system 3 according to a third embodiment of the present invention.

As shown in FIG. 8, the communications system 3 includes a host device 800 and a non-volatile storage device 810, which functions as a slave device. The host device 800 and the non-volatile storage device 810 are connected to each other with a first transmission channel 121, a second transmission channel 122, and a clock transmission channel 123.

The host device 800 includes at least a user interface unit 131, an application unit 132, a memory unit 133, and a host interface unit 840.

The host interface unit 840 includes a clock transmission unit 141, a packet generation unit 142, a transmission-channel-switching control unit 843, and a packet analysis unit 144. The host interface unit 840 differs from the host interface unit 140 of the first embodiment in that the host interface unit 840 does not include a clock counter.

The non-volatile storage device 810 includes at least a slave interface unit 860, a non-volatile memory read/write control unit 170, and a non-volatile memory unit 171.

The slave interface unit 860 includes a clock regeneration unit 161, a transmission-channel-switching control unit 862, a packet analysis unit 163, and a packet generation unit 164. The slave interface unit 860 differs from the slave interface units 160 and 560 of the above embodiments in that the slave interface unit 860 does not include a clock counter.

The communications system 3 differs from the communications systems 1, 1A, and 2 of the above embodiments in that both the host device and the slave device of the communications system 3 do not include a clock counter.

The components in the present embodiment that are the same as the components in the above embodiments are given the same reference numerals as those components, and will not be described in detail.

Figure 9A:
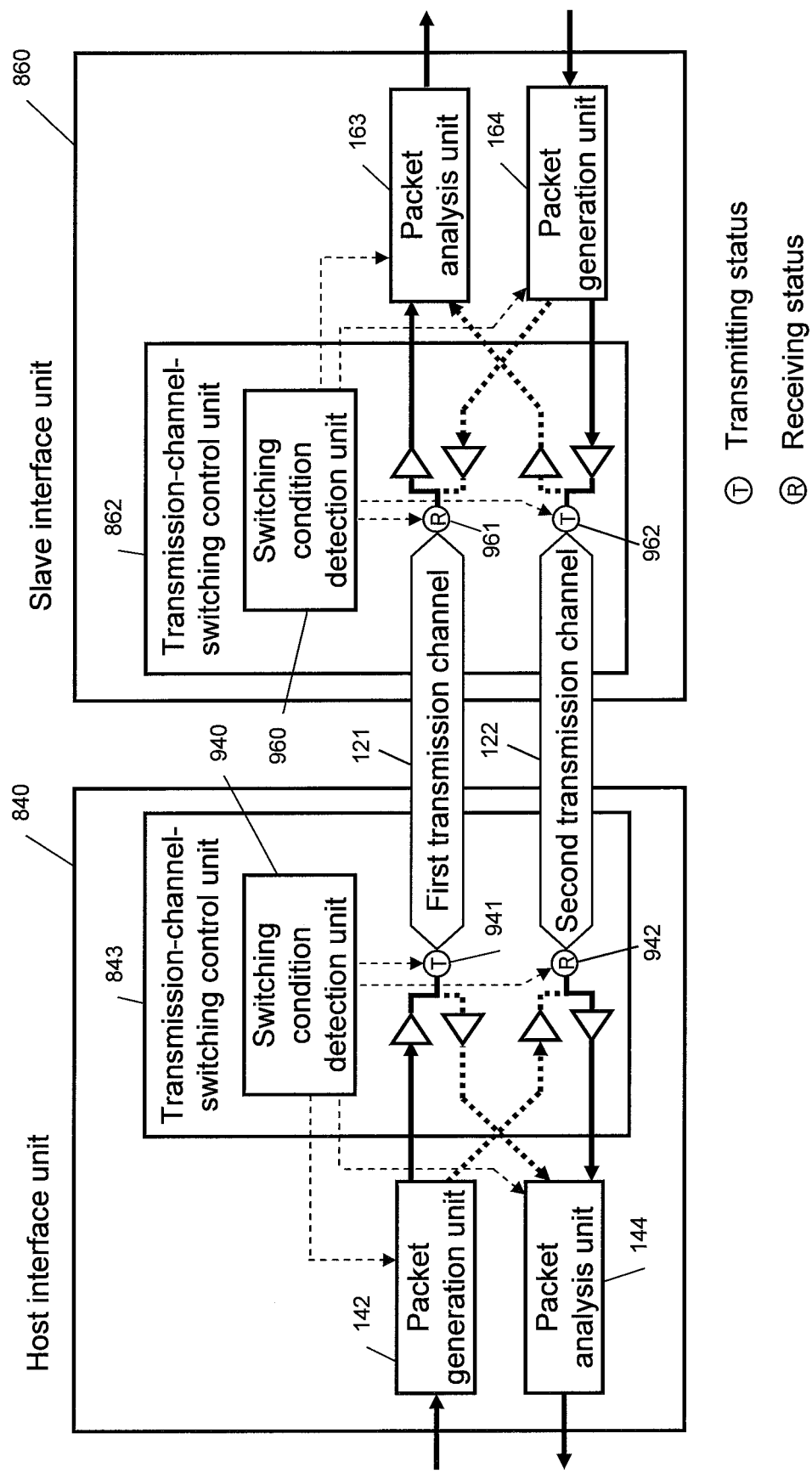
FIGS. 9A to 9C are block diagrams showing a detailed structure of a transmission-channel-switching control unit in the third embodiment.
Figure 9B:
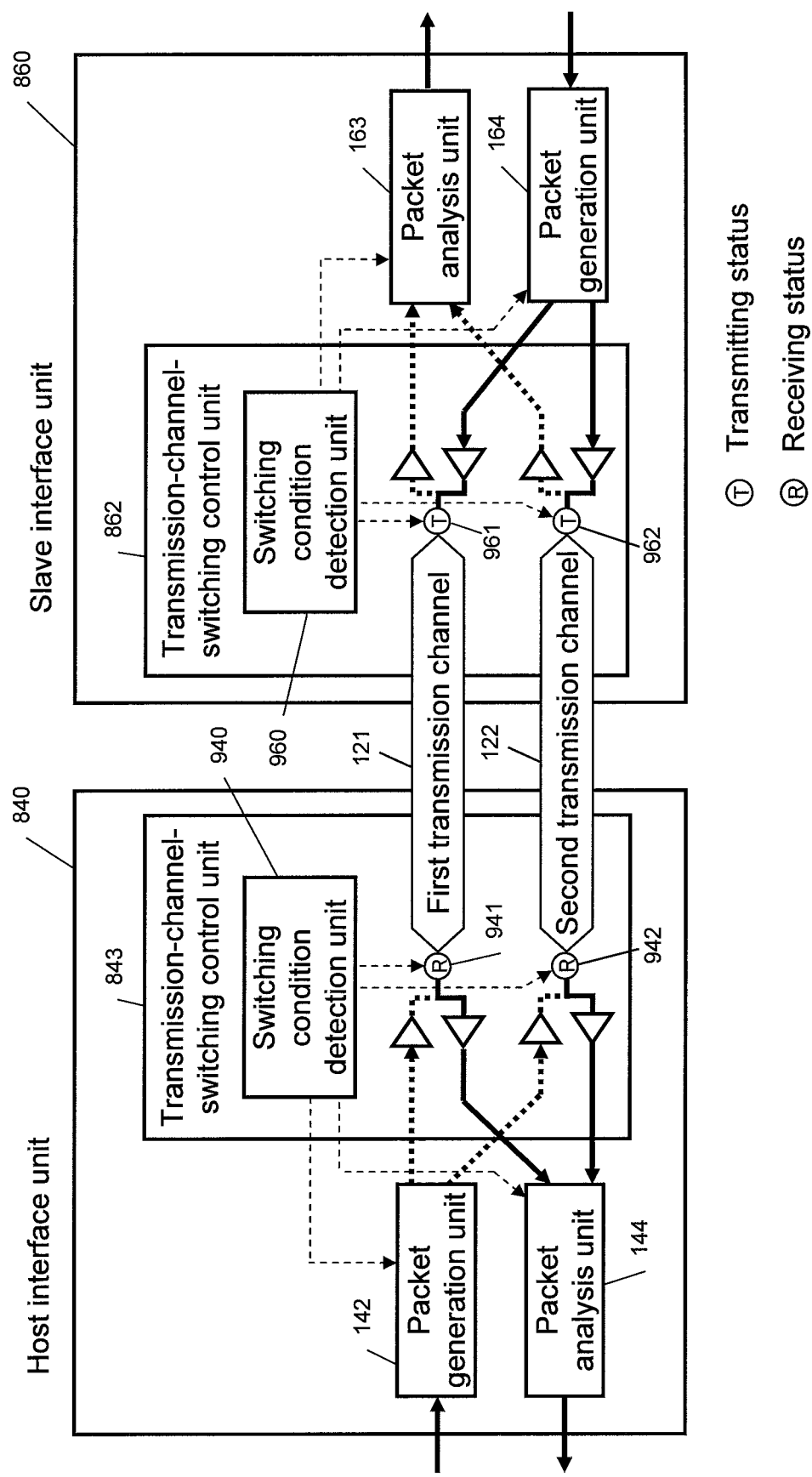
Figure 9C:
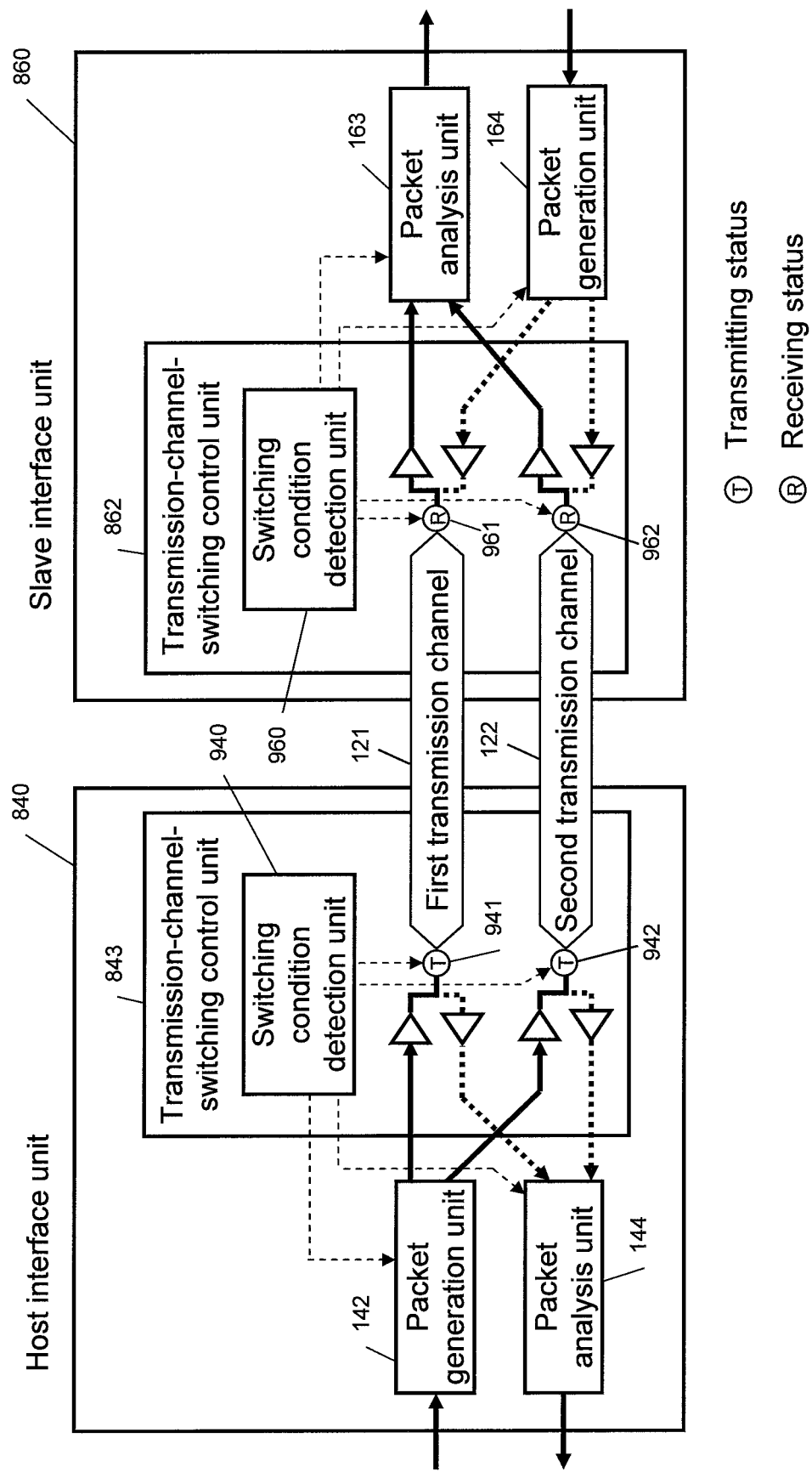

FIGS. 9A to 9C show the structure of the host interface unit 840 and the slave interface unit 860. In particular, FIGS. 9A to 9C show in detail the structure of the transmission-channel-switching control unit 843 included in the host device and the transmission-channel-switching control unit 862 included in the slave device.

As shown in FIGS. 9A to 9C, the transmission-channel-switching control unit 843 included in the host device includes a switching condition detection unit 940 of the host interface unit 840, an input/output terminal 941 of the first transmission channel 121 included in the host interface unit 840, and an input/output terminal 942 of the second transmission channel 122 included in the host interface unit 840.

The transmission-channel-switching control unit 862 included in the slave device includes a switching condition detection unit 960 of the slave interface unit 860, an input/output terminal 961 of the first transmission channel 121 included in the slave interface unit 860, and an input/output terminal 962 of the second transmission channel 122 included in the slave interface unit 860.

The switching condition detection unit 940 included in the host device monitors the status of the packet generation unit 142 and the packet analysis unit 144, and determines whether the switching condition is satisfied. The switching condition detection unit 940 then sets the input/output terminals 941 and 942 to a transmitting status or a receiving status depending on whether the switching condition is satisfied.

In the same manner, the switching condition detection unit 960 monitors the status of the packet analysis unit 163 and the packet generation unit 164, and determines whether the switching condition is satisfied. The switching condition detection unit 960 then sets the input/output terminals 961 and 962 to a transmitting status or a receiving status depending on whether the switching condition is satisfied.

3.2 Operation of Communications System

Figure 10A:
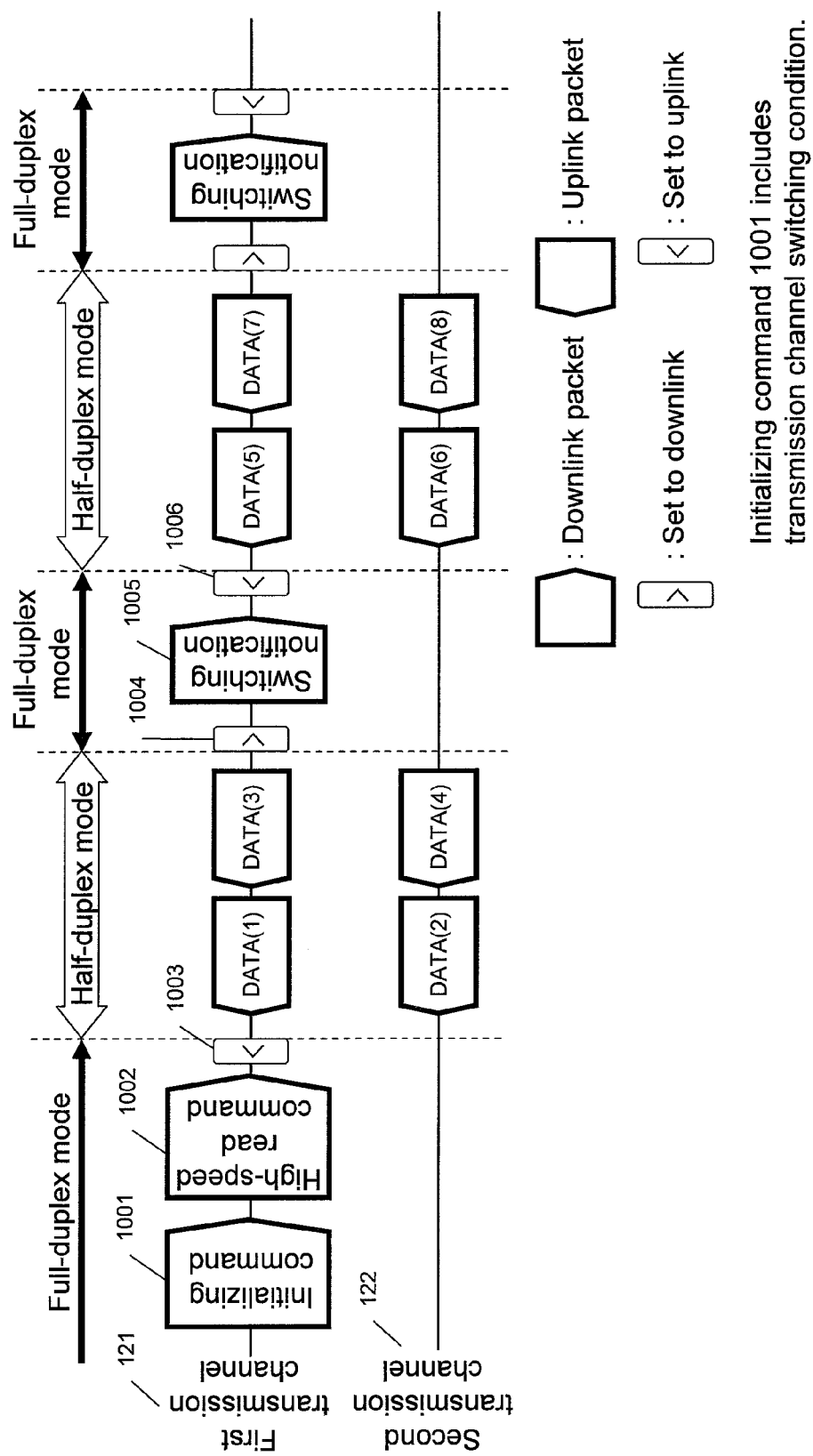
FIGS. 10A and 10B are timing charts showing packets that are transferred on transmission channels in chronological order during high-speed data reading in the third embodiment.
Figure 10B:
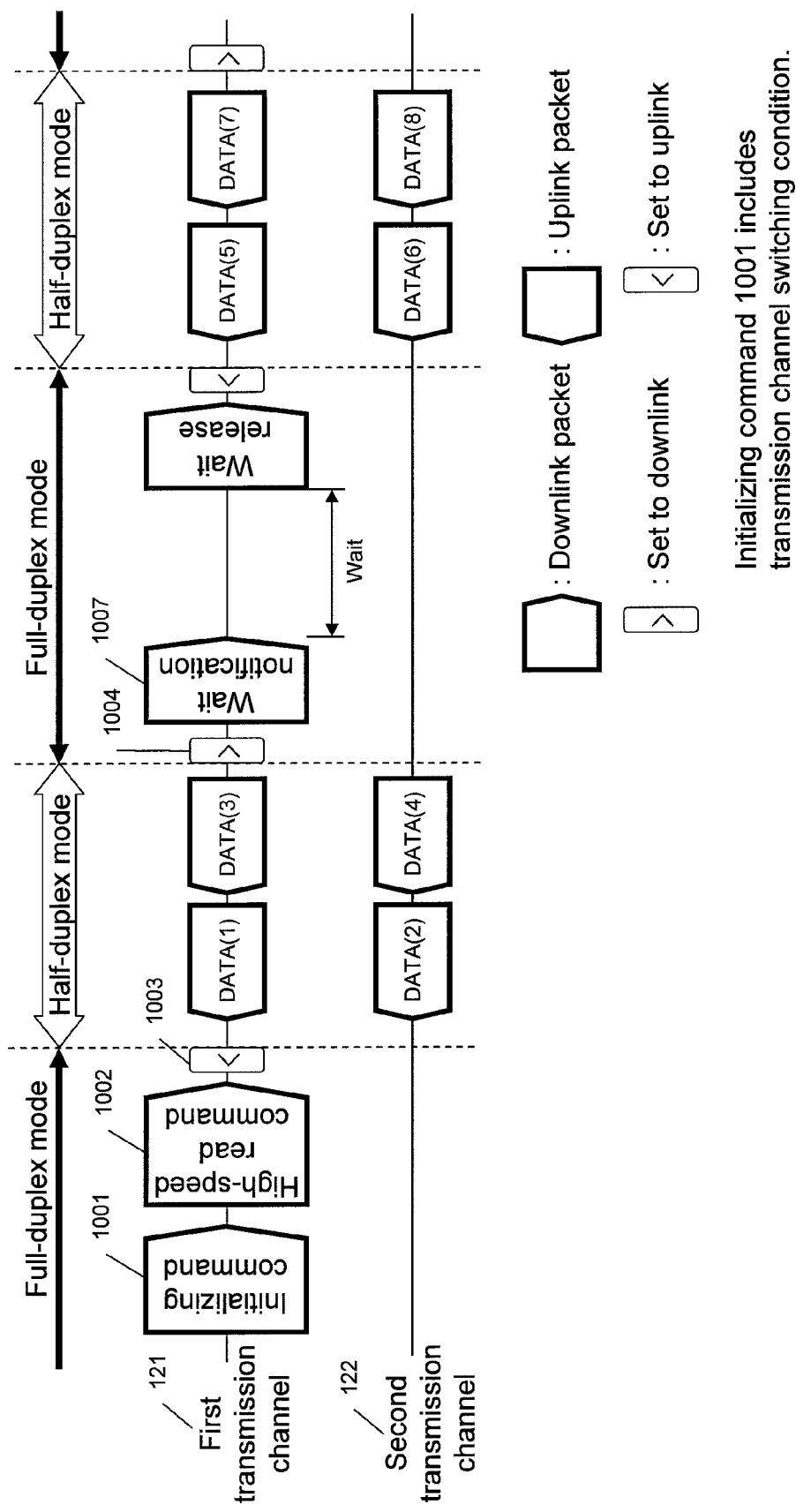
Figure 11A:
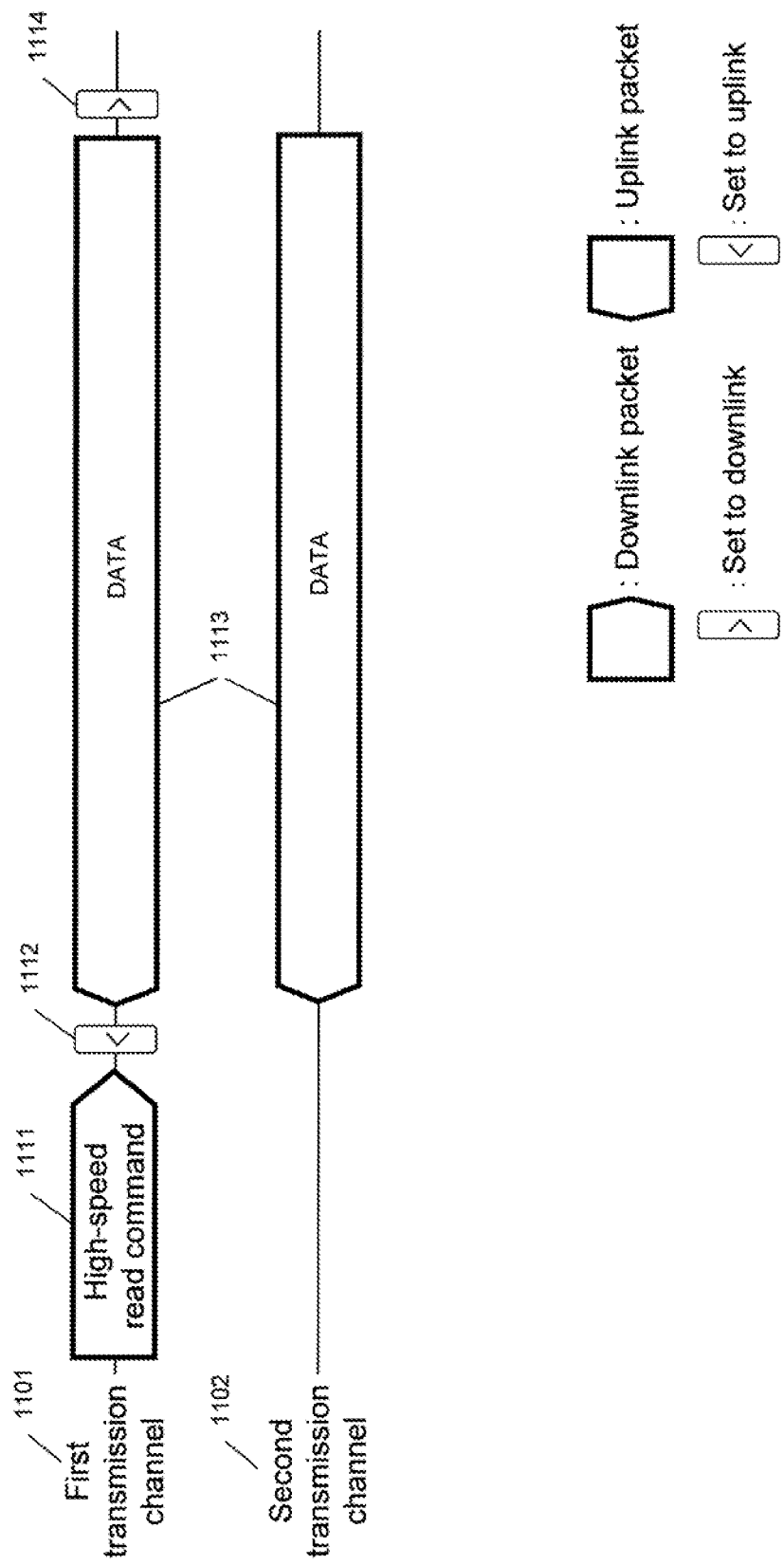
FIGS. 11A and 11B are timing charts showing packets that are transferred on transmission channels in chronological order in a conventional non-volatile storage system.
Figure 11B:
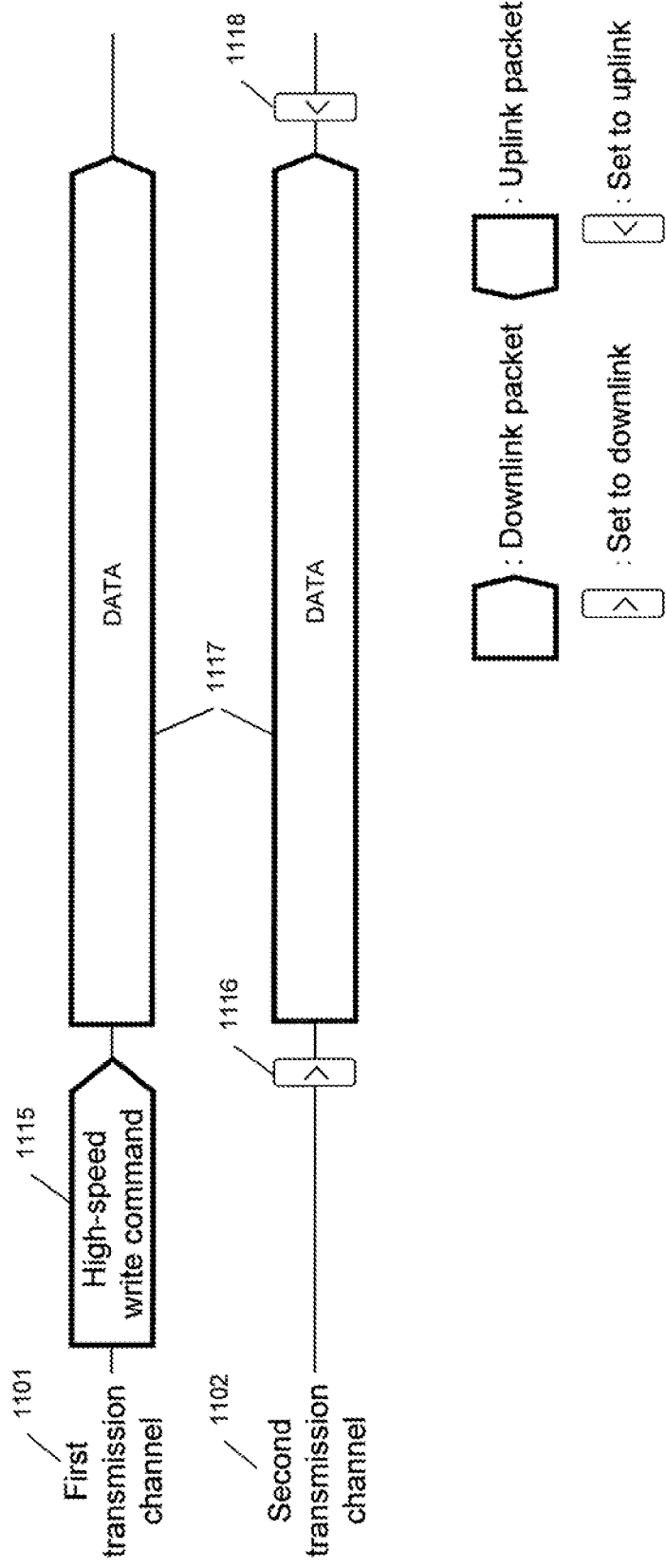

FIGS. 10A and 10B are timing charts showing packets that are transferred on the first transmission channel 121 and the second transmission channel 122 in chronological order in the third embodiment.

The operation of the communications system 3 according to the present embodiment will now be described with reference to FIG. 8 to FIGS. 10A and 10B, and FIGS. 14A and 14B. The operation of the communications system 3 will be described focusing on its differences from the operation of the communications systems described in the above embodiments.

3.2.1 High-Speed Reading Operation

The operation of the communications system 3 performed when the user instructs, using the user interface unit 131, high-speed data reading to be performed will now be described with reference to the timing charts of FIGS. 10A and 10B.

After the non-volatile storage device 810 is mounted on the host device 800, an initializing command packet is transmitted (1001), the first transmission channel 121 is set to an uplink channel (1003), and the communications system 3 enters the half-duplex mode shown in FIG. 9B. After four data packets are transmitted and received in the communications system 3, the first transmission channel 121 is set to a downlink channel (1004), and the communications system 3 enters the full-duplex mode shown in FIG. 9A. The operation of the communications system 3 up to this stage is the same as the operation described in the first and second embodiments.

At the timing when the first transmission channel 121 is set to a downlink channel, or at a predetermined timing before the first transmission channel 121 is set to a downlink channel, the switching condition detection unit 940 included in the transmission-channel-switching control unit 843 monitors the packet generation unit 142 and detects whether a command is to be transmitted from the host device 800 to the non-volatile storage device 810.

When detecting no command to be transmitted, the switching condition detection unit 940 instructs the packet generation unit 142 to generate a packet carrying a switching notification message. The generated switching notification message packet is then transmitted to the non-volatile storage device 810 via the first transmission channel 121 (1005).

The switching condition detection unit 940 included in the transmission-channel-switching control unit 843 detects that the packet generation unit 142 has transmitted the switching notification message packet, and sets the input/output terminal 941 of the first transmission channel 121 to the receiving status.

The switching condition detection unit 960 included in the transmission-channel-switching control unit 862 detects that the packet analysis unit 163 has transmitted the switching notification message packet, and sets the input/output terminal 961 of the first transmission channel 121 to the transmitting status.

This sets the first transmission channel 121 to an uplink channel (1006), and causes the communications system 3 to enter the half-duplex mode shown in FIG. 9B.

As shown in FIG. 10B, the switching condition detection unit 940 included in the transmission-channel-switching control unit 843 may detect that the packet generation unit 142 has a packet to be transmitted when the first transmission channel 121 is set to a downlink channel (for example, a packet carrying a wait notification message). In this case, the packet generation unit 142 immediately transmits the packet to the non-volatile storage device 810 (1007).

This enables the host device 800 to transmit an interrupt request to the non-volatile storage device 810.

3.2.2 High-Speed Writing Operation

Figure 14A:
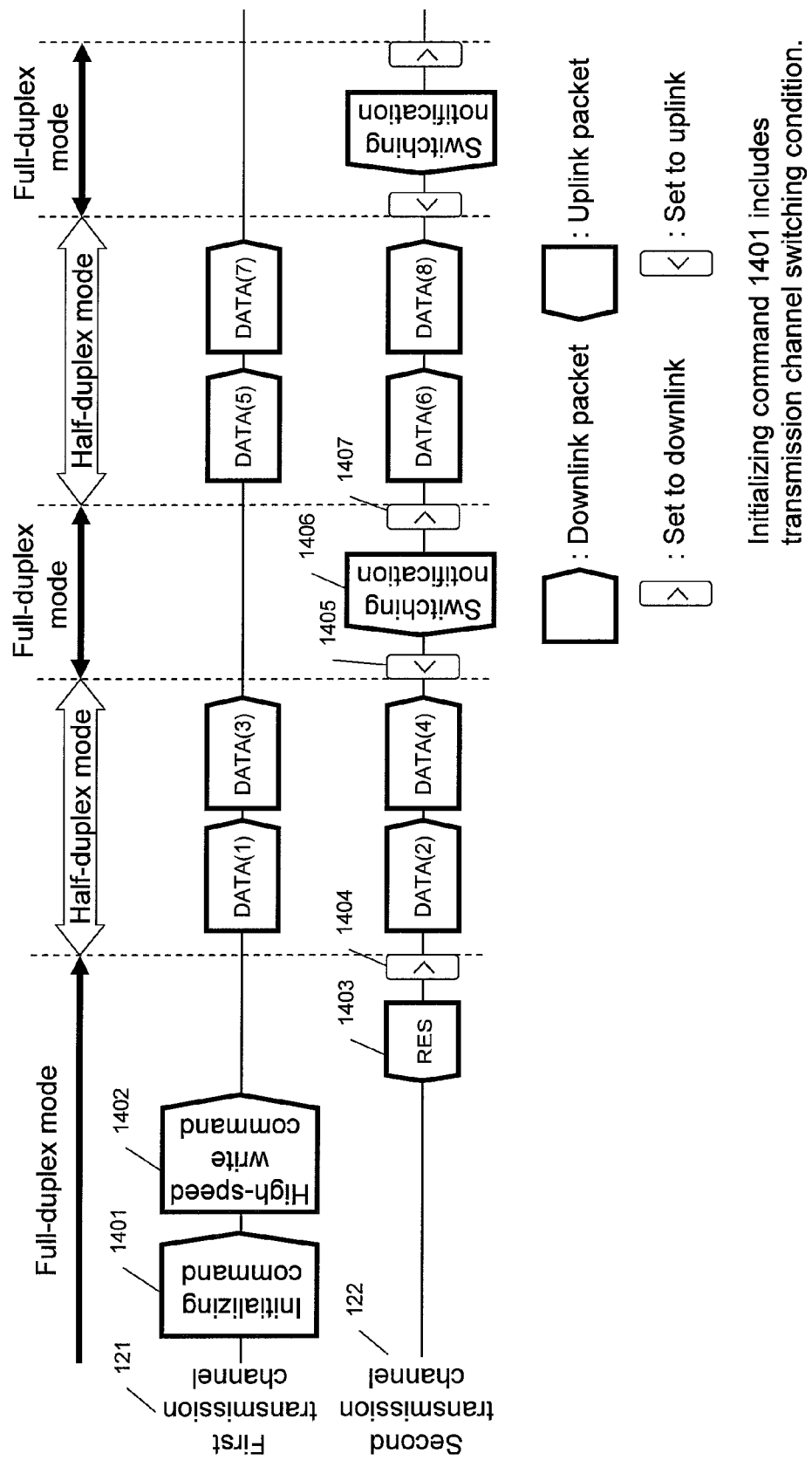
FIGS. 14A and 14B are timing charts showing packets that are transferred on transmission channels in chronological order during high-speed data writing in the third embodiment.

The operation of the communications system 3 performed when the user instructs high-speed data writing to be performed will now be described with reference to the timing charts of FIGS. 14A and 14B, focusing on its differences from the high-speed data reading operation.

In the communications system 3, an initializing command packet is transmitted (1401), a response packet generated in response to the initializing command packet is returned (1403), and the second transmission channel 122 is set to a downlink channel (1404) and the communications system 3 enters the half-duplex mode shown in FIG. 9C. After four data packets are transmitted and received, the second transmission channel 122 is set to an uplink channel (1405) and the communications system 3 enters the full-duplex mode shown in FIG. 9A.

The operation of the communications system 3 up to this stage is the same as the operation described in the first and second embodiments.

At the timing when the second transmission channel 122 is set to an uplink channel, or at a predetermined timing before the second transmission channel 122 is set to an uplink channel, the switching condition detection unit 960 included in the transmission-channel-switching control unit 862 monitors the packet generation unit 164 and detects whether a command is to be transmitted from the non-volatile storage device 810 to the host device 800.

When detecting no command to be transmitted, the switching condition detection unit 960 instructs the packet generation unit 164 to generate a packet carrying a switching notification message. The generated switching notification message packet is then transmitted to the host device 800 via the second transmission channel 122 (1406). The switching condition detection unit 960 included in the transmission-channel-switching control unit 862 detects that the packet generation unit 164 has transmitted the switching notification message packet, and sets the input/output terminal 962 of the second transmission channel 122 to the receiving status. The switching condition detection unit 940 included in the transmission-channel-switching control unit 843 detects that the packet analysis unit 144 has transmitted the switching notification message packet, and sets the input/output terminal 942 of the second transmission channel 122 to the transmitting status.

This sets the second transmission channel 122 to a downlink channel (1407), and causes the communications system 3 to enter the half-duplex mode shown in FIG. 9C.

Figure 14B:
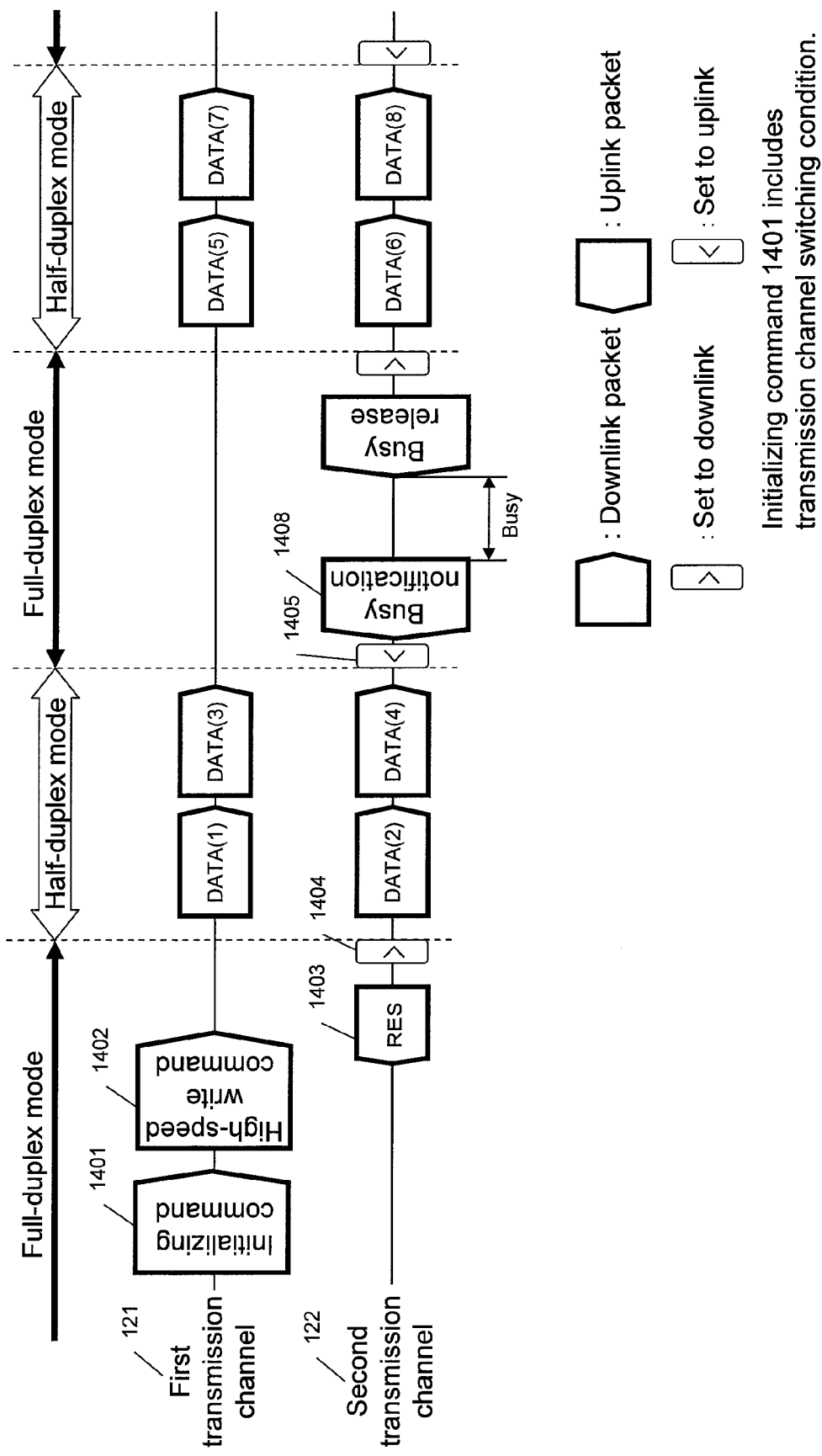

As shown in FIG. 14B, the switching condition detection unit 960 included in the transmission-channel-switching control unit 862 may detect that the packet generation unit 164 has a packet to be transmitted (for example, a packet carrying a busy notification message) when the second transmission channel 122 is set to an uplink channel. In this case, the packet generation unit 164 immediately transmits the packet to the host device 800 (1408).

This enables the non-volatile storage device 810 to transmit an interrupt request to the host device 800.

As described above, the communications system 3 of the present embodiment transmits a packet carrying a switching notification message to notify the timing at which the communication mode is to be switched from the full-duplex mode to the half-duplex mode from the host device 800 to the non-volatile storage device 810 when high-speed reading is performed, and from the non-volatile storage device 810 to the host device 800 when high-speed writing is performed. As a result, the communications system 3 eliminates the need for timing using a clock counter when switching from the full-duplex mode to the half-duplex mode.

When no interrupt request, such as a request associated with a wait status or a busy status, is to be transmitted, the communications system 3 of the present embodiment immediately transmits a packet carrying a switching notification message to resume transfer of data packets in the half-duplex mode. This increases the efficiency of transmission channels further.

Fourth Embodiment

A fourth embodiment of the present invention will now be described with reference to FIGS. 22 to 28.

The components in the present embodiment that are the same as the components in the above embodiments are given the same reference numerals as those components, and will not be described in detail.

4.1 Structure of Communications System

Figure 22:
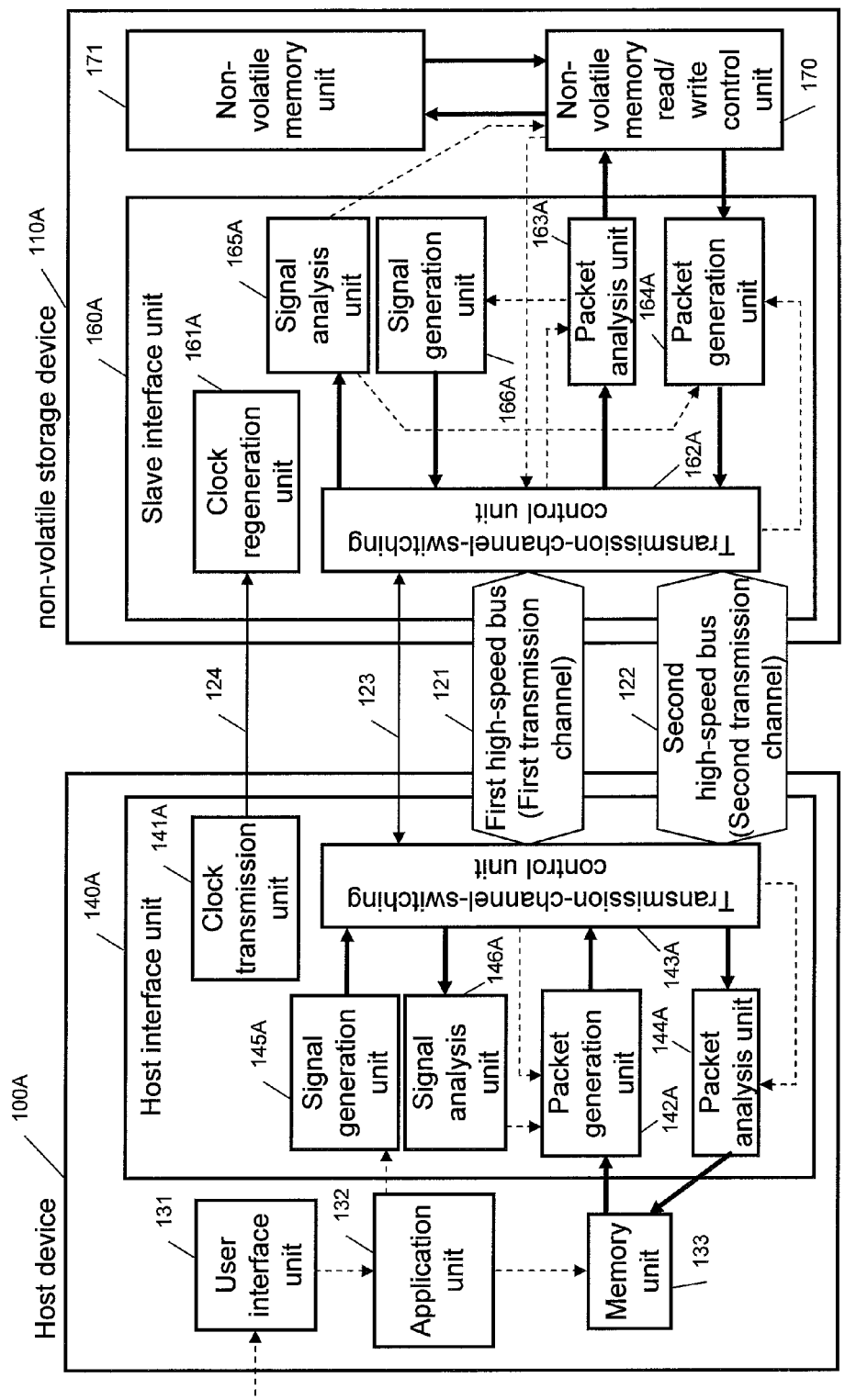
FIG. 22 is a block diagram showing a structure according to a fourth embodiment of the present invention.

FIG. 22 is a block diagram showing the structure of a communications system 4 according to the fourth embodiment of the present invention.

As shown in FIG. 22, the communications system 4 includes a host device 100A and a non-volatile storage device 110A, which functions as a slave device. The host device 100A and the non-volatile storage device 110A are connected to each other with a first transmission channel (first high-speed bus) 121, a second transmission channel (second high-speed bus) 122, a third transmission channel (low-speed bus) 123, and a clock transmission channel (clock bus) 124.

The host device 100A includes at least a user interface unit 131, an application unit 132, a memory unit 133, and a host interface unit 140A.

The host interface unit 140 includes a clock transmission unit 141A, a packet generation unit 142A, a transmission channel (bus) switching control unit 143A, a packet analysis unit 144A, a signal generation unit 145A, and a signal analysis unit 146A.

The non-volatile storage device 110 includes a slave interface unit 160A, a non-volatile memory read/write control unit 170, and a non-volatile memory unit 171.

The slave interface unit 160A includes a clock regeneration unit 161A, a transmission channel (bus) switching control unit 162A, a packet analysis unit 163A, a packet generation unit 164A, a signal analysis unit 165A, and a signal generation unit 166A.

Each of the packet generation units 142A and 164A and the packet analysis units 144A and 163A includes a buffer with an appropriate size.

In typical cases, the high-speed buses use differential signaling, whereas the low-speed bus uses single-ended signaling.

4.2 Operation of Communications System

The operation of the communications system 4 according to the present embodiment will now be described with reference to the drawings.

4.2.1 Activation—Initialization—Steady Status

When the non-volatile storage device 110A is mounted onto the host device 100A, the host interface unit 140A becomes activated. Clocks are provided from the clock transmission unit 141A included in the host interface unit 140A to the clock regeneration unit 161A included in the slave interface unit 160A via the clock bus 124. The slave interface unit 160A then becomes activated. Clocks are generated in the clock regeneration unit 161A and are provided to the entire non-volatile storage device 110A.

Figure 23:
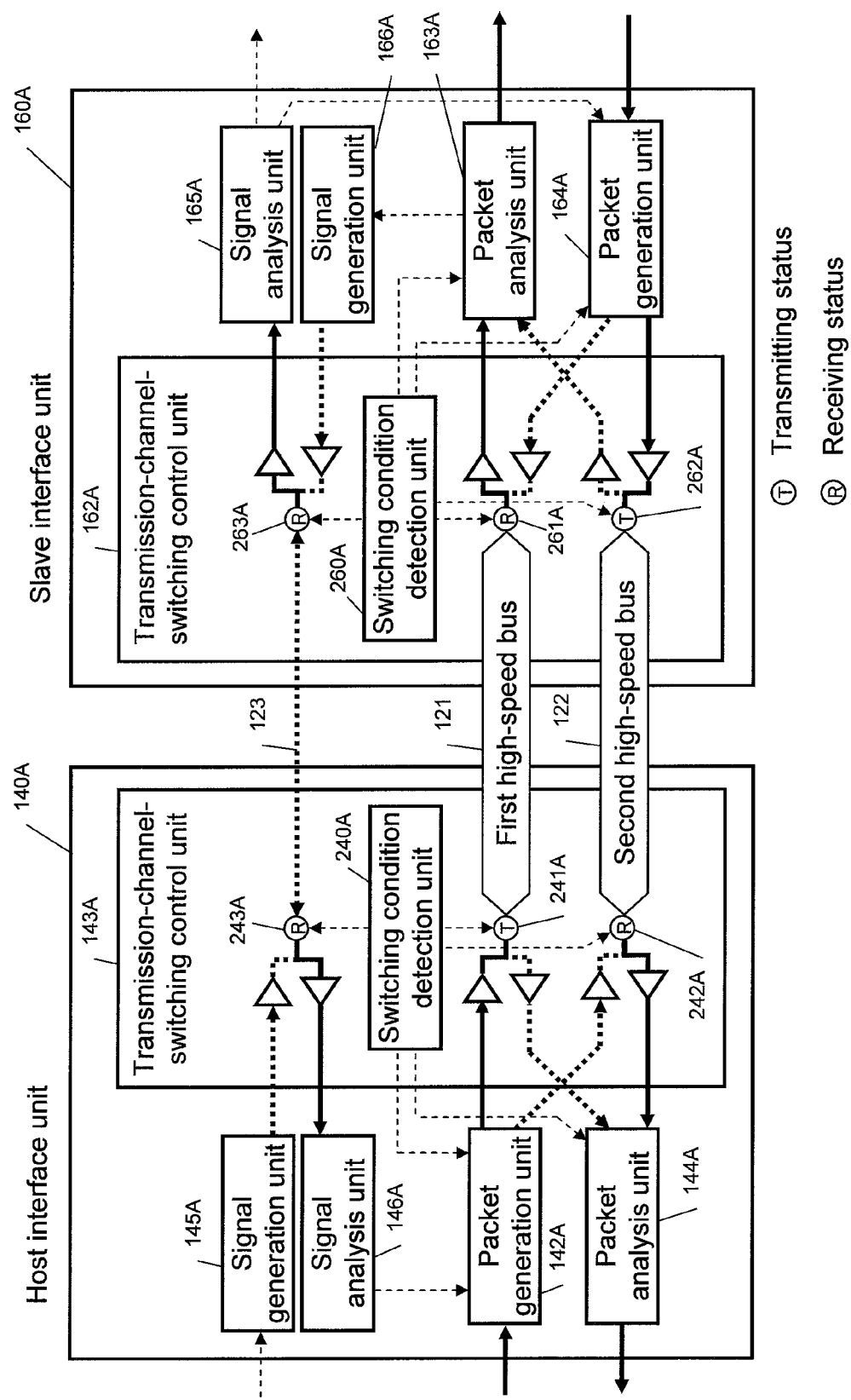
FIG. 23 is a block diagram showing the structure of a bus switching control unit in a full-duplex mode in the fourth embodiment.

FIG. 23 shows the structure of the host interface unit 140A and the slave interface unit 160A. In particular, FIG. 23 shows in detail the structure of the transmission channel (bus) switching control unit 143A included the host device and the transmission channel (bus) switching control unit 162A included in the slave device. This figure describes the setting of the communications system immediately after the host interface unit 140A and the slave interface unit 160A become activated.

As shown in FIG. 23, the transmission channel (bus) switching control unit 143A included in the host device includes a switching condition detection unit 240A, an input/output terminal 241A of the first high-speed bus 121, an input/output terminal 242A of the second high-speed bus 122, and an input/output terminal 243A of the low-speed bus 123.

As shown in FIG. 23, the transmission channel (bus) switching control unit 162A included in the slave device includes a switching condition detection unit 260A, an input/output terminal 261A of the first high-speed bus 121, an input/output terminal 262A of the second high-speed bus 122, and an input/output terminal 263A of the low-speed bus 123.

The switching condition detection unit 240A included in the host device monitors packets that are transmitted and received by the packet generation unit 142A and the packet analysis unit 144A, and determines whether the switching condition is satisfied. The switching condition detection unit 240A then sets the input/output terminals 241A, 242A, and 243A to a transmitting status or a receiving status depending on whether the switching condition is satisfied.

In the same manner, the switching condition detection unit 260 included in the slave device monitors packets transmitted and received by the packet analysis unit 163A and the packet generation unit 164A, and determines whether the switching condition is satisfied. The switching condition detection unit then sets the input/output terminals 261A, 262A, and 263A to a transmitting status or a receiving status depending on whether the switching condition is satisfied.

In FIG. 23, the input/output terminal 241A of the first high-speed bus 121 included in the host interface unit 140A is set in the transmitting status (T), and the input/output terminal 261A of the first high-speed bus 121 included in the slave interface unit 160A is set in the receiving status (R). The input/output terminal 242A of the second high-speed bus 122 included in the host interface unit 140A is set in the receiving status (R), and the input/output terminal 262A of the second high-speed bus 122 included in the slave interface unit 160A is set in the transmitting status (T).

In this case, the communication direction of the first high-speed bus 121 is set to downlink, and the communication direction of the second high-speed bus 122 is set to uplink. In FIG. 23, the first high-speed channel 121 and the second high-speed channel 122 have communication directions that are different from each other. In this case, the communications system 4 is in the full-duplex mode, in which both the host interface unit 140A and the slave interface unit 160A can simultaneously transmit data to each other. The communications system 4 sets the input/output terminals 243A of the low-speed bus 123 included in the host interface unit 140A to the receiving status (R) and the input/output terminal 263A of the low-speed bus 123 included in the slave interface unit 160A to the receiving status (R) in the full-duplex mode. In this case, the low-speed bus 123 of the communications system 4 is disabled to transmit signals.

In this state, the host device 100A provides an initializing command packet to the packet analysis unit 163A of the non-volatile storage device 110A via the first high-speed bus 121. The packet analysis unit 163A analyzes the packet and determines that the packet carries an initializing command. As a result, the communications system 4 performs initialization as necessary. After the initialization is completed, the communications system 4 enters a steady status (full-duplex mode).

4.2.2 High-Speed Reading Operation

Figure 24:
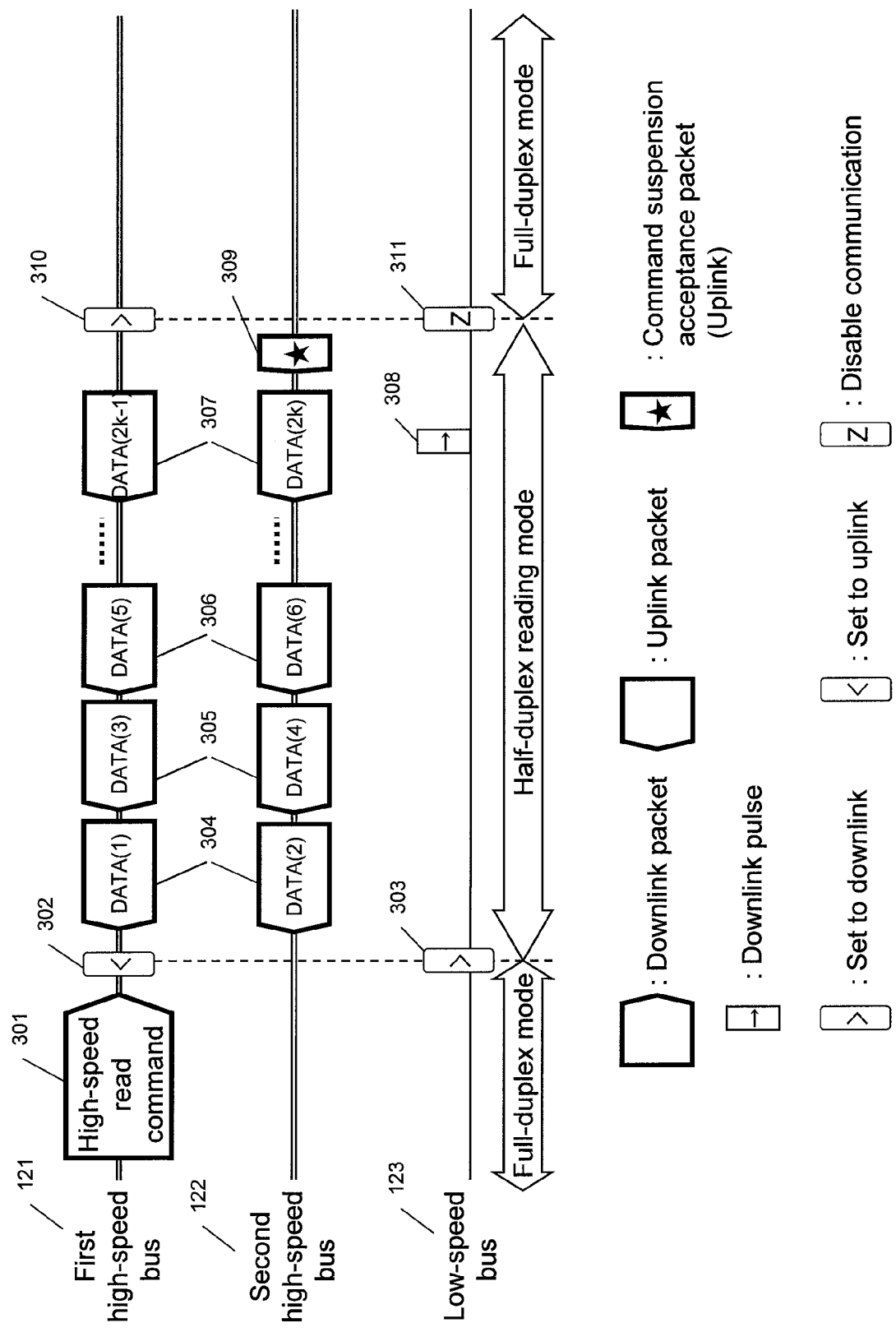
FIG. 24 is a timing chart showing packets that are transferred on transmission channels in chronological order during high-speed reading in the fourth embodiment.

FIG. 24 is a timing chart showing packets or signals that are transferred on the first high-speed bus 121, the second high-speed bus 122, and the low-speed bus 123 in chronological order when a high-speed read command is transmitted from the host device 100A in the communications system 4.

In the communications system 4 in the steady status, the user can instruct, using the user interface unit 131 included in the host device 100A, high-speed data reading to be performed. The user interface unit 131 transmits a high-speed data read command to the application unit 132. When determining that the memory unit 133 has an unoccupied area large enough to store the data to be read, the application unit 132 instructs the packet generation unit 142 to generate a packet carrying a high-speed read command. The high-speed read command includes an address at which data is to be read and the size of data to be read, which are multiplexed in the command.

The high-speed read command packet is provided to the packet analysis unit 163A included in the non-volatile storage device 110A via the first high-speed bus 121 (301). The packet analysis unit 163 then analyzes the packet and determines that the packet carries a high-speed read command.

The switching condition detection unit 240A included in the bus switching control unit 143A of the host device 100A detects that the packet generation unit 142A has transmitted the high-speed read command packet, and sets the input/output terminal 241 of the first high-speed bus 121 to the receiving status. The switching condition detection unit 260A included in the bus switching control unit 162 of the non-volatile storage device 110A detects that the packet analysis unit 163A has received the high-speed read command packet, and sets the input/output terminal 261A of the first high-speed bus 121 to the transmitting status.

This sets the first high-speed bus 121 in the communications system 4 to an uplink bus (302). The switching condition detection unit 240A included in the bus switching control unit 143A of the host device 100A further sets the input/output terminal 243A of the low-speed bus 123 to the transmitting status.

This sets the low-speed bus 123 to a downlink bus (303).

Figure 25:
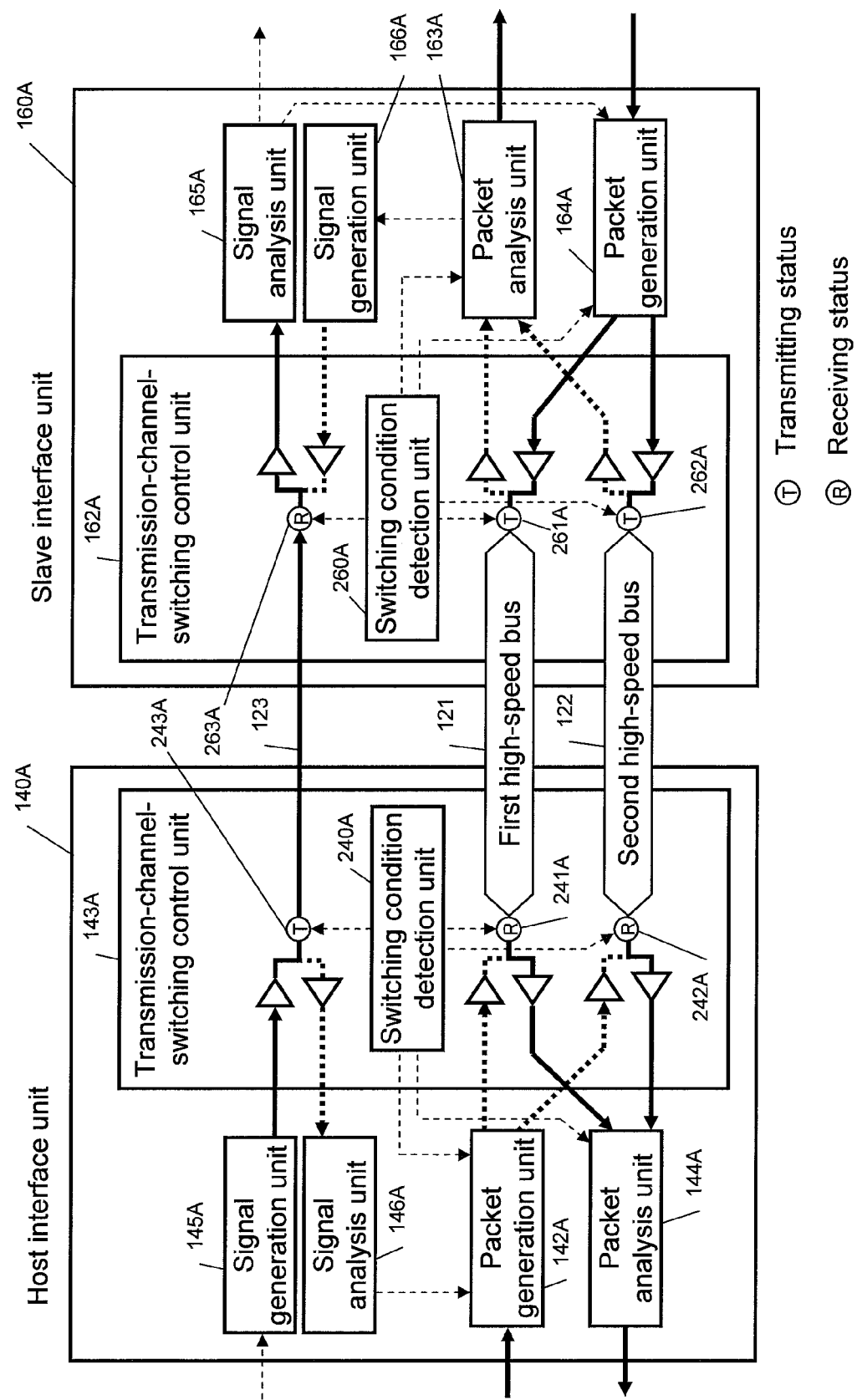
FIG. 25 is a block diagram showing the structure of a bus switching control unit in a half-duplex reading mode in the fourth embodiment.

As a result, the communications system 4 enters the half-duplex reading mode, and the bus switching control units 143A and 162A are set in the statuses shown in FIG. 25.

After the communication mode of the communications system 4 is switched to the half-duplex reading mode, the slave interface unit 160A included in the slave device sequentially obtains data having the size multiplexed in the high-speed read command packet from an area of the non-volatile memory unit 171 corresponding to the address multiplexed in the command via the non-volatile memory read/write control unit 170. The slave interface unit 160A then provides the obtained data to the packet generation unit 164A. The packet generation unit 164A included in the non-volatile storage device 110A generates data packets each of which consists of a header indicating the type of the corresponding packet etc. and a body storing a data piece generated by dividing the data read by the non-volatile memory read/write control unit 170 into data pieces each having an appropriate size.

The packet generation unit 164A transmits the generated data packets to the host device 100A via the transmission channel (bus) switching control unit 162A while assigning the data packets either to the first high-speed bus 121 or the second high-speed bus 122. In the present embodiment, the data packets are transmitted in a manner that a first data packet DATA(1) is assigned to the first high-speed bus 121 and a second data packet DATA(2) is assigned to the second high-speed bus 122 (304).

The data packets DATA(1) and DATA(2) transmitted to the host device 100A are accumulated into the packet analysis unit 144A via the transmission channel (bus) switching control unit 143A included in the host device 100A. The packet analysis unit 144A then analyzes these packets and determines that these packets are data packets, and extracts the bodies or the main data of the data packets, or the data packets excluding the headers, and stores the extracted main data into the memory unit 133.

A third data packet DATA(3), a fourth data packet DATA(4), a fifth data packet DATA(5), and a sixth data packet DATA(b) are thereafter transmitted from the non-volatile storage device 110A to the host device 100A (305, 306) in the same manner as described for the preceding data packets.

When the user instructs, using the user interface unit 131 included in the host device 100A, the high-speed reading to be suspended while the (2k−1)th data packet DATA(2k−1) and the 2k-th data packet DATA(2k) are being transferred (307), the user interface unit 131 transmits the above instruction to the signal generation unit 145A of the host interface unit 140A via the application unit 132.

The signal generation unit 145A generates a pulse having a predetermined length, and transmits the generated pulse to the slave interface unit 160A via the low-speed bus 123 that is set as a downlink bus (308).

The pulse generated by the signal generation unit 145A is provided to the signal analysis unit 165A included in the slave interface unit 160A.

When receiving the pulse, the signal analysis unit 165A analyzes (determines) that suspension of the high speed reading has been instructed, and instructs the non-volatile memory read/write control unit 170 to suspend data reading from the non-volatile memory 171. At the same time, the signal analysis unit 165A instructs the packet generation unit 164A to generate a packet carrying a command suspension acceptance to the packet generation unit 164A.

The command suspension acceptance packet generated by the packet generation unit 164A is then transmitted to the host device 100A via the second high-speed bus 122 that is set as an uplink bus (309).

The switching condition detection unit 260A included in the transmission channel (bus) switching control unit 162A detects that the packet generation unit 164A has transmitted the command suspension acceptance packet, and sets the input/output terminal 261 of the first high-speed bus 121 to the receiving status.

The switching condition detection unit 240A of the transmission channel (bus) switching control unit 143A included in the host device 100A detects that the packet analysis unit 144A has received the command suspension acceptance packet, and sets the input/output terminal 241A of the first high-speed bus 121 to the transmitting status. This sets the first high-speed bus 121 to a downlink bus (310).

Further, the switching condition detection unit 240A sets the input/output terminal 243A of the low-speed bus 123 to the receiving status. This disables the low-speed bus 123 to transmit signals (311).

As a result, the communications system 4 enters the full-duplex mode (steady status), and the transmission channel (bus) switching control units 143A and 162A are set in the statuses shown in FIG. 23.

4.2.3 High-Speed Writing Operation

Figure 26:
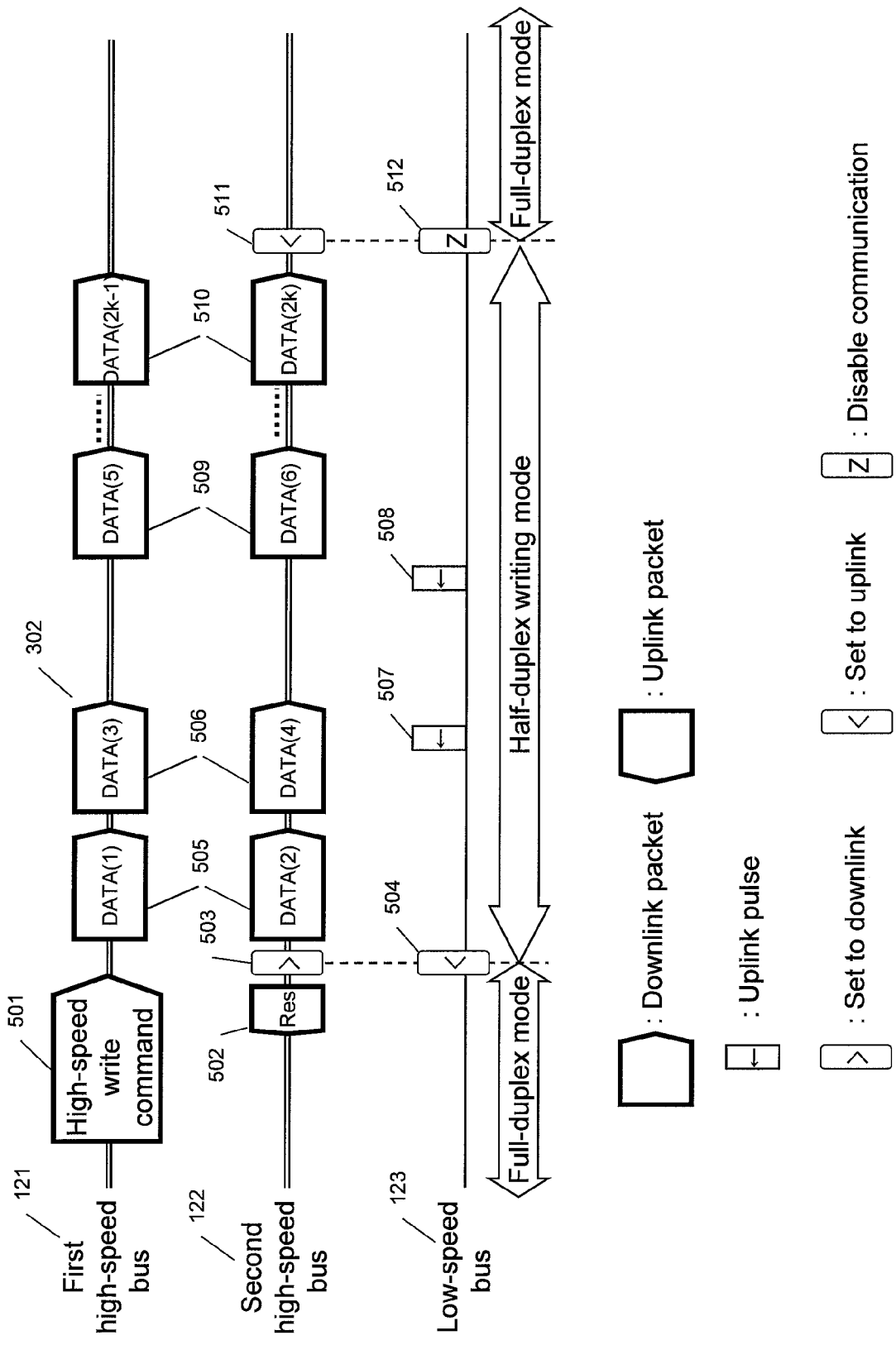
FIG. 26 is a timing chart showing packets that are transferred on transmission channels in chronological order during high-speed writing in the fourth embodiment.

FIG. 26 is a timing chart showing packets or signals that are transferred on the first high-speed bus 121, the second high-speed bus 122, and the low-speed bus 123 in chronological order when a high-speed write command is transmitted from the host device 100A in the communications system 4.

In the communications system 4 in the steady status, the user can instruct, using the user interface unit 131 in the host device 100A, high-speed data writing to be performed. The user interface unit 131 transmits a high-speed data write command to the application unit 132.

When determining that the memory unit 133 stores the data to be written into the non-volatile memory 171, the application unit 132 instructs the packet generation unit 142A included in the host device 100A to generate a packet carrying a high-speed write command, The high-speed write command includes an address at which data is to be written and the size of data to be written, which are multiplexed in the command.

The high-speed write command packet is provided to the packet analysis unit 163A included in the non-volatile storage device 110A via the first high-speed bus 121 (501). The packet analysis unit 163A then analyzes the packet and determines that the packet carries a high-speed write command.

When the non-volatile storage device 110A has an unoccupied area large enough to store the data to be written, the packet generation unit 164A generates a response packet carrying a command acceptance, and transmits the generated command acceptance response packet to the host device 100A (502).

The switching condition detection unit 260A of the transmission channel (bus) switching control unit 162A included in the non-volatile storage device 110A detects that the packet generation unit 164A has transmitted the command acceptance response packet, and sets the input/output terminal 262A of the second high-speed bus 122 to the receiving status.

The switching condition detection unit 240A of the transmission channel (bus) switching control unit 143A included in the host device 100A detects that the packet analysis unit 144A has received the command acceptance response packet, and sets the input/output terminal 242A of the second high-speed bus 122 to the transmitting status. This sets the second high-speed bus 122 to a downlink bus (503).

The switching condition detection unit 260A included in the transmission channel (bus) switching control unit 162A of the host device 100A further sets the input/output terminal 263A of the low-speed bus 123 to the transmitting status. This sets the low-speed bus 123 to an uplink bus (504).

Figure 27:
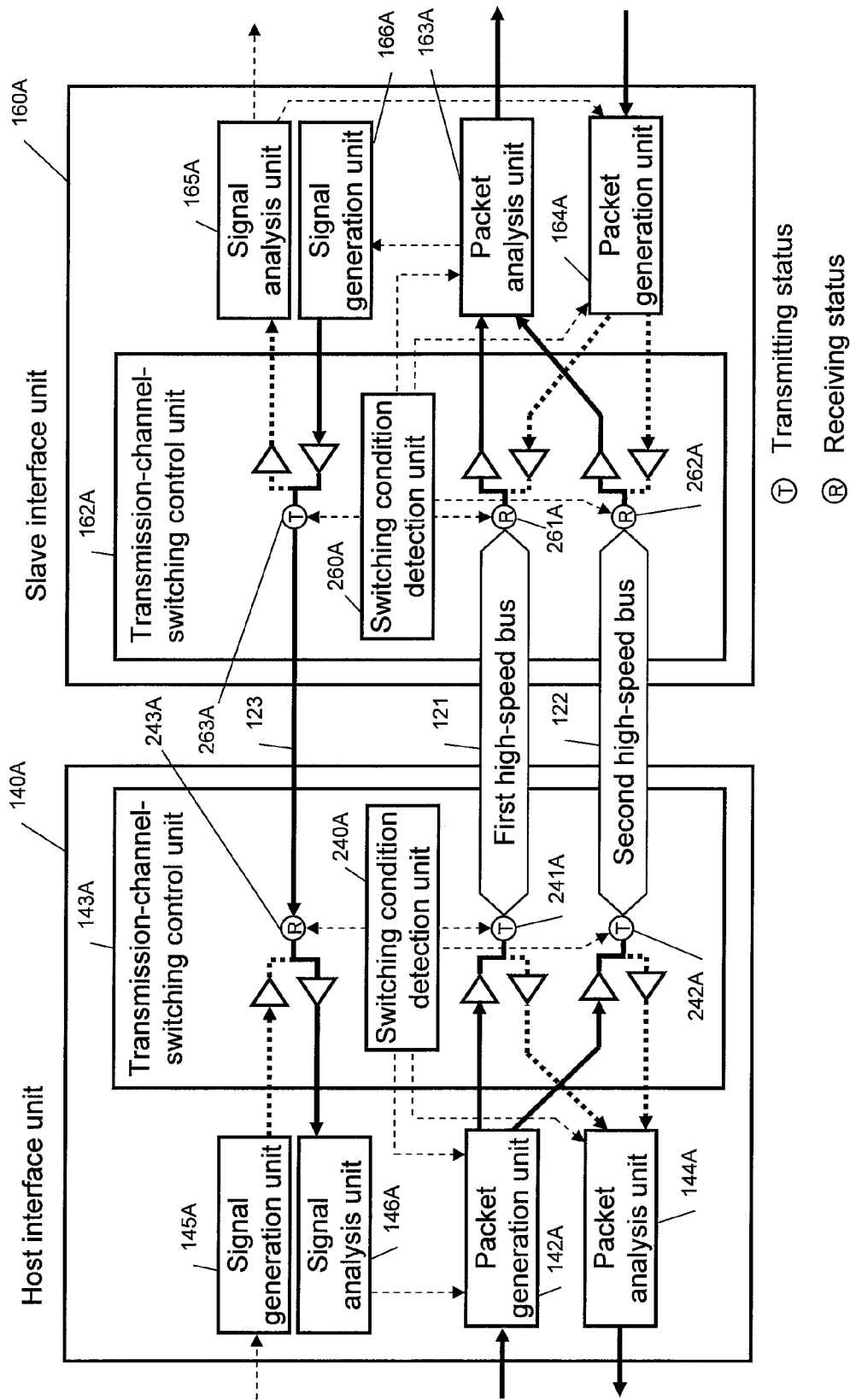
FIG. 27 is a block diagram showing the structure of a bus switching control unit in a half-duplex writing mode in the fourth embodiment.

As a result, the communications system 4 enters the half-duplex writing mode, and the transmission channel (bus) switching control units 143A and 162A are set in the statuses shown in FIG. 27.

After the communication mode of the communications system 4 is switched to the half-duplex writing mode, the host interface unit 140A provides data stored in the memory unit 133 to the packet generation unit 142A.

The packet generation unit 142A generates data packets each of which consists of a header indicating the type of the corresponding packet etc. and a body storing a data piece generated by dividing the data written into the non-volatile storage device 110A into data pieces each having an appropriate size.

The packet generation unit 142A then transmits the generated data packets to the non-volatile storage device 110A via the transmission channel (bus) switching control unit 143A while assigning the generated data packets either to the first high-speed bus 121 or the second high-speed bus 122. In the communications system 4 of the present embodiment, the data packets are transmitted in a manner that a first data packet DATA(1) is assigned to the first high-speed bus 121 and a second data packet DATA(2) is assigned to the second high-speed bus 122 (505).

The data packets DATA(1) and DATA(2) transmitted from the host device 100A to the non-volatile storage device 110A are accumulated into the packet analysis unit 163A via the transmission channel (bus) switching control unit 162A included in the non-volatile storage device 110A. The packet analysis unit 163A then analyzes these packets and determines that these packets are data packets, and provides (outputs) the bodies or the main data of the data packets, or the data packets excluding the headers, to the non-volatile memory read/write control unit 170. The non-volatile memory read/write control unit 170 controls the non-volatile memory 171 to write data in an area of the non-volatile memory 171 corresponding to the address multiplexed in the high-speed write command packet until the size of the data reaches the size multiplexed in the high-speed write command.

A third data packet DATA(3) and a fourth data packet DATA(4) are thereafter transmitted from the host device 100A to the non-volatile storage device 110A (506) in the same manner as described for the preceding data packets.

The data transfer speed on the high-speed bus 121 or the second high-speed bus 122 is lower than the speed at which data is written to the non-volatile memory 171. Thus, the buffer included in the packet analysis unit 163A of the non-volatile storage device 110A, which has an appropriate size as described above, can be used up when the non-volatile storage device 110A continuously receives packets. In this case, the received data will overflow.

In an example shown in FIG. 26, the remaining capacity of the buffer of the non-volatile storage device 110A will be less than or equal to a predetermined value after the non-volatile storage device 110A receives data packets DATA(3) and DATA(4). In this case, the packet analysis unit 163A included in the non-volatile storage device 110A transmits, to the signal generation unit 166A included in the slave interface unit 160A, a command for temporarily suspending the data transfer from the host device 100A.

The signal generation unit 166A then generates a pulse having a predetermined length, and transmits the generated pulse to the host interface unit 140A of the host device 100A via the low-speed bus 123 that is set as an uplink bus (507).

The pulse generated by the signal generation unit 166A is provided to the signal analysis unit 146A included in the host interface unit 140A.

When receiving the pulse, the signal analysis unit 146A analyzes (determines) that suspension of the high speed writing has been instructed, and instructs the packet generation unit 142A to suspend the data transmission.

The non-volatile storage device 110A writes data received from the host device 100A to the non-volatile memory 171 until the remaining capacity of the buffer included in the packet analysis unit 163A becomes more than or equal to a predetermined value. In this case, the packet analysis unit 163A transmits a command for resuming the data transfer from the host device 100A to the signal generation unit 166A included in the slave interface unit 160A.

The signal generation unit 166A included in the non-volatile storage device 110A generates a pulse having a predetermined length, and transmits the generated pulse to the host interface unit 140A via the low-speed bus 123 that is set as an uplink bus (508).

The pulse generated by the signal generation unit 166A is provided to the signal analysis unit 146A of the host interface unit 140A.

When receiving the pulse, the signal analysis unit 146A of the host device 100A analyzes (determines) that resumption of the high speed writing has been instructed, and instructs the packet generation unit 142A to resume the data transmission to the non-volatile storage device 110A.

As a result, a fifth data packet DATA(5) and a sixth data packet DATA(6) are transmitted from the host device 100A to the non-volatile storage device 110 (509).

When the size of the transferred data reaches the size multiplexed in the high-speed write command after the (2k−1)th data packet DATA(2k−1) and the 2k-th data packet DATA(2k) are transferred in the communications system 4 (510), the switching condition detection unit 240A of the transmission channel (bus) switching control unit 143A included in the host device 100A detects that the packet generation unit 142A has transmitted the data packet DATA (2k), and sets the input/output terminal 242A of the second high-speed bus 122 to the receiving status.

The switching condition detection unit 260A included in the transmission channel (bus) switching control unit 162A of the non-volatile storage device 110A detects that the packet analysis unit 163A has received the data packet DATA(2k), and sets the input/output terminal 262A of the second high-speed bus 122 to the transmitting status. This sets the second high-speed bus 122 to an uplink bus in the communications system 4 (511).

The switching condition detection unit 260A of the non-volatile storage device 110A then sets the input/output terminal 263A of the low-speed bus 123 to the receiving status. This disables the low-speed bus 123 to transmit signals (512).

As a result, the communications system 4 enters the full-duplex mode (steady status), and the transmission channel (bus) switching control units 143 and 162 are set in the statuses shown in FIG. 23.

As described above, the communications system 4 can suspend reading by setting the low-speed bus to an uplink bus and transmitting a pulsed signal from the host device 100A when the communications system 4 is in the half-duplex reading mode, in which data is read at a high speed using the two high-speed buses simultaneously.

Also, the communications system 4 can provide a message indicating whether data can be transmitted to the host device 100A by setting the low-speed bus to a downlink bus and transmitting a pulsed signal from the slave device (non-volatile storage device) 110A to the host device 100A when the communications system 4 is in the half-duplex writing mode, in which data is written at a high speed using the two high-speed buses simultaneously.

Although the present embodiment describes the case in which a message provided from the slave device (non-volatile storage device) 110A to the host device 100A indicates suspension of writing while data is being transferred, and indicates resumption of the data transfer while writing is being suspended, the present invention should not be limited to this structure. For example, such a message may be a simple interrupt, and the host device 100A may transmit an inquiry about the cause for the interrupt to the slave device (non-volatile storage device) 110A using the high-speed buses while writing is being suspended.

In the communications system 4, data reading or data writing may be performed in the full-duplex mode, which is a steady status. When, for example, the communications system 4 is set in the status shown in FIG. 23, the second high-speed bus 122 that is set as an uplink bus is used to transfer data for the data reading operation. In this case, the first high-speed bus 121 can be used to transmit a reading suspension command.

For the data writing operation, the first high-speed bus 121 that is set as a downlink bus is used to transfer data. In this case, the second high-speed bus 122 can be used to transmit a message indicating whether data writing can be performed.

Although a pulse having a predetermined length is transmitted on the low-speed bus 123 in the communications system 4 of the present embodiment, the present invention should not be limited to this structure. For example, a bit pattern having a predetermined length may be transmitted on the low-speed bus 123. In this case, different instructions can be assigned to a plurality of bit patterns. This enables more complex instructions to be transmitted.

Although the present embodiment describes the case in which the slave device is formed by the non-volatile storage device 110A in the communications system 4, the present invention should not be limited to this structure. For example, the slave device may be formed by a network interface device 710A including a slave interface unit 160A and a network interface unit 770 shown in FIG. 28. This modification has the same advantageous effects as the present embodiment.

The network interface device 710A is connected to a remove device 780 via a network communication channel 781. The network interface unit 770 controls the network communication channel 781, and controls the network as instructed by the slave interface unit 160A.

Figure 28:
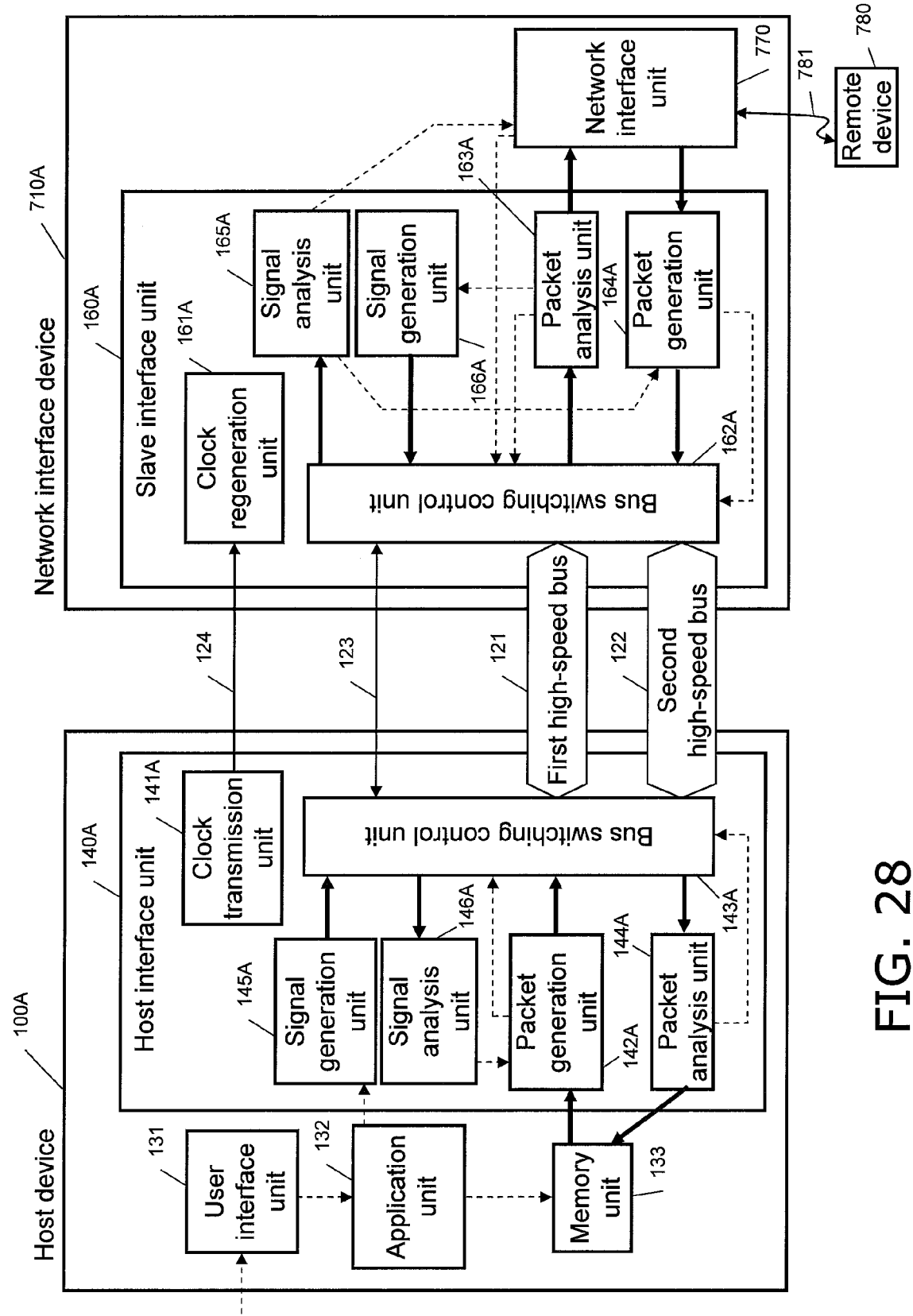
FIG. 28 is a block diagram showing another structure according to the fourth embodiment.

In FIG. 28, the host device 100A transmits a high-speed read command. In this case, data packets carrying data stored in a packet generation unit 164A of the network interface device 710A, the data being obtained from the memory (not shown) in the remote device via the network communication channel 781 and the network interface unit 770, are generated, and the generated data packets are transmitted from the network interface device 710A to the host device 100A in the half-duplex reading mode.

In the same manner, when a high-speed write command is transmitted from the host device 100A, data packets are transmitted from the host device 100A to the network interface device 710A and are transmitted to the packet analysis unit 163A in the half-duplex writing mode, and the bodies of the data packets are extracted and provided to the network interface unit 770. The data provided to the network interface unit 770 is then written to the memory (not shown) included in the remote device 780 via the network communication channel 781.

The data transfer speed on the first high-speed bus 121 or the second high-speed bus 122 is normally higher than the speed of the network communication channel 781. This requires the control associated with the suspension and resumption of data transfer described in the present embodiment.

The network communication channel 781 may be formed either using a wired network or using a wireless network.

Fifth Embodiment

Figure 29:
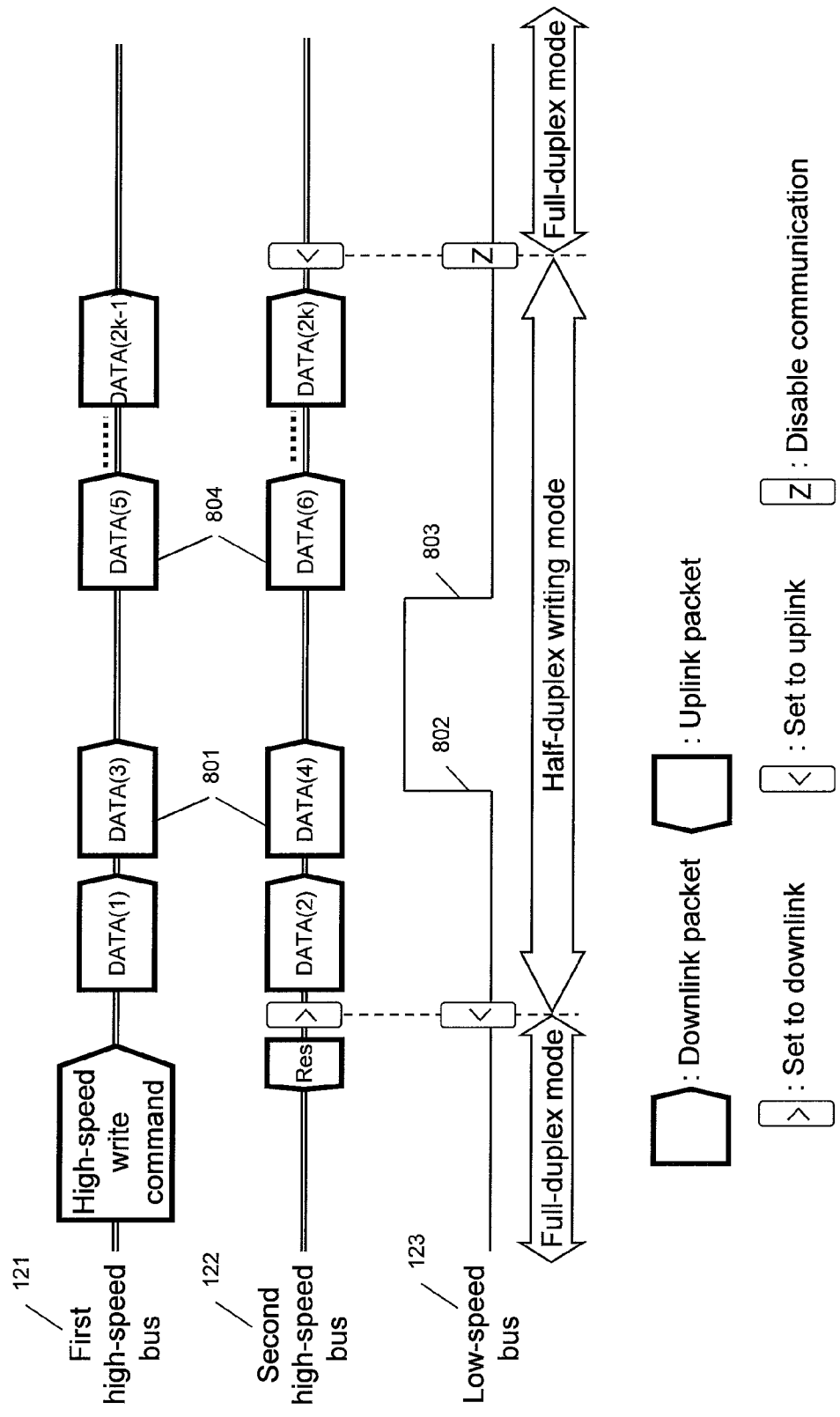
FIG. 29 is a timing chart showing packets that are transferred on transmission channels in chronological order during high-speed writing in the fifth embodiment.

FIG. 29 is a timing chart showing packets or signals that are transferred on a first high-speed bus 121, a second high-speed bus 122, and a low-speed bus 123 in chronological order when a high-speed write command is transmitted from a host device in a communications system according to a fifth embodiment of the present invention.

The communications system according to the fifth embodiment has the same structure as the communications system 4 of the fourth embodiment.

The communications system of the present embodiment differs from the communications system 4 of the fourth embodiment in the following point. During high-speed writing, the low-speed bus 123 is set to a high level when writing to the non-volatile storage device 110A cannot be performed and the low-speed bus 123 is set to a low level in any other cases.

As shown in FIG. 29, when the remaining capacity of the buffer will be less than or equal to a predetermined value after the data packets DATA(3) and DATA(4) are received (801), the packet analysis unit 163A included in the slave device instructs the signal generation unit 166A included in the slave interface unit 160A to set the low-speed bus 123 to a high level (802).

The signal analysis unit 146A of the host interface unit 140A included in the host device detects that the low-speed bus 123 is set to a high level, and instructs the packet generation unit 142A to suspend data transmission.

When the remaining buffer capacity reaches or exceeds the predetermined value to enable the data reception to be resumed, the packet analysis unit 163A of the slave device instructs the signal generation unit 166A included in the slave interface unit 160A to set the low-speed bus 123 to a low level (803). This starts transfer of the data packets DATA(5) and DATA(6) (804).

In the present embodiment, as described above, the host interface unit 140A of the host device is simply required to detect the status of the low-speed bus 123 as being either a high level or a low level to determine whether data writing to the non-volatile storage device 110A can be performed. This reduces the scale of the circuit for the above determination further in the communications system of the present embodiment.

In the same manner, when high-speed reading is performed, the host device 100A may switch the low-speed bus 123 from a low level to a high level and may instruct the non-volatile storage device 110A to suspend the data transfer.

Although the above embodiment describes the case in which the low-speed bus is disabled to transmit signals in the full-duplex mode, the present invention should not be limited to this structure. Alternatively, the low-speed bus may for example be set to a downlink bus to transmit a command from the host device to the slave device. The host device and the slave device may negotiate with each other via the two high-speed buses to switch the direction of the low-speed bus in an appropriate manner.

Other Embodiments

Although the above embodiments of the present invention all describe the case in which the slave device is connected to the host device via the external transmission channels, the present invention should not be limited to this structure. For example, components of the host device and components of the slave device may be formed in a single device and may be connected via an internal transmission channel of the single device. This modification also has the same advantageous effects as the advantageous effects of the above embodiments of the present invention.

Although the above embodiments of the present invention all describe the case in which the communication mode is switched from the half-duplex mode to the full-duplex mode when transmission and reception of four data packets is completed, the present invention should not be limited to this structure. For example, the communication mode may be switched from the half-duplex mode to the full-duplex mode when transmission and reception of N data packets (N is a natural number) is completed.

The host device and the slave device may negotiate with each other to determine the data packet number N and the data size of each data packet as a part of initialization processing performed when, for example, the communications system is powered on or the slave device is mounted and activated. In this case, it is preferable to determine the data packet number N and the data size of each data packet by considering, for example, the transmission and reception capacity (buffering size for example) of the host device and the slave device (for example, the data packet number N and the data size of each data packet are preferably determined in a manner to maximize the transmission and reception capability of one of the host device and the slave device that has the smaller buffer size).

Also, the data packet number N and the data size of each data packet may not be fixed, but may be variable depending on, for example, the communication status of the communications system. This improves the communication efficiency of the communications system.

Further, the condition for switching between the half-duplex mode and the full-duplex mode may be determined in advance between the host device and the non-volatile storage device, and the communication mode may be switched between the half-duplex mode and the full-duplex mode based on the determined condition with a method other than the method described in the above embodiments.

Each block of the host device and the slave device included in the communications system described in the above embodiments may be formed using a single chip with a semiconductor device, such as LSI (large-scale integration), or some or all of the blocks of the host device and the slave device included in the communications system may be formed using a single chip.

Although LSI is used as the semiconductor device technology, the technology may be IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks. Biotechnology is potentially applicable.

The processes described in the above embodiments may be realized using either hardware or software, or may be realized using both software and hardware. When the communications system of each of the above embodiments is implemented by hardware, the communications system requires timing adjustment for its processes. For ease of explanation, timing adjustment associated with various signals required in an actual hardware design is not described in detail in the above embodiments.

The specific structures described in the above embodiments are mere examples of the present invention, and may be changed and modified variously without departing from the scope and spirit of the invention.

The interface device, the host device, the slave device, and the communications system of the present invention enable interrupt processing, such as processing associated with a wait state or a busy state, to be performed promptly by temporarily switching to the full-duplex mode when the host device transmits and receives data at a high speed to and from the slave device in the half-duplex mode in the communications system in which the host device transfers data to the slave device using a plurality of transmission channels. The present invention is applicable to a non-volatile storage device including at least an interface device and a non-volatile memory, a network interface device including at least an interface device and a wired or wireless network interface unit, and further to a moving image recording and playback apparatus, a still image recording and playback apparatus, an audio recording and playback apparatus, a portable telephone, or the like on which the non-volatile storage device or the network interface device is mounted.

The invention claimed is:

1. An interface device that is used in a communications system including at least a first transmission channel and a second transmission channel for transmitting and receiving a command and data using the two transmission channels, the interface device comprising:
 a first channel input/output terminal that is connected to the first transmission channel and is set to at least two statuses including an input status for receiving a command and/or data and an output status for transmitting a command and/or data;
 a second channel input/output terminal that is connected to the second transmission channel and is set to at least two statuses including an input status for receiving a command and/or data and an output status for transmitting a command and/or data;
 a mode-switching-condition detection unit that sets a first condition and a second condition and determines whether the set first condition or the set second condition is satisfied, the first condition being a condition under which a communication mode of the communications system is to be switched from a full-duplex communication mode in which the communications system performs full-duplex communication to a half-duplex communication mode in which the communications system performs half-duplex communication, the second condition being a condition under which the communication mode is to be switched from the half-duplex communication mode to the full-duplex communication mode; and
 a transmission-channel-switching control unit that switches the communication mode from the full-duplex communication mode to the half-duplex communication mode by setting both the first channel input/output terminal and the second channel input/output terminal to an input status or to an output status when the mode-switching-condition detection unit determines that the first condition is satisfied, and switches the communication mode from the half-duplex communication mode to the full-duplex communication mode by setting one of the first channel input/output terminal and the second channel input/output terminal to an output status and setting the other one of the first channel input/output terminal and the second channel input/output terminal to an input status when the mode-switching-condition detection unit determines that the second condition is satisfied,
 wherein the mode-switching-condition detection unit sets the second condition during initial setting of the interface device, the second condition being satisfied when N packets out of a series of packets of data to be transferred have been transferred using the two transmission channels in the half-duplex communication mode, where N is a natural number, and
 when the second condition is satisfied, the transfer of the data is interrupted and the transmission-channel-switching control unit switches the communication mode from the half-duplex communication mode to the full-duplex communication mode, and then, when the first condition is satisfied, the transmission-channel-switching control unit switches the communication mode from the full-duplex communication mode back to the half-duplex communication mode and the interrupted transfer of the data is resumed in the half-duplex communication mode.

2. The interface device according to claim 1, wherein the transmission-channel-switching control unit provides information about the second condition to a communication target using a data transmission and reception request carrying the information about the second condition or a data transmission and reception command carrying the information about the second condition.

3. The interface device according to claim 1, wherein the transmission-channel-switching control unit transmits during initial setting of the interface device a packet that provides information about the second condition to a communication target and/or that causes the communication target to set the second condition.

4. The interface device according to claim 1, wherein the number N of transmitted or received packets used to determine whether the second condition is satisfied is determined in accordance with a buffer size of the communications system.

5. The interface device according to claim 1, wherein the mode-switching-condition detection unit determines that the first condition is satisfied when a predetermined time T elapses after the communication mode of the communications system is switched to the full-duplex communication mode.

6. The interface device according to claim 1, wherein the transmission-channel-switching control unit transmits during initial setting of the interface device a packet that provides information about the first condition to a communication target and/or that causes the communication target to set the first condition.

7. The interface device according to claim 1, wherein the mode-switching-condition detection unit determines that the first condition is satisfied when receiving an interface-switching requesting command after the communication mode of the communications system is switched to the full-duplex communication mode.

8. The interface device according to claim 1, wherein the mode-switching-condition detection unit determines that the first condition is satisfied when transmitting an interface-switching requesting command after the communication mode of the communications system is switched to the full-duplex communication mode.

9. The interface device according to claim 1, wherein the transmission-channel-switching control unit waits in the full-duplex communication mode when receiving an interrupt message associated with a wait command after switching to the full-duplex communication mode, and switches to the half-duplex communication mode when receiving a message indicating completion of interrupt processing transmitted after interrupt processing corresponding to the received interrupt message associated with the wait command is completed.

10. The interface device according to claim 1, wherein the transmission-channel-switching control unit switches to the half-duplex communication mode when receiving no interrupt message associated with a wait command within a predetermined time after switching to the full-duplex communication mode.

11. A non-volatile storage device, comprising:
a non-volatile memory;
a non-volatile memory control unit that executes control for reading from and writing to the non-volatile memory; and
the interface device according to claim 1.

12. A communication device, comprising:
an external communication unit that communicates with an external unit;
an external communication control unit that controls the external communication unit; and
the interface device according to claim 1.

13. A communications system, comprising:
a host device including an interface device that is used in a communications system including at least a first transmission channel and a second transmission channel for transmitting and receiving a command and data using the two transmission channels, the interface device comprising:
a first channel input/output terminal that is connected to the first transmission channel and is set to at least two statuses including an input status for receiving a command and/or data and an output status for transmitting a command and/or data;
a second channel input/output terminal that is connected to the second transmission channel and is set to at least two statuses including an input status for receiving a command and/or data and an output status for transmitting a command and/or data;
a mode-switching-condition detection unit that sets a first condition and a second condition and determines whether the set first condition or the set second condition is satisfied, the first condition being a condition under which a communication mode of the communications system is to be switched from a full-duplex communication mode in which the communications system performs full-duplex communication to a half-duplex communication mode in which the communications system performs half-duplex communication, the second condition being a condition under which the communication mode is to be switched from the half-duplex communication mode to the full-duplex communication mode; and a transmission-channel-switching control unit that switches the communication mode from the full-duplex communication mode to the half-duplex communication mode by setting both the first channel input/output terminal and the second channel input/output terminal to an input status or to an output status when the mode-switching-condition detection unit determines that the first condition is satisfied, and switches the communication mode from the half-duplex communication mode to the full-duplex communication mode by setting one of the first channel input/output terminal and the second channel input/output terminal to an output status and setting the other one of the first channel input/output terminal and the second channel input/output terminal to an input status when the mode-switching-condition detection unit determines that the second condition is satisfied; and
a slave device including the device according to claim 11,
wherein the mode-switching-condition detection unit sets the second condition during initial setting of the interface device, the second condition being satisfied when N packets out of a series of packets of data to be transferred have been transferred using the two transmission channels in the half-duplex communication mode, where N is a natural number, and
when the second condition is satisfied, the transfer of the data is interrupted and the transmission-channel-switching control unit switches the communication mode from the half-duplex communication mode to the full-duplex communication mode, and then, when the first condition is satisfied, the transmission-channel-switching control unit switches the communication mode from the full-duplex communication mode back to the half-duplex communication mode and the interrupted transfer of the data is resumed in the half-duplex communication mode.

14. A communication mode switching method used in a communications system including at least a first transmission channel and a second transmission channel for transmitting and receiving a command and data using the two transmission channels, the method comprising:
setting a first condition and a second condition, and determining whether the set first condition or the set second condition is satisfied, the first condition being a condition under which a communication mode of the communications system is to be switched from a full-duplex communication mode in which the communications system performs full-duplex communication to a half-duplex communication mode in which the communications system performs half-duplex communication, the second condition being a condition under which the communication mode is to be switched from the half-duplex communication mode to the full-duplex communication mode; and
switching the communication mode from the full-duplex communication mode to the half-duplex communication mode when the first condition is determined to be satisfied in the mode-switching condition detection step, and switching the communication mode from the half-duplex communication mode to the full-duplex communication mode when the second condition is determined to be satisfied in the mode-switching-condition detection step, wherein the mode-switching condition detection step sets the second condition during initial setting, the second condition being satisfied when N packets out of a series of packets of data to be transferred have been transferred using the two transmission channels in the half-duplex communication mode, where N is a natural number, and when the second condition is satisfied, the transfer of the data is interrupted and the switching step switches the communication mode from the half-duplex communication mode to the full-duplex communication mode, and then, when the first condition is satisfied, the switching step switches the communication mode from the full-duplex communication mode back to the half-duplex communication mode and the interrupted transfer of the data is resumed in the half-duplex communication mode.

15. An integrated circuit that is used in an interface device included in a communications system including at least a first transmission channel and a second transmission channel for transmitting and receiving a command and data using the two transmission channels, the interface device including a first channel input/output terminal that is connected to the first transmission channel and is set to at least two statuses including an input status for receiving a command and/or data and an output status for transmitting a command and/or data, and a second channel input/output terminal that is connected to the second transmission channel and is set to at least two statuses including an input status for receiving a command and/or data and an output status for transmitting a command and/or data, the integrated circuit comprising:

a mode-switching-condition detection unit that sets a first condition and a second condition and determines whether the set first condition or the set second condition is satisfied, the first condition being a condition under which a communication mode of the communications system is to be switched from a full-duplex communication mode in which the communications system performs full-duplex communication to a half-duplex communication mode in which the communications system performs half-duplex communication, the second condition being a condition under which the communication mode is to be switched from the half-duplex communication mode to the full-duplex communication mode; and a transmission-channel-switching control unit that switches the communication mode from the full-duplex communication mode to the half-duplex communication mode by setting both the first channel input/output terminal and the second channel input/output terminal to an input status or to an output status when the mode-switching-condition detection unit determines that the first condition is satisfied, and switches the communication mode from the half-duplex communication mode to the full-duplex communication mode by setting one of the first channel input/output terminal and the second channel input/output terminal to an output status and setting the other one of the first channel input/output terminal and the second channel input/output terminal to an input status when the mode-switching-condition detection unit determines that the second condition is satisfied, wherein the mode-switching-condition detection unit sets the second condition during initial setting of the interface device, the second condition being satisfied when N packets out of a series of packets of data to be transferred have been transferred using the two transmission channels in the half-duplex communication mode, where N is a natural number, and when the second condition is satisfied, the transfer of the data is interrupted and the transmission-channel-switching control unit switches the communication mode from the half-duplex communication mode to the full-duplex communication mode, and then, when the first condition is satisfied, the transmission-channel-switching control unit switches the communication mode from the full-duplex communication mode back to the half-duplex communication mode and the interrupted transfer of the data is resumed in the half-duplex communication mode.

16. An interface device that is used in a communications system including a low-speed transmission channel and a plurality of high-speed transmission channels for transmitting and receiving a command and data using the low-speed transmission channel or the plurality of high-speed transmission channels, the interface device comprising:

a low-speed channel input/output terminal that is connected to the low-speed transmission channel and is set to at least two statuses including an input status for receiving a command and/or data and an output status for transmitting a command and/or data;

a plurality of high-speed channel input/output terminals that are connected to the high-speed transmission channels and are set to at least two statuses including an input status for receiving a command and/or data and an output status for transmitting a command and/or data;

a mode-switching-condition detection unit that sets a first condition and a second condition and determines whether the set first condition or the set second condition is satisfied, the first condition being a condition under which a communication mode of the communications system is to be switched from a full-duplex communication mode in which the communications system performs full-duplex communication to a half-duplex communication mode in which the communications system performs half-duplex communication, the second condition being a condition under which the communication mode is to be switched from the half-duplex communication mode to the full-duplex communication mode; and a transmission-channel-switching control unit that sets an input status and an output status of the low-speed channel input/output terminal and the plurality of high-speed channel input/output terminals independently of each other, and sets the input status and the output status of the low-speed channel input/output terminal and the plurality of high-speed channel input/output terminals based on the full-duplex communication mode in which at least one of the plurality of high-speed channel input/output terminals is set to an output status and the high-speed channel input/output terminals other than the at least one high-speed channel input/output terminals set in the output status are set to an input status, the half-duplex output mode in which all the high-speed channel input/output terminals are set to an output status, and the half-duplex input mode in which all the high-speed channel input/output terminals are set to an input status, wherein the transmission-channel-switching control unit sets the low-speed channel input/output terminal to an input status in the half-duplex output mode, and sets the low-speed channel input/output terminal to an output status in the half-duplex input mode, and wherein the mode-switching-condition detection unit sets the second condition during initial setting of the interface device, the second condition being satisfied when N packets out of a series of packets of data to be transferred have been transferred using transmission channels in the half-duplex communication mode, where N is a natural number, and when the second condition is satisfied, the transfer of the data is interrupted and the transmission-channel-switching control unit switches the communication mode from the half-duplex communication mode to the full-duplex communication mode, and then, when the first condition is satisfied, the transmission-channel-switching control unit switches the communication mode from the full-duplex communication mode back to the half-duplex communication mode and the interrupted transfer of the data is resumed in the half-duplex communication mode.

17. The interface device according to claim 16, wherein the low-speed channel input/output terminal is an input/output terminal for communication performed using single-ended signaling, and at least one of the plurality of high-speed channel input/output terminals is an input/output terminal for communication performed using differential signaling.

18. A non-volatile storage device, comprising:

a non-volatile memory;

a non-volatile memory control unit that executes control for reading from and writing to the non-volatile memory; and the interface device according to claim 16.

19. A communication device, comprising:

an external communication unit that communicates with an external unit;

an external communication control unit that controls the external communication unit; and the interface device according to claim 16.

20. A communications system, comprising:

a host device including an interface device that is used in a communications system including a low-speed transmission channel and a plurality of high-speed transmission channels and transmitting and receiving a command and data using the low-speed transmission channel or the plurality of high-speed transmission channels, the interface device comprising:

a low-speed channel input/output terminal that is connected to the low-speed transmission channel and is set to at least two statuses including an input status for receiving a command and/or data and an output status for transmitting a command and/or data;

a plurality of high-speed channel input/output terminals that are connected to the high-speed transmission channels and are set to at least two statuses including an input status for receiving a command and/or data and an output status for transmitting a command and/or data; and a transmission-channel-switching control unit that sets an input status and an output status of the low-speed channel input/output terminal and the plurality of high-speed channel input/output terminals independently of each other, and sets the input status and the output status of the low-speed channel input/output terminal and the plurality of high-speed channel input/output terminals based on a full-duplex communication mode in which at least one of the plurality of high-speed channel input/output terminals is set to an output status and the high-speed channel input/output terminals other than the at least one high-speed channel input/output terminals set in the output status are set to an input status, a half-duplex output mode in which all the high-speed channel input/output terminals are set to an output status, and a half-duplex input mode in which all the high-speed channel input/output terminals are set to an input status, wherein the transmission-channel-switching control unit sets the low-speed channel input/output terminal to an input status in the half-duplex output mode, and sets the low-speed channel input/output terminal to an output status in the half-duplex input mode; and a slave device including the interface device according to claim 16.

* * * * *